US012450981B2

(12) United States Patent
Gaspar et al.

(10) Patent No.: US 12,450,981 B2
(45) Date of Patent: Oct. 21, 2025

(54) SYSTEM AND METHOD FOR REEL-BASED EVENTS WITH GUARANTEE FEATURE

(71) Applicant: Games Global Operations Limited, Douglas (IM)

(72) Inventors: Michael John Gaspar, KwaZulu Natal (ZA); Rory Angus Harpur, KwaZulu Natal (ZA)

(73) Assignee: Games Global Operations Limited, Douglas (IM)

( * ) Notice: Subject to any disclaimer, the term of this patent is extended or adjusted under 35 U.S.C. 154(b) by 377 days.

(21) Appl. No.: 18/056,039

(22) Filed: Nov. 16, 2022

(65) Prior Publication Data

US 2024/0161581 A1 May 16, 2024

(51) Int. Cl.
*G07F 17/32* (2006.01)

(52) U.S. Cl.
CPC ...... *G07F 17/3262* (2013.01); *G07F 17/3213* (2013.01); *G07F 17/3267* (2013.01); *G07F 17/3269* (2013.01)

(58) Field of Classification Search
CPC ............. G07F 17/3262; G07F 17/3213; G07F 17/3267; G07F 17/3269
See application file for complete search history.

(56) References Cited

U.S. PATENT DOCUMENTS

| | | | | |
|---|---|---|---|---|
| 6,033,307 | A * | 3/2000 | Vancura | G07F 17/32 273/138.2 |
| 11,403,917 | B2 | 8/2022 | Marks | |
| 2003/0060266 | A1* | 3/2003 | Baerlocher | G07F 17/32 463/20 |
| 2003/0078091 | A1* | 4/2003 | Brandstetter | G07F 17/3211 463/20 |
| 2003/0176216 | A1* | 9/2003 | Storey | G07F 17/3244 463/25 |
| 2010/0120506 | A1* | 5/2010 | Davis | G07F 17/3267 463/20 |
| 2018/0068517 | A1 | 3/2018 | Drennan, III et al. | |
| 2018/0082513 | A1 | 3/2018 | Souffront et al. | |

* cited by examiner

*Primary Examiner* — Kevin Y Kim
(74) *Attorney, Agent, or Firm* — McDonnell Boehnen Hulbert & Berghoff LLP

(57) ABSTRACT

Systems, methods, and storage media for reel-based events with guarantee feature are disclosed. Exemplary implementations can: receive a first start input at a processor of a computing system; perform, by the computing system, a first base event in response to receiving the first start input; and determine, by the processor, whether a first feature event trigger occurs during the first base event. Based thereon, the processor can switch the computing system to operate in the feature event state, reset or increase a counter, and/or continue to operate in a normal event state.

20 Claims, 24 Drawing Sheets

SYSTEM AND METHOD FOR REEL-BASED EVENTS WITH GUARANTEE FEATURE

FIELD

This disclosure relates to software-based events including reel-based events having a feature guarantee.

BACKGROUND

Slot machines come in a variety of forms, including for example a mechanical slot machine. A mechanical slot machine can include one or more reels, each of which includes multiple symbols distributed around the circumference of the reel. When a slot machine with reel(s) is used, a user is allowed to spin the reels. Each reel then comes to rest, typically with either one of the symbols, or a space in between symbols, in alignment with a payline. A predefined winning symbol or a predefined combination of winning symbols that are aligned with the payline can result in the user receiving an award. In one example, the slot machine can include three reels, and the payline can be an imaginary, horizontal line disposed across a central portion of a window through which a portion of each of the three reels is visible.

As another example, a mechanical slot machine can present symbols in a matrix arrangement, with each symbol changing during a use of the mechanical slot machine. For example, the mechanical slot machine can have five columns and three rows of symbols, for a total of fifteen symbols. Such mechanical slot machines often have multiple pay lines, each being defined by a collection of positions within the matrix. For example, the mechanical slot machine can have three pay lines, each corresponding to one row of the matrix.

While slot machines were traditionally mechanical, modern slot machines often take the form of a computing system (e.g., a dedicated computing system located in a casino) that includes a graphical user interface (GUI), and that can emulate a mechanical slot machine. Despite such advances, there is a continuing need to improve how a computing system simulates a mechanical slot machine spinning its reels while ensuring a desired gameplay experience to the user.

Overview

The present application discloses embodiments including and/or related to systems, methods, and apparatus that provide improvements in computer-implemented technology by increasing the number and variety of possible outcomes based on a random selection of symbols, such as symbols that can be found on a mechanical slot machine.

In a first aspect, a computing system is provided. The computing system includes a processor and a computer-readable memory storing executable instructions. Execution of the executable instructions by the processor causes the computing system to perform functions. The functions include receiving a first start input at the processor. The functions also include performing a first base event in response to receiving the first start input. The functions also include determining whether a first feature event trigger occurs during the first base event. The functions further include resetting a counter based on the first base event and switching the computing system to operate in a feature event state if the first feature event trigger occurs during the first base event. Additionally, the functions include determining whether the counter meets a feature event threshold if the first feature event trigger does not occur during the first base event. Further, the functions include resetting the counter based on the first base event and switching the computing system to operate in the feature event state if the processor determines the counter meets the feature event threshold, or incrementing the counter based on the first base event and beginning to monitor for receiving a next start input if the processor determines the counter does not meet the feature event threshold. Furthermore, the functions include performing at least one instance of the feature event while operating in the feature event state and then beginning to monitor for receiving the next start input.

In a second aspect, a method is provided. The method includes receiving a first start input at a processor of a computing system. The method includes performing, by the computing system, a first base event in response to receiving the first start input. The method includes determining, by the processor, whether a first feature event trigger occurs during the first base event. If the first feature event trigger occurs during the first base event, then the processor resets a counter based on the first base event and switches the computing system to operate in a feature event state. If the first feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and begins monitoring for receiving a next start input. The computing system can perform at least one instance of the feature event while operating in the feature event state and then the processor begins monitoring for receiving the next start input.

In a third aspect, a computer-readable memory is provided. The computer-readable memory has stored therein instructions executable by a processor to cause a computing system to perform functions. The functions include receiving a first start input at the processor of the computing system. The functions include performing, by the computing system, a first base event in response to receiving the first start input. The functions include determining, by the processor, whether a first feature event trigger occurs during the first base event. If the first feature event trigger occurs during the first base event, then the processor resets a counter based on the first base event and switches the computing system to operate in a feature event state. If the first feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and begins monitoring for receiving a next start input. The computing system can perform at least one instance of the feature event while operating in the feature event state and then the processor begins monitoring for receiving the next start input.

In a fourth aspect, a computing system is provided. The computing system includes a processor and a computer-readable memory storing executable instructions. Execution of the executable instructions by the processor causes the computing system to perform functions. The functions include monitoring, with the computing system operating in a first state, the computing system for receiving a start input. The functions include switching, by the processor in response to receiving a first start input, the computing system to operate in a second state for playing a base event. The functions also include performing, by the computing system while operating in the second state, a first base event in response to receiving the first start input. The functions also include determining whether a first feature event trigger occurs during the first base event. The functions further include resetting the counter based on the first base event and switching the computing system to a feature event state if the first feature event trigger occurs during the first base event. The functions also include determining whether the counter meets a feature event threshold if the feature event trigger does not occur during the first base event. The functions further include resetting the counter based on the first base event and switching the computing system to operate in the feature event state if the processor determines the counter meets the feature event threshold, or incrementing the counter based on the first base event and switching the computing system to operating in the first state to begin monitoring for receiving a next start input if the processor determines the counter does not meet the feature event threshold. Additionally, the functions include performing at least one instance of the feature event while operating in the feature event state and then switching the computing system to operate in the first state to begin monitoring for receiving the next start input.

In a fifth aspect, a method is provided. The method includes monitoring, by a processor of a computing system operating in a first state, the computing system for receiving a start input. The method also includes switching, by the processor in response to receiving a first start input, the computing system to operate in a second state for playing a base event. The method further includes performing, by the computing system while operating in the second state, a first base event in response to receiving the first start input. The method also includes determining, by the processor, whether a first feature event trigger occurs during the first base event. If the first feature event trigger occurs during the first base event, then the processor resets a counter based on the first base event and switches the computing system to a feature event state. If the feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and switches the computing system to operating in the first state to begin monitoring for receiving a next start input. The computing system performs at least one instance of the feature event while operating in the feature event state and then the processor switches the computing system to operating in the first state to begin monitoring for receiving the next start input.

In a sixth aspect, a computer-readable memory is provided. The computer-readable memory has stored therein instructions executable by a processor to cause a computing system to perform functions. The functions include monitoring, with a computing system operating in a first state, the computing system for receiving a start input. The functions include switching, by the processor in response to receiving a first start input, the computing system to operate in a second state for playing a base event. The functions include performing, by the computing system while operating in the second state, a first base event in response to receiving the first start input. The functions also include determining, by the processor, whether a first feature event trigger occurs during the first base event. If the first feature event trigger occurs during the first base event, then the processor resets a counter based on the first base event and switches the computing system to a feature event state. If the feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and switches the computing system to operating in the first state to begin monitoring for receiving a next start input. The computing system can perform at least one instance of the feature event while operating in the feature event state and then the processor switches the computing system to operating in the first state to begin monitoring for receiving the next start input.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

Figure 1A:
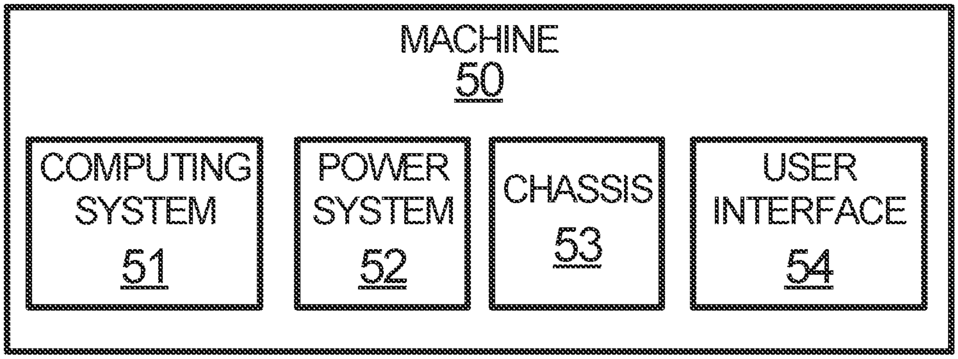
FIG. 1A is a block diagram of a machine, in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to performing aspects of an outcome event using a computing system (e.g., a server and/or a client computing system), a user device and/or a machine. The user device and/or the machine can be configured as and/or include a computing system. For purposes of this description, unless the context dictates otherwise, a user device or machine can include and/or be embodied as a computing system.

A computing system and/or a display screen of the computing system can display a variety of symbols during performance of an outcome event. A symbol displayed within a symbol-display-portion of the display screen during an outcome event can be replaced (upgraded) by another symbol. The replacement symbols can be used to determine an award for a winning outcome. A winning outcome can be based on symbols being displayed according to a pattern of symbols (e.g., a predefined pattern of symbols). The pattern can be defined as a payline of a line-type outcome event, or a payway of a ways-type outcome event. Unless the context of the specification dictates otherwise, an embodiment in which outcomes are based on paylines and/or a line-type outcome event, can instead be based on payways and/or a ways-type outcome event, and vice versa.

In a line-type outcome event, each payline is a pattern on reels or a matrix. The payline typically starts from a left-most reel and passes through adjacent reels until the payline reaches the right-most reel. The quantity of paylines active for a line-type outcome event can depend upon a payment and/or a selection made to perform the line-type outcome event.

In a ways-type outcome event, each payway includes a combination of matching symbols located on adjacent reels. The symbols can be in any position on one of the adjacent reel. As an example, for outcome events performed on a computing system having a display screen, the outcome events can be arranged with five reels and three rows such that there are 243 payways with three or more symbols possible. The quantity of payways active for a ways-type outcome event can depend upon a payment and/or selection made to perform the ways-type outcome event.

In accordance with the example embodiments, a pattern that results in an award can include a particular pattern that starts at either side of a symbol-display portion of a display (e.g., a left side or a right side). For example, in an embodiment in which the symbol-display portion includes a respective reel in five columns referred to as C1, C2, C3, C4, C5 as those columns are arranged from a left side of the symbol-display portion to a right side of the symbol portion, the particular pattern (e.g., a payline or payway) can include a pattern with a sufficient quantity and kind of symbols starting at column C1, or a pattern with a sufficient quantity and kind of symbols starting at column C5. For instance, if the sufficient quantity and kind of symbols equals three “K” symbols, then a pattern of “K” symbols in columns C1, C2, C3 or in columns C5, C4, C3 results in an award. Moreover, in some embodiments, a special symbol, such as a “Wild” symbol can take the place of the kind of symbol defined for the particular pattern. Other examples of the sufficient quantity and kind of symbols are possible.

Some of the described embodiments refer to multiple patterns (e.g., multiple particular patterns). In one respect, the multiple particular patterns can be multiple particular paylines. In another respect, the multiple particular patterns can be multiple particular payways. Moreover, a particular pattern can be a particular payline or a particular payway. Furthermore, a winning pattern can be a winning payline or a winning payway. Furthermore still, a horizontally extending pattern can be a horizontally extending payline or a horizontally extending payway. Similarly, a diagonally extending pattern can be a diagonally extending payline or a diagonally extending payway.

Moreover, displaying the symbols can include displaying an image of one or more reels or a matrix, together with animation effects to simulate a spin of the one or more reels, or a spin of the columns or rows of the matrix. A computer software program, which can reside in the computing system, can randomly select one or more symbols in response to a spin, and can display the selected one or more symbols on the display.

Additionally, an outcome event can be played over a computer-network, such as by a user using a client computing system that is connected to a server computing system over the computer-network. In this instance, the server computing system can cause the reels to spin and can send the resulting symbols to the client computing system for display.

Throughout this description, the articles “a” or “an” are used to introduce elements of the example embodiments. Any reference to “a” or “an” refers to “at least one” or “one or more,” and any reference to “the” refers to “the at least one” or “the one or more,” unless otherwise specified, or unless the context clearly dictates otherwise. The intent of using the conjunction “or” within a described list of at least two terms is to indicate any of the listed terms or any combination of the listed terms.

The use of ordinal numbers such as “first,” “second,” “third” and so on is to distinguish respective elements rather than to denote a particular order of those elements. For purpose of this description, the terms “multiple” and “a plurality of” refer to “two or more” or “more than one.”

Further, unless context suggests otherwise, the features illustrated in each of the figures can be used in combination with one another. Thus, the figures should be generally viewed as component aspects of one or more overall embodiments, with the understanding that not all illustrated features are necessary for each embodiment.

The systems, methods, and apparatus described in this description can carry out aspects of an outcome event that includes displaying symbols. These aspects can be incorporated into outcome events, in particular, outcome events performed in response to a payment. In one aspect, the systems, methods, and apparatus provide features that can enhance traditional outcome events (e.g., slot machines or other reel-type outcome events) by providing a user with additional opportunities to win the outcome event, thereby increasing the user's interest, anticipation, and excitement in connection with the outcome event. This can in turn benefit a casino or another entity that provides an outcome event with this feature. Indeed, outcome events are typically configured to have odds that favor the casino (sometimes referred to as the "house"). Accordingly, based on the law of averages, casinos often increase their profits simply by getting more users to use its computing system to perform more outcome events. Due to the provided features, users can be drawn in (e.g., from competing casinos that lack outcome events with such features), and they can play the outcome event often. The features can include data communications between a server computing system and a client computing system within a server-client based configuration.

II. Example Architecture

FIG. 1A is a block diagram of a machine 50 in accordance with the example embodiments. The machine 50 includes a computing system 51, a power system 52, a chassis 53, and/or a user interface 54. The machine 50 can be configured to perform a method or at least some functions of a method according to the example embodiments. In at least some embodiments, the computing system 51 can include at least a portion of one or more from among: the power system 52, the chassis 53, or the user interface 54.

The computing system 51 can include a processor and a memory storing program instructions executable by the processor to perform a method or at least some functions of a method according to the example embodiments. As an example, the computing system 51 can be arranged as and/or include components of any computing system described in this description and/or shown in the drawings. In particular, the computing system 51 can be arranged as and/or include components of a computing system 100 shown in FIG. 1B, a computing system 100*a* shown in FIG. 2, a computing system 100*b* also shown in FIG. 2, a computing system 800 shown in FIG. 8, or a computing system 900 shown in FIG. 9.

The power system 52 includes means for powering some portion of the machine 50, such as the computing system 51 and/or the user interface 54. The power system 52 can include a power supply, such as a battery, a generator, a fuel cell, or a solar cell, or some other type of power supply instead or in addition. The power system 52 can include a power circuit for distributing electrical power throughout the machine 50 where needed. The power system 52 can include a connector and/or connection for connecting to another power system, such as a power system within a building and/or a power system of an electrical utility company.

The chassis 53 includes means for supporting and/or protecting other aspects of the machine 50. As an example, the chassis 53 can include a rack for supporting at least portions of the computing system 51, the power system 52, and/or the user interface 54. As another example, the chassis 53 can include a housing in which at least portions of the computing system 51, the power system 52, and/or the user interface 54 reside.

The user interface 54 can include one or more user interface input components configured to receive and/or produce content (e.g., a signal, data, and/or information) based on some action of a user. That content can be provided to the computing system 51. The user interface 54 can include one or more user interface output components for outputting content. That content can be provided by the computing system 51. The user action can occur by use of the user interface 54.

In at least some embodiments, the user interface 54 includes a mechanical user interface input component, such as an arm, handle or lever located on a side of the chassis 53 similar to an arm, handle, or lever located on a mechanical slot machine. As an example, the mechanical user interface input component can be configured to input a spin request to the computing system 51.

In at least some embodiments, the user interface 54 includes an acceptor, such as a paper money acceptor, a coin acceptor, a token acceptor, a validator, and/or a card reader.

In at least some embodiments, the computing system 51 includes at least a portion of the user interface 54. As an example, in embodiments in which the computing system 51 is arranged like the computing system 100, the computing system 100*a*, or the computing system 100*b*, the user interface 54 can be arranged like the user interface 104, the user interface 104*a*, or the user interface 104*b*, respectively.

Figure 1B:
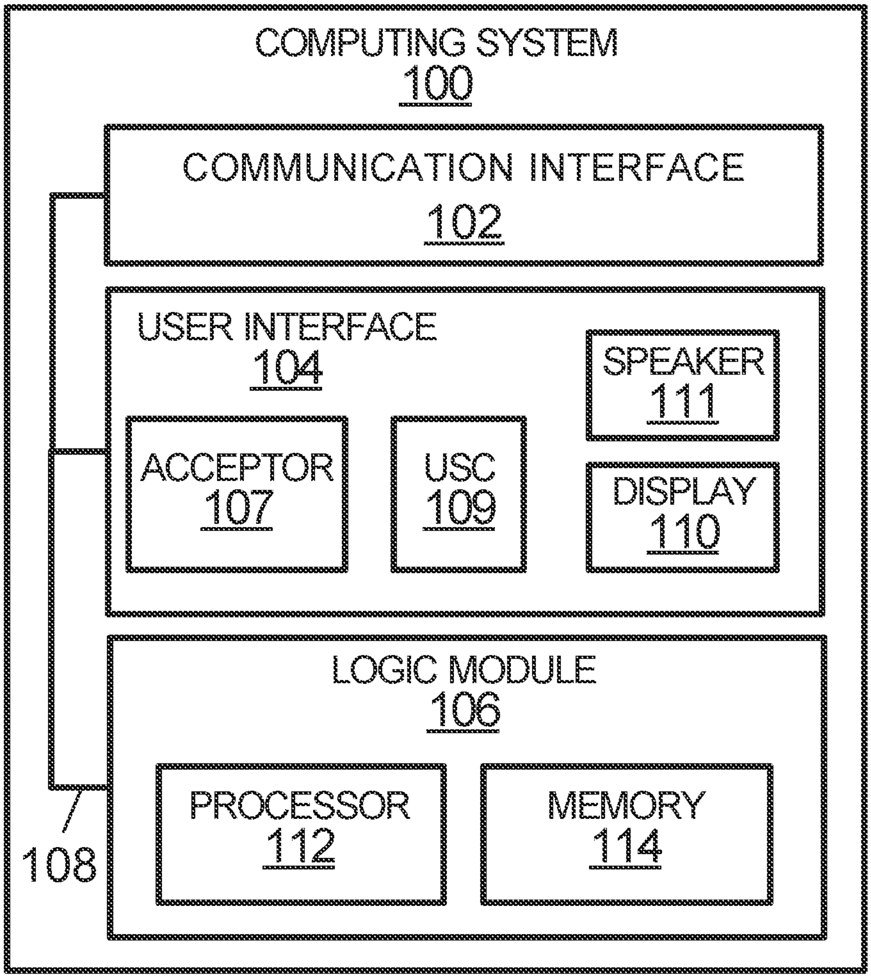
FIG. 1B is a block diagram of a computing system, in accordance with the example embodiments.

Next, FIG. 1B is a block diagram of a computing system 100 in accordance with the example embodiments. The computing system 100 can be arranged as and/or include a stand-alone computing system, a distributed computing system, a personal computer, a server computing system, a client computing system, a portable computing system, a mobile phone, a smartphone, a tablet device, or some other computing device. The computing system 100 can be referred to as a user device.

The computing system 100 can include a communication interface 102, a user interface 104, and a logic module 106, two or more which can be coupled together by a system bus, network, or other connection mechanism 108. The communication interface 102 can include a wired or wireless network communication interface. For purposes of this description, any data described as being provided, sent, or transmitted by the computing system 100 can be data sent by the communication interface 102 over a communication network. In addition, for purposes of this description, any data described as being received by the computing system 100 can be data sent to communication interface 102 over a communication network.

The user interface 104 includes components that can facilitate interaction with a user of the computing system 100. For example, the user interface 104 can include user interface output components, such as a display 110 and/or a speaker 111. As another example, the user interface can include user interface input components, such as an acceptor 107, a user-selectable control 109 (e.g., a keypad, a keyboard, or a mouse), or a touch-sensitive screen. The touch-sensitive screen can be part of the display 110, such that the display 110 is operable as both a user interface input component and a user interface output component. The user-selectable control 109 can include one or more user-selectable controls, one or more of which can be implemented on the touch sensitive screen (which can also be referred to as a touch pad).

The display 110 is configured to display (i.e., visually present and/or show) content. As an example, the content can correspond to an outcome event, such as a set of symbols selected for the outcome event, a matrix, a reel, a payline, a payway, an award, an instruction, or a user-selectable control (e.g., a button). As another example, the content can include text, a graphic, a GUI, an animation, a video, or some other content as well or instead. As yet another example, the content can include content shown in and/or described with respect to any of FIG. 6, FIG. 7, FIG. 8, FIG. 9, FIG. 10A, FIG. 10B, FIG. 10C, FIG. 10D, FIG. 10E, FIG. 10F, FIG. 10G, FIG. 11A, FIG. 11B, FIG. 11C, FIG. 11D, FIG. 11E, FIG. 11F, FIG. 11G, FIG. 12, FIG. 13, FIG. 14, FIG. 15, FIG. 16, FIG. 17, FIG. 18, FIG. 19 and/or FIG. 20. The display 110 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 110 and/or the display screen can include and/or be arranged as a liquid crystal display (LCD), a light emitting diode (LED) display, an organic LED (OLED) display, a plasma display or some other type of display. Furthermore, the display 110 can embody the touch sensitive screen noted above such that the display 110 and/or display screen includes and/or is arranged as a touch screen display.

The logic module 106 can include and/or be arranged as a processor 112 and/or a memory 114. The processor 112 can include a general-purpose processor (e.g., a microprocessor) or a special-purpose processor (e.g., a graphics process, a digital signal processor or an application specific integrated circuit) and can be integrated in whole or in part with the communication interface 102 or the user interface 104. Any memory discussed in this description or shown in the drawings can be referred to as a computer-readable memory, data storage, computer-readable data storage, among other names.

The memory 114 can include volatile or non-volatile storage components and can be integrated in whole or in part with the processor 112. The memory 114 can take the form of a non-transitory computer-readable medium and can include software program instructions, that when executed by the processor 112, cause the computing system 100 to perform one or more of the functions described herein. Any software program instructions discussed in this description or shown in the drawings can be referred to as computer-readable program instructions, or more simply, program instructions, or a software application. A set of program instructions (e.g., a portion of a software application) can be referred to as a module or a logic module.

Figure 10A:
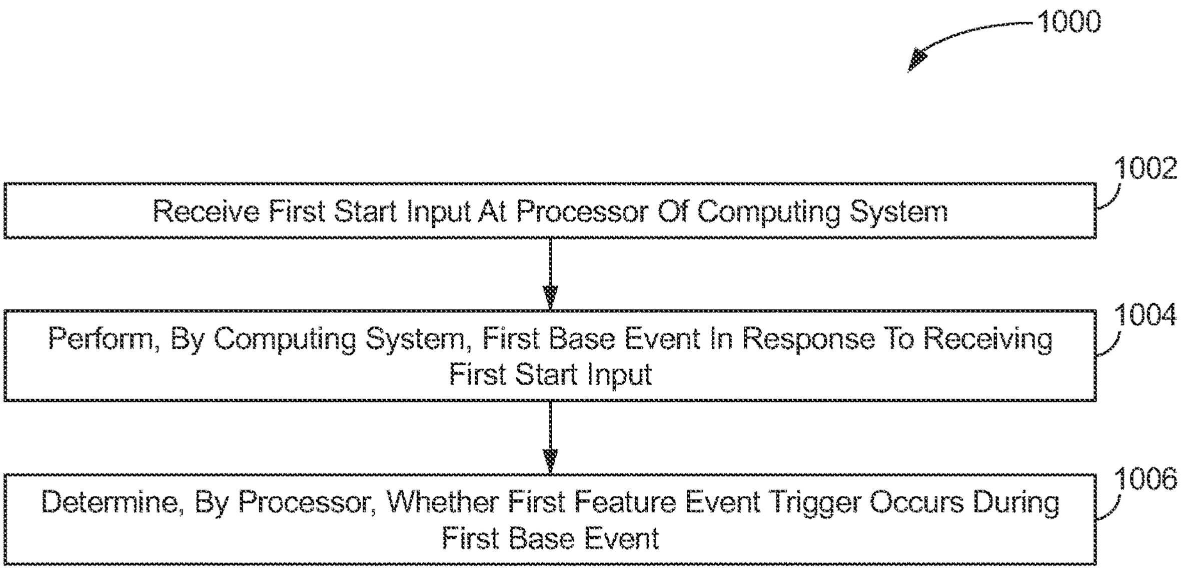
FIG. 10A is a flow chart showing functions of a method for reel-based events with guarantee feature, in accordance with the example embodiments.
Figure 10B:
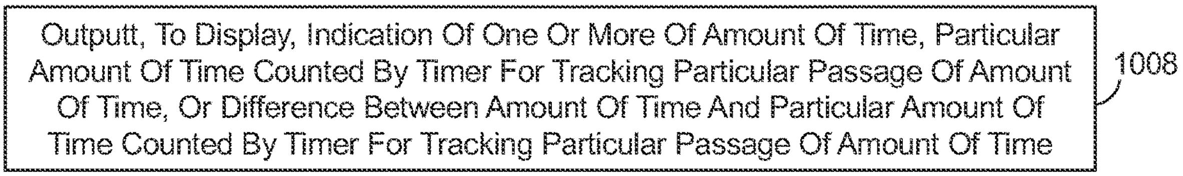
FIG. 10B, FIG. 10C, FIG. 10D, FIG. 10E, FIG. 10F, and/or FIG. 10G show additional functions corresponding the functions shown in FIG. 10A.
Figure 10C:
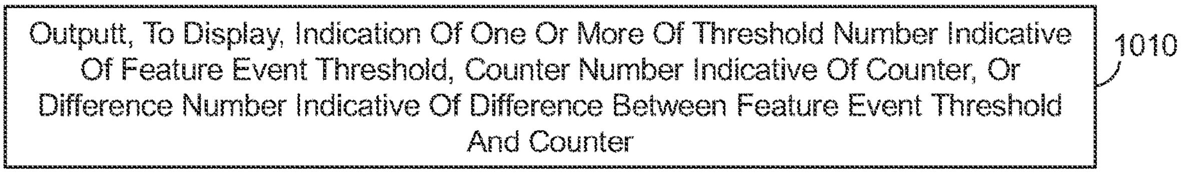
Figure 10D:
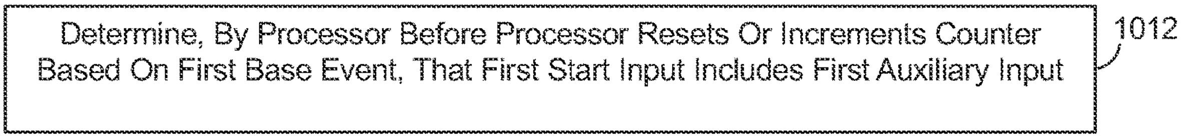
Figure 10E:
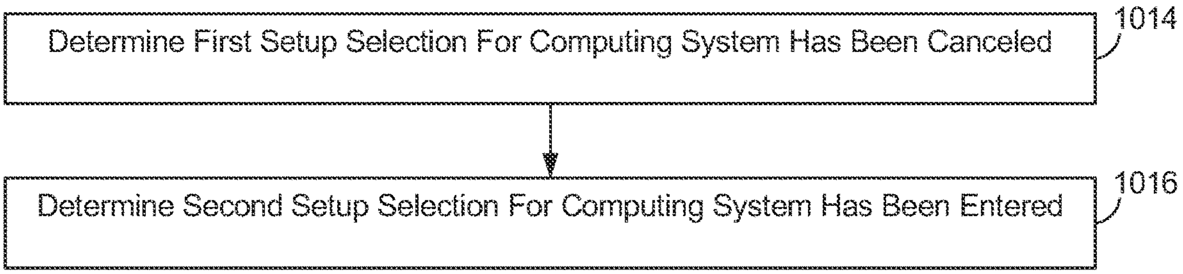
Figure 10F:
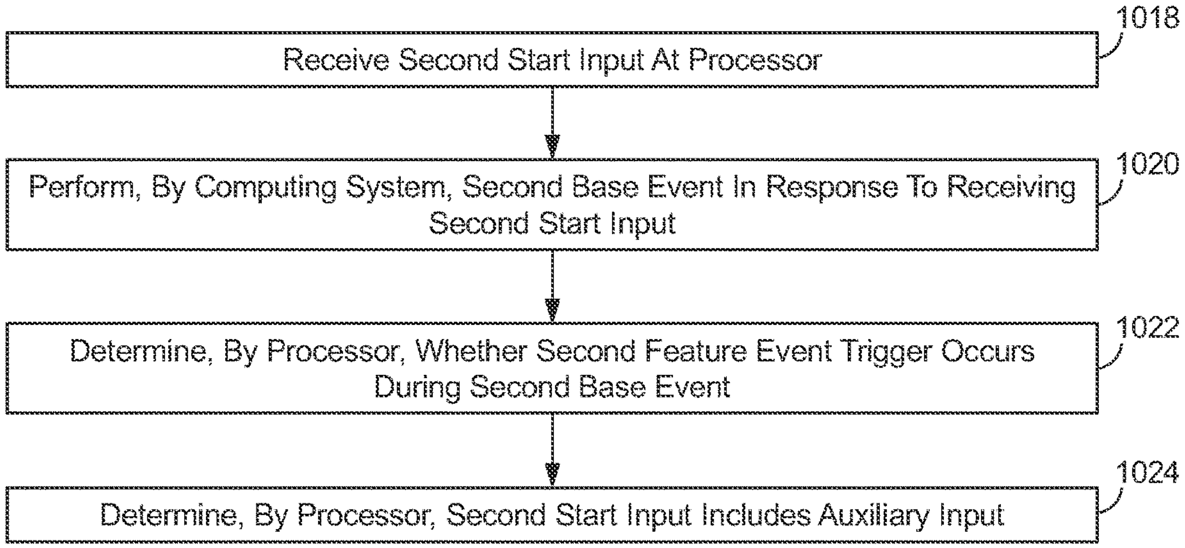
Figure 10G:
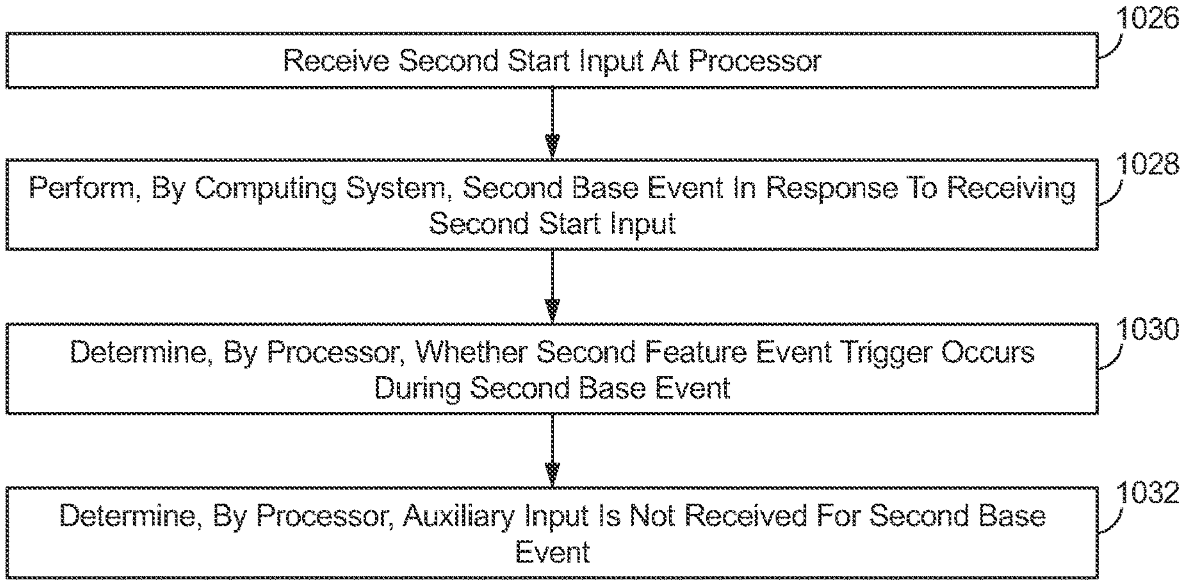
Figure 11A:
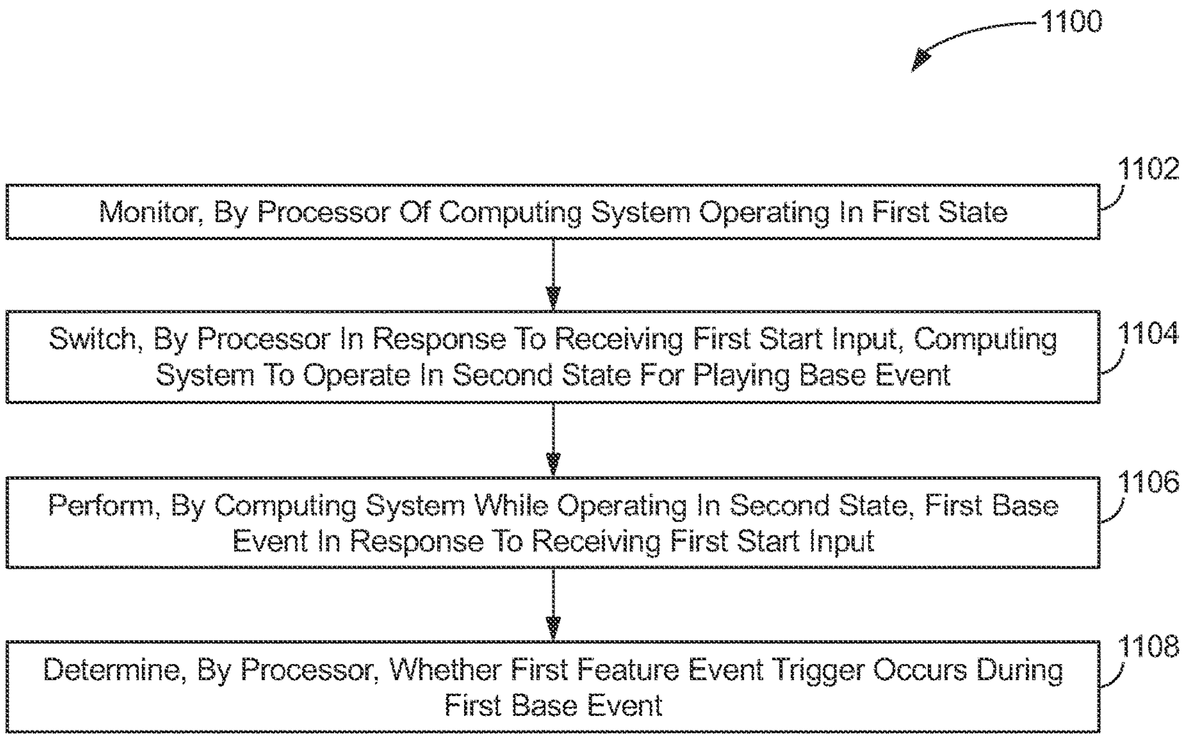
FIG. 11A is a flow chart showing functions of a method for reel-based events with guarantee feature, in accordance with the example embodiments.
Figure 11B:
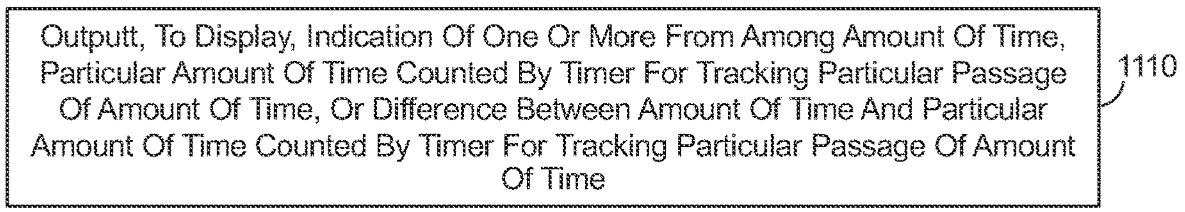
FIG. 11B, FIG. 11C, FIG. 11D, FIG. 11E, FIG. 11F, and/or FIG. 11G show additional functions corresponding the functions shown in FIG. 11A.
Figure 11C:
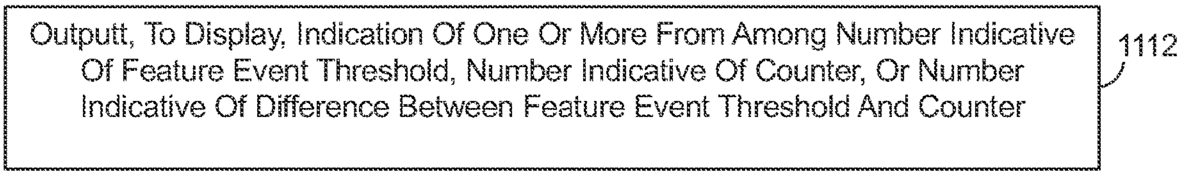
Figure 11D:
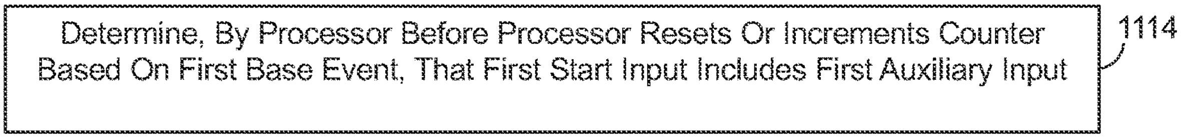
Figure 11E:
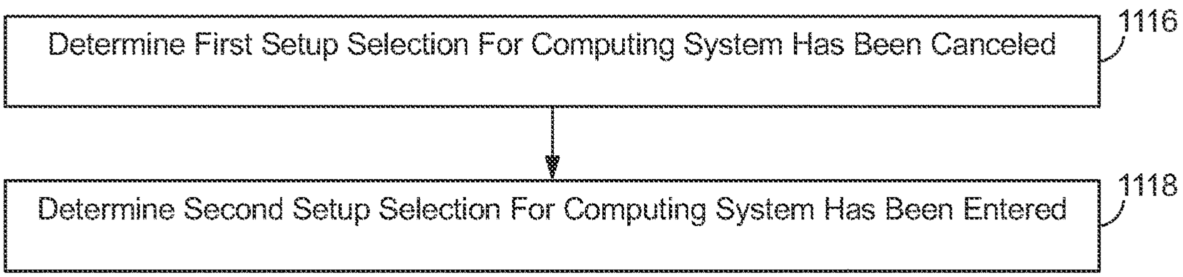
Figure 11F:
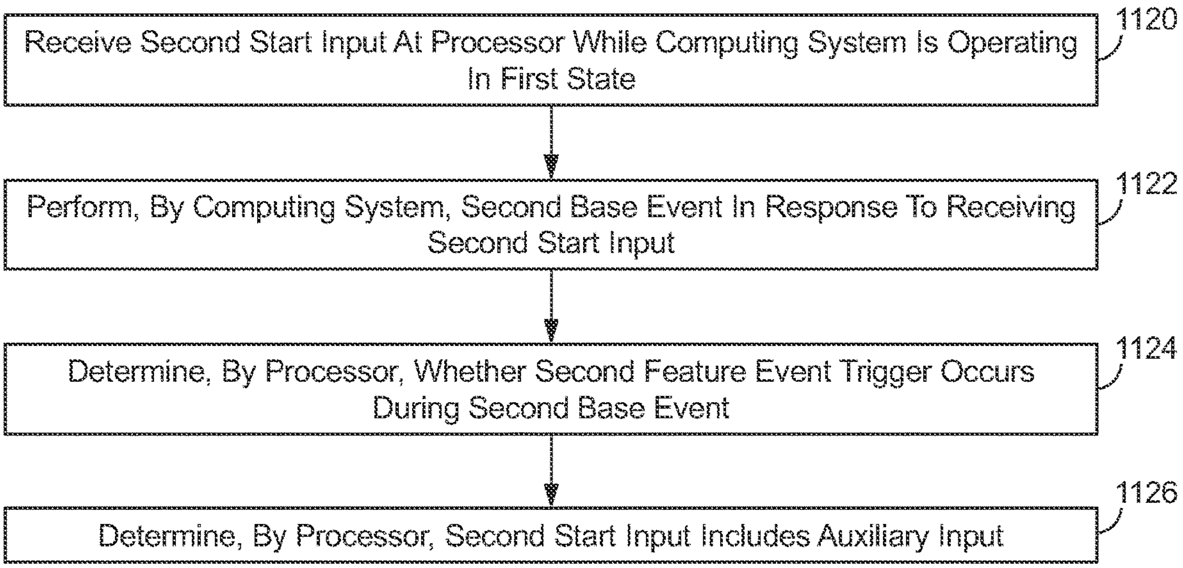
Figure 11G:
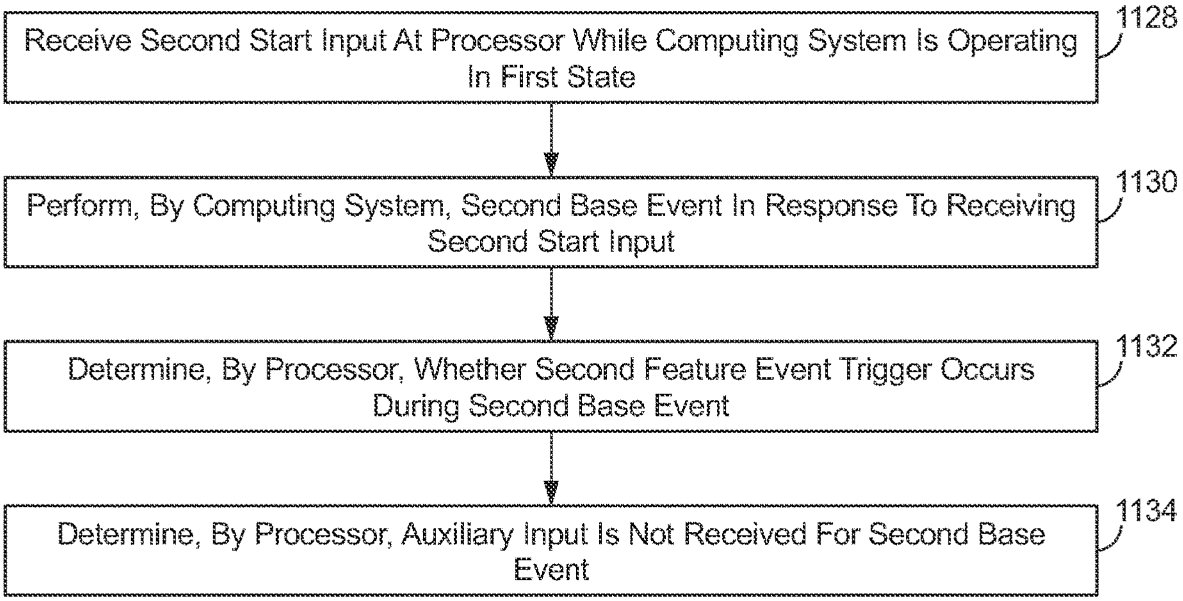

As an example, the program instructions can be executable by the processor 112 to perform a method, such as a method including one or more of the functions shown in FIG. 10A, FIG. 10B, FIG. 10C, FIG. 10D, FIG. 10E, FIG. 10F, FIG. 10G, FIG. 11A, FIG. 11B, FIG. 11C, FIG. 11D, FIG. 11E, FIG. 11F, and/or FIG. 11G.

As another example, the program instructions can be executable by the processor 112 to determine a payment has been received by the user interface 104 (e.g., by the acceptor 107) and thereafter allow an outcome to be output in response to an input entered via the user interface 104.

The memory 114 can also include operating system software on which the computing system 100 can operate. For example, the computing system 100 can operate on a Windows®-based operating system available from the Microsoft® Corporation of Redmond, Wash. Other examples of an operating system are possible.

The memory 114 can include a database. As an example, the memory 114 can include a credit account database containing data related to performing an outcome event by a computing system, as well as adjusting account balances (e.g., quantities of credits) associated with client computing systems. The processor 112 can write data into the database and read data within the database.

Figure 2:
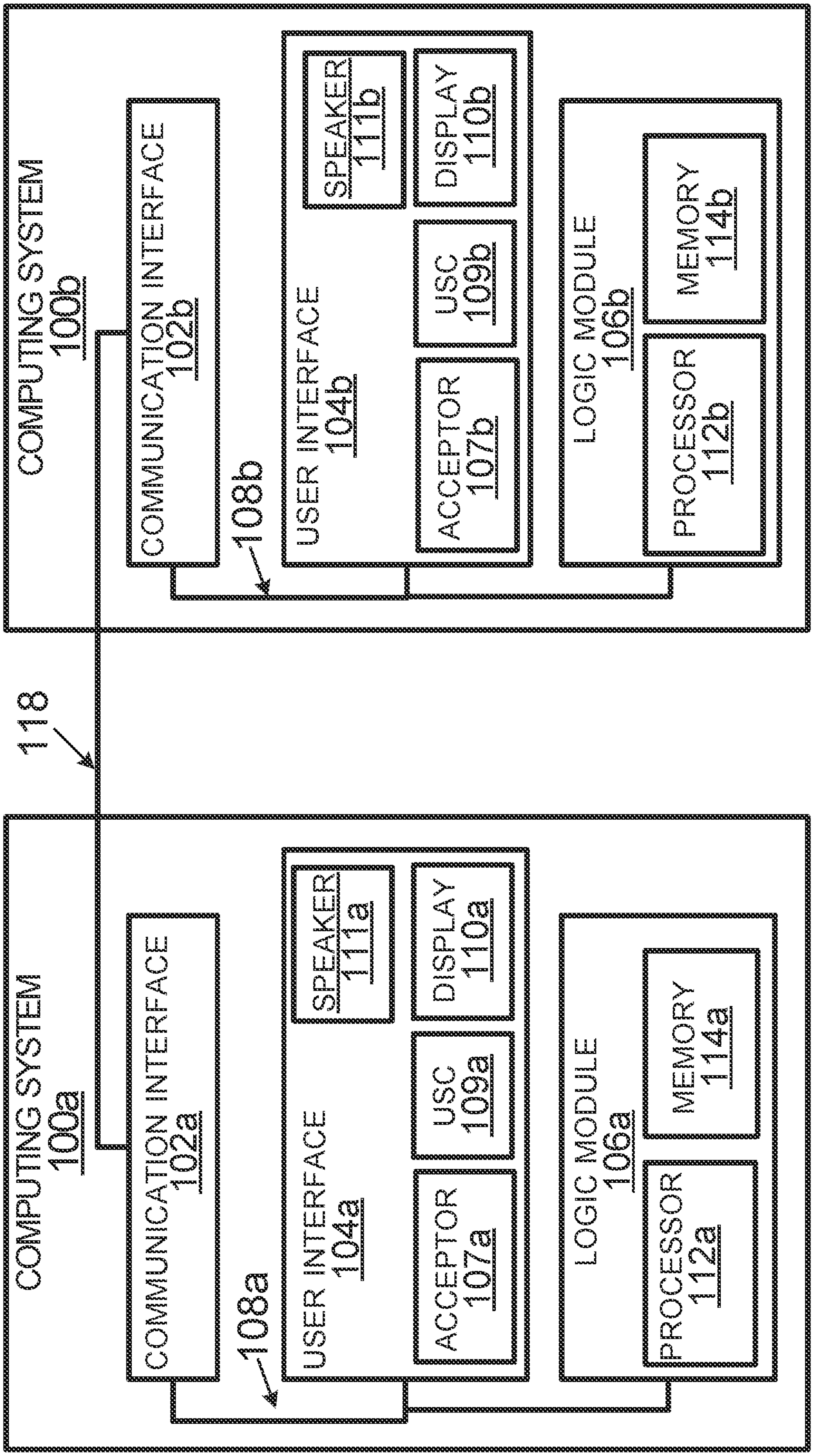
FIG. 2 is a block diagram of two computing systems connected to one another via a computer network, in accordance with the example embodiments.

FIG. 2 is a block diagram of a computing system 100*a* connected to a computing system 100*b* over a communication network 118. A configuration of elements including the computing system 100*a* and the computing system 100*b* can be referred to as a server-client based configuration.

The components of the computing system 100*a* and the computing system 100*b* are shown with corresponding "a" and "b" reference numerals (i.e., based on the computing system 100). For example, the computing system 100*a* includes a communication interface 102*a*, a user interface 104*a* (which includes an acceptor 107*a*, a user-selectable control 109*a*, a display 110*a*, and/or a speaker 111*a*), a logic module 106*a* (which includes a processor 112*a* and/or a memory 114*a*), and a communication bus 108*a*. Likewise, the computing system 100*b* includes a communication interface 102*b*, a user interface 104*b* (which includes an acceptor 107*b*, a user-selectable control 109*b*, a display 110*b*, and/or a speaker 111*b*), a logic module 106*b* (which includes a processor 112*b* and/or a memory 114*b*), and a communication bus 108*b*. In at least some embodiments, the acceptor 107*a* includes a validator, and the acceptor 107*b* includes a paper money acceptor, a coin acceptor, a validator, and/or a card reader.

The computing system 100*a* is configured to communicate with the computing system 100*b* over the communication network 118 (via the communication interface 102*a* and the communication interface 102*b*). Likewise, the computing system 100*b* is configured to communicate with the computing system 100*a* over the communication network 118. For purposes of this description, any data described as being sent or transmitted by the computing system 100*a* can include data sent by the communication interface 102*a* over the communication network 118. Similarly, any data described as being sent or transmitted by the computing system 100*b* can include data sent by the communication interface 102*b* over the communication network 118. Furthermore, for purposes of this description, any data described as being received by the computing system 100*a* can include data the computing system 100*a* receives from the communication network 118 using communication interface 102*a*. Similarly, any data described as being received by the computing system 100*b* can include data the computing system 100*b* receives from the communication network 118 using the communication interface 102*b*.

In at least some embodiments, the communication network 118 includes a local area network (LAN), such as a LAN located at least partially within a casino. In accordance with those embodiments, multiple instances of the computing system 100*b* dispersed throughout the casino can communicate with the computing system 100*a*. In some cases, the computing system 100*a* can be located within the casino. In some other cases, the computing system 100*a* can be located away from the casino.

In another example, the communication network 118 can include a wide-area network (WAN), such as an Internet network or a network of the World Wide Web. In such a configuration, the computing system 100*b* can communicate with the computing system 100*a* via a web site portal (for a virtual casino) hosted on the computing system 100*a*. The data described herein as being transmitted by the computing system 100*a* to the computing system 100*b* or by the computing system 100*b* to the computing system 100*a* can be transmitted as datagrams according to the user datagram protocol (UDP), the transmission control protocol (TCP), or another protocol, and/or a file (e.g., a hypertext transfer protocol file) or some other type of file or communication.

The communication network 118 can include any of a variety of network topologies and network devices. The communication network 118 can include a wireless and/or wired network topology and network devices operable on one or both of those network topologies. As an example, the communication network 118 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 100 can include the acceptor 107. In at least some embodiments, the acceptor 107 includes an acceptor of a physical item associated with a monetary value, such as a paper money acceptor, a coin acceptor, or a card reader. The acceptor 107 can include a validator configured to identify the physical item, and determine whether the physical item is suitable as payment to the computing system 100. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 100 can also physically dispense a corresponding award or payout (e.g., cash), or otherwise facilitate the payout (by adding funds to an electronic account associated with a customer card). Such an activity can be triggered by a cash out button either on the display 110 or elsewhere on the computing system 100. Additionally, or alternatively to determining the payout amount, the computing system 100 can perform other actions to award the user. For instance, the computing system 100 can display an indication of a tangible prize. Other types of awards can be used as well.

For purposes of this description, a function that can be performed by the computing system 100, the computing system 100*a*, or the computing system 100*b* can be performed, at least in part, by a processor of that computing system executing program instructions and/or a software application. Those program instructions and/or software application can be stored within the memory 114, 114*a*, or 114*b*, respectively.

The memory 114, 114*a*, and 114*b* can also store data. The memory 114, 114*a*, 114*b* can include a global symbol group for an outcome event that includes multiple symbols, such as a reel-based outcome event. As an example, the multiple symbols can include a wild symbol, an ace symbol, a king symbol, a queen symbol, a jack symbol, a ten symbol and/or a nine symbol. The ace, king, queen, jack, ten and nine symbols can represent symbols found on a standard deck of playing cards. The wild symbol can have special properties that allow it to form winning combinations with other symbols. In at least some embodiments, an "A" symbol represents the ace symbol, a "K" symbol represents the king symbol, a "Q" symbol represents the queen symbol, a "J" symbol represents the jack symbol, a "10" symbol represents the ten symbol, and a "9" symbol represents the nine symbol. Other examples of symbols within the global symbol group are possible.

In at least some embodiments, the symbol group generally has a "hierarchy", which can define different values for at least some of the symbols. For example, a winning pattern including three lower-value symbols (e.g., a "9" symbol) will have a lower value than a winning pattern with three higher-value symbols (e.g., a "10" symbol).

However, such a global symbol group can be customized with particular symbols as desired. As some possible examples, the symbols can include images of people, animals, dinosaurs, fanciful creatures, cartoon characters, inanimate objects, or other things in addition to or instead of wild, ace, king, queen, jack, ten or nine symbols. Furthermore, wild symbols can vary in design. The global symbol group can be represented as a table (or other data structure) stored in the memory 114.

A memory can include one or more memories. For example, a memory can include the memory 114. As another example, a memory can include the memory 114*a* and the memory 114*b*. In accordance with this latter example, a memory can be arranged as a distributed memory. One or more processors can be operatively coupled to a memory. For example, the processor 112 is operatively coupled to the memory 114. As another example, the processor 112*a* is operatively coupled to the memory 114*a*, and the processor 112*b* is operatively coupled to the memory 114*b*. In accordance with this latter example, a processor can be arranged as a distributed processor.

Figure 3A:
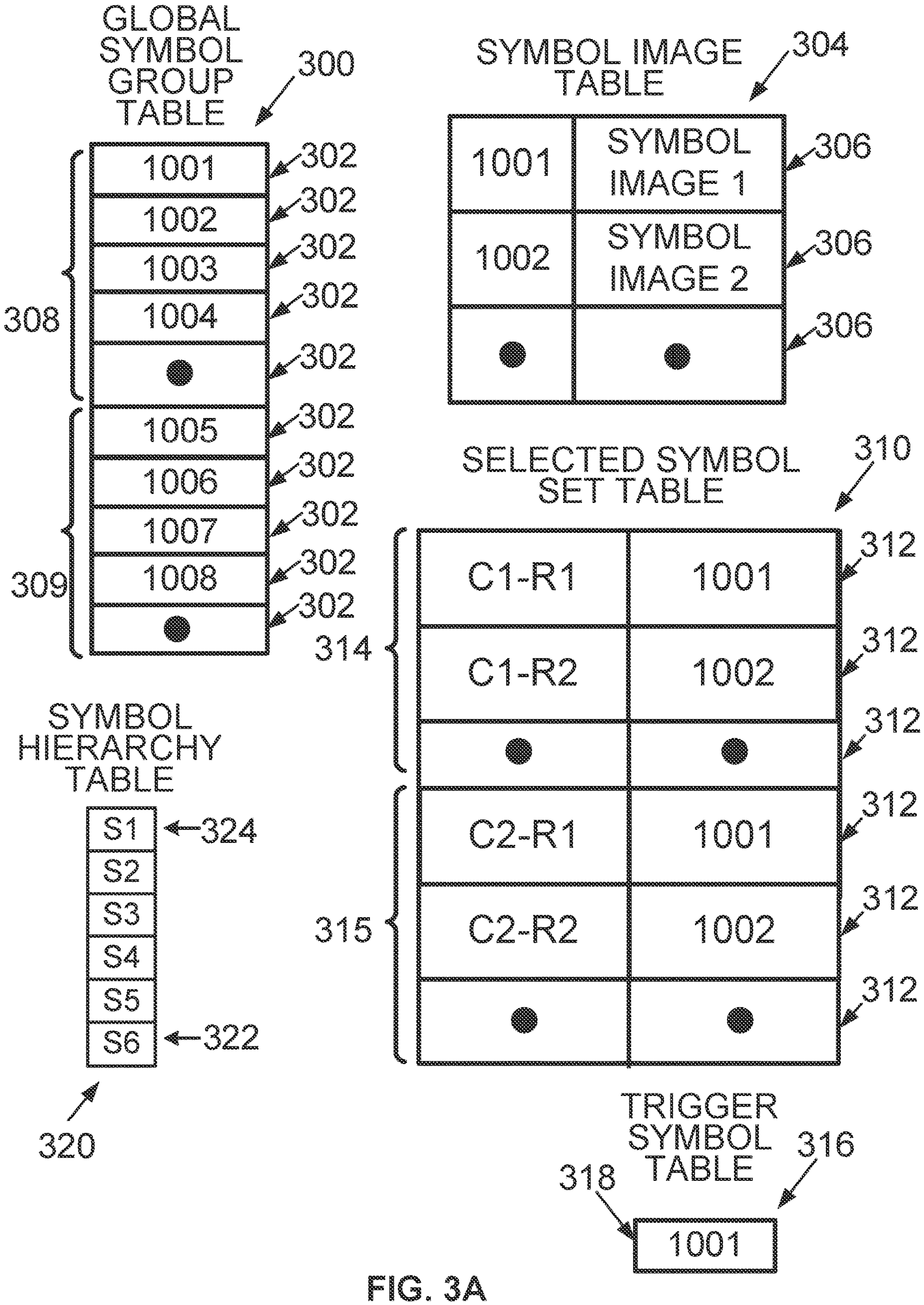
FIG. 3A and FIG. 3B show data that can be stored in a memory in accordance with the example embodiments.

Next, FIG. 3A shows data that can be stored in a memory (e.g., the memory 114, 114*a*, 114*b*) in accordance with the example embodiments. In particular, FIG. 3A shows a global symbol group table 300 in accordance with the example embodiments. The global symbol group table 300 includes multiple records 302 (e.g., the data in each row of the global symbol group table 300). Each record in the global symbol group table 300 can include a numeric or alpha-numeric identifier that represents a particular symbol. In one example, the global symbol group, and therefore the global symbol group table 300, can be divided into multiple sub-groups (e.g., a sub-group 308, 309).

Figure 5:
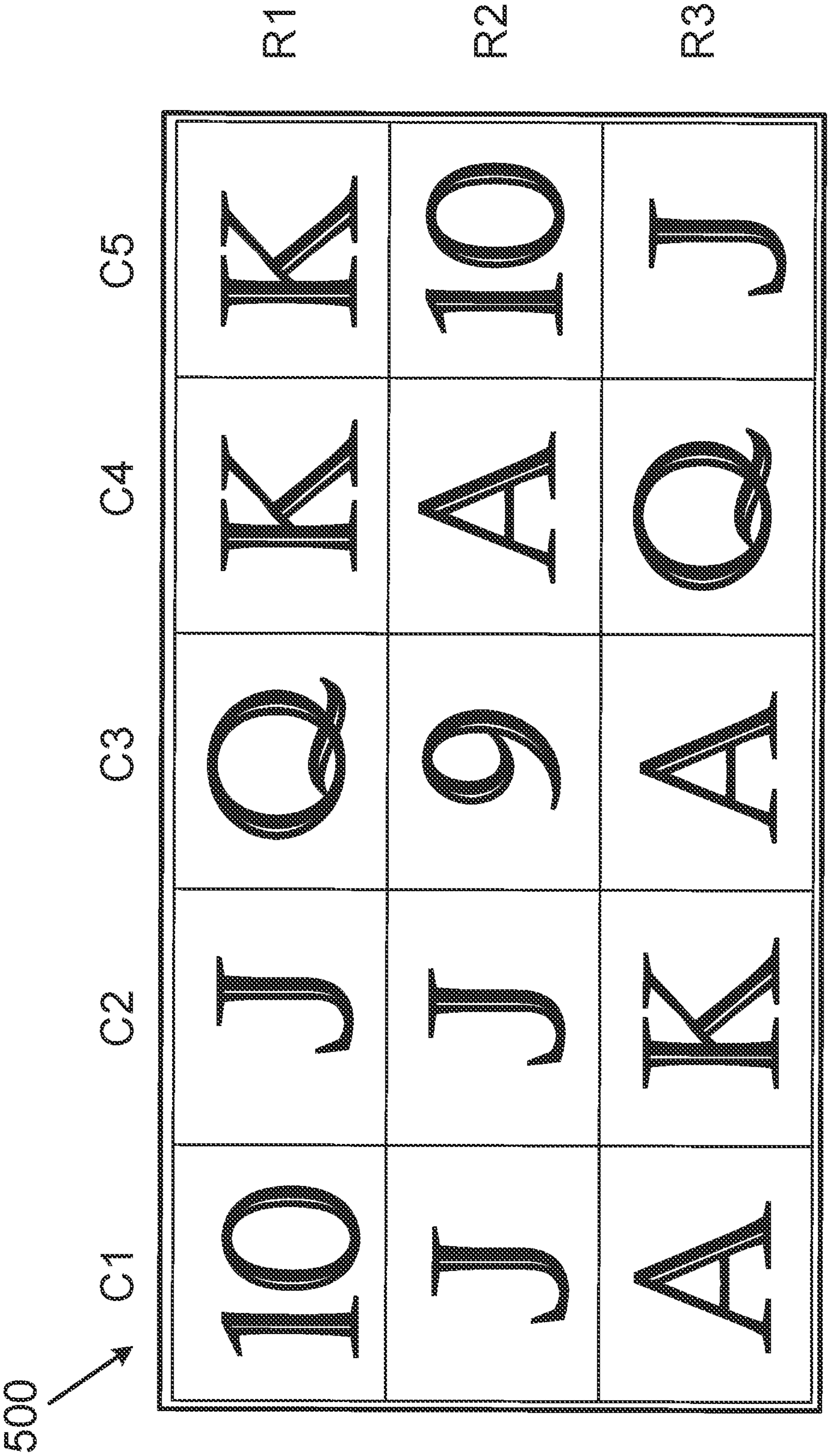
FIG. 5 depicts a selected symbol set in a display, in accordance with the example embodiments.

The global symbol group table 300 can be used in connection with a symbol image table 304. The symbol image table 304 includes multiple records 306 (shown as distinct rows of the symbol image table 304), each including an identifier that represents a particular symbol, and a corresponding displayable image. As such, the symbol image table 304 can be used to map an identifier in the global symbol group table 300 to a displayable image. Such an image can be arranged according to the Joint Photographic Experts Group (JPEG), Graphics Interchange Format (GIF), or Portable Network Graphics (PNG) encodings, for example. As an example, the image can include a representation of a symbol from a playing card in a typical deck of playing cards, such as a "9" symbol, a "10" symbol, a "J" symbol, a "Q" symbol, a "K" symbol, and an "A" symbols, examples of which are shown in FIG. 5. Other examples of symbols are also possible.

During the course of an event, various symbol sets can be selected for display. Each selected symbol set can be stored in a table such as a selected symbol set table 310. The selected symbol set table 310 includes multiple records 312 (shown as distinct rows in selected symbol set table 310), each record including a symbol position of the symbol, and an identifier that represents the symbol. As such, each symbol in the selected symbol set can correspond to a respective symbol position in a display arrangement (e.g., both a column number and a row number in a column-and-row arrangement). As an example, C1-R1, shown in the selected symbol set table 310, represents a symbol position at column 1 (e.g., a left-most column of multiple columns in a symbol-display-portion of display 110) and row 1 (e.g., a top row of multiple rows in a symbol-display-portion of the display 110). The column identifiers in the selected symbol set table 310 (e.g., C1 and C2) can refer to columns in a symbol matrix or reels of multiple reels that can be spun.

Portions of the multiple records 312 can be grouped into a respective subset of symbol records. As an example, a subset of symbol records can include all the symbol records for a particular column or reel in a matrix. For instance, a subset 314 of symbol records can include all the symbol records for column C1 and/or a corresponding reel, and a subset 315 of symbol records can include all of the symbol records for column C2 and/or a corresponding reel. A person having ordinary skill in the art will understand that the global symbol group table 300 can include more than two subsets of symbol records, and the subsets of symbol records can correspond to an aspect other than a particular column (e.g., a particular row).

In accordance with the example embodiments, the computing system 100 can select a symbol set for outputting on the user interface 104 by iterating through each record 312 in the selected symbol set table 310. As an example, for each symbol position in the selected symbol set table 310 (i.e., each symbol position in the left-most column of the selected symbol set table 310), the processor 112 can determine a symbol identifier from among the symbol identifiers in the global symbol group table 300. In at least some embodiments, the symbol identifiers are numbers and the processor 112 uses a random number generator to determine numbers in the global symbol group table 300 to associate with each symbol position in the selected symbol set table 310. Other examples of how the computing system 100 and/or the processor 112 randomly determine symbols for the selected symbol set table 310 are also possible.

In at least some embodiments, the computing system 100 determines each symbol of the selected symbol set table 310 by randomly selecting any symbol from within the selected symbol set table 310.

In at least some other embodiments, the computing system 100 determines each symbol of the selected symbol set table 310 by randomly selecting each symbol for each subset of symbol records (e.g., the subset 314, 315 of symbol records) from a corresponding sub-group within the global symbol group table 300. For example, the computing system 100 can determine the symbols for the subset 314 of symbol records by randomly selecting symbols from the sub-group 308 and determine the symbols for the subset 315 of symbol records by randomly selecting symbols from the sub-group 309.

In at least some embodiments, the computing system 100 can first determine the symbols within the selected symbol set table 310 from the global symbol group table 300 and then determine a symbol position for each of those symbols. Determining the symbol position for a symbol can include the computing system 100 randomly selecting a symbol position from among multiple remaining, unassigned symbol positions and assigning the selected symbol position to one of the predetermined symbols. As an example, selecting the symbol position for an embodiment in which the display arrangement is a column-and-row arrangement can include the computing system 100 randomly determining a column identifier and a row identifier (from a set of remaining, unassigned column and row identifier combinations) for each of the predetermined symbols until there is only one remaining, unassigned column and row identifier. A last predetermined symbol would then be assigned to correspond to the one remaining, unassigned column and row identifier. As another example, selecting the symbol position for an embodiment in which the display arrangement is specified using symbol position identifiers (e.g., whole number 1 through 15, inclusive) can include the computing system 100 randomly determining a symbol position identifier (from a set of remaining, unassigned symbol position identifiers) for each of the predetermined symbols until there is only one remaining, unassigned symbol position identifier. A last predetermined symbol would then be assigned to correspond to the one remaining, unassigned symbol position identifier.

In accordance with embodiment in which a column and row arrangement is used to simulate reels, the computing system 100 can display each subset of selected symbols in a corresponding column. As an example, the computing system 100 can superimpose each subset of selected symbols over a virtual reel in a corresponding column. Thus, a sub-group 308, 309 can represent an ordering of symbols on a particular reel.

As another example, the memory can contain a symbol hierarchy table 320. The symbol hierarchy table 320 can include an ordered list of symbols. The ordered list of symbols can include at least a portion of the symbols within global symbol group table 300. As shown in FIG. 3A, the symbol hierarchy table 320 includes a symbol S1, S2, S3, S4, S5, S6 arranged in an order from a first symbol 322 (i.e., symbol S6) to a final symbol 324 (i.e., symbol S1). A person having ordinary skill in the art will understand that the symbol hierarchy table 320 includes a different quantity of symbols. In accordance with at least some implementations, symbol S6 can be a "9" symbol, symbol S5 can be a "10" symbol, symbol S4 can be a "J" symbol, symbol S3 can be a "Q" symbol, symbol S2 can be a "K" symbol, and symbol S1 can be an "A" symbol.

FIG. 3A also shows a trigger symbol table 316. The trigger symbol table 316 can include an identifier 318 of one or more symbols a processor uses to determine whether a feature event has been triggered. As an example, the identifier 318 can include an identifier of a diamond symbol or some other symbol a processor uses to determine whether a feature event that uses a free spin bonus round has been triggered by the symbol represented by the identifier 318 landing within a symbol-display-portion of a display. A feature event trigger determination module 812 shown in FIG. 8, or a feature event trigger determination module 914 shown in FIG. 9, can refer to the trigger symbol table 316 and/or the identifier 318 during its execution by a processor.

Figure 3B:
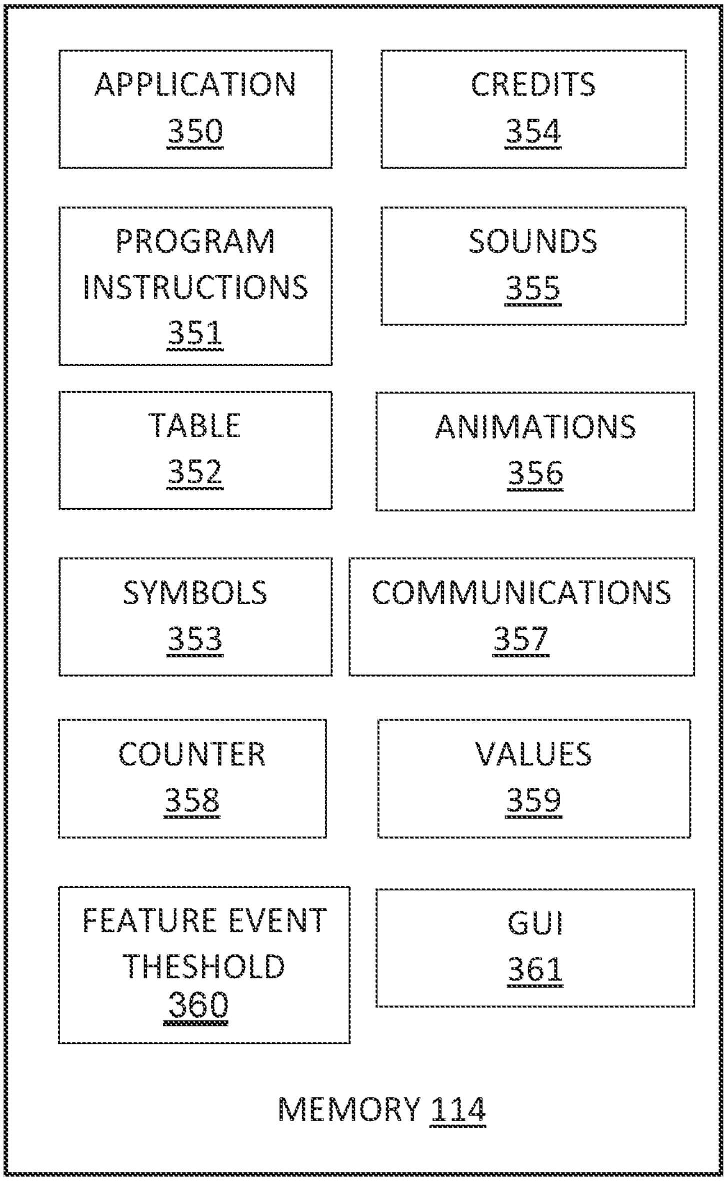

Next, FIG. 3B shows the memory 114 and data that can be stored in the memory in accordance with the example embodiments. The memory 114*a*, 114*b* can contain at least some of the data stored in the memory 114. Likewise, an electronic storage 824 shown in FIG. 8 and/or the electronic storage 928 shown in FIG. 9 can contain at least some of the data stored in the memory 114. In at least some embodiments, at least a portion of the memory 114 is embodied as a data register within the processor 112. The memory 114, 114*a*, 114*b* and/or the electronic storage 824, 928 can include data other than the example data shown in FIG. 3B.

As shown in FIG. 3B, the memory 114 can include an application 350, program instructions 351, a table 352, symbols 353, credits 354, sounds 355, animations 356, communications 357, a counter 358, values 359, a feature event threshold 360, or a GUI 361.

The application 350 can include any software application discussed in this description. The application 350 can also include an operating system, such as any operating system described in this description.

Figure 8:
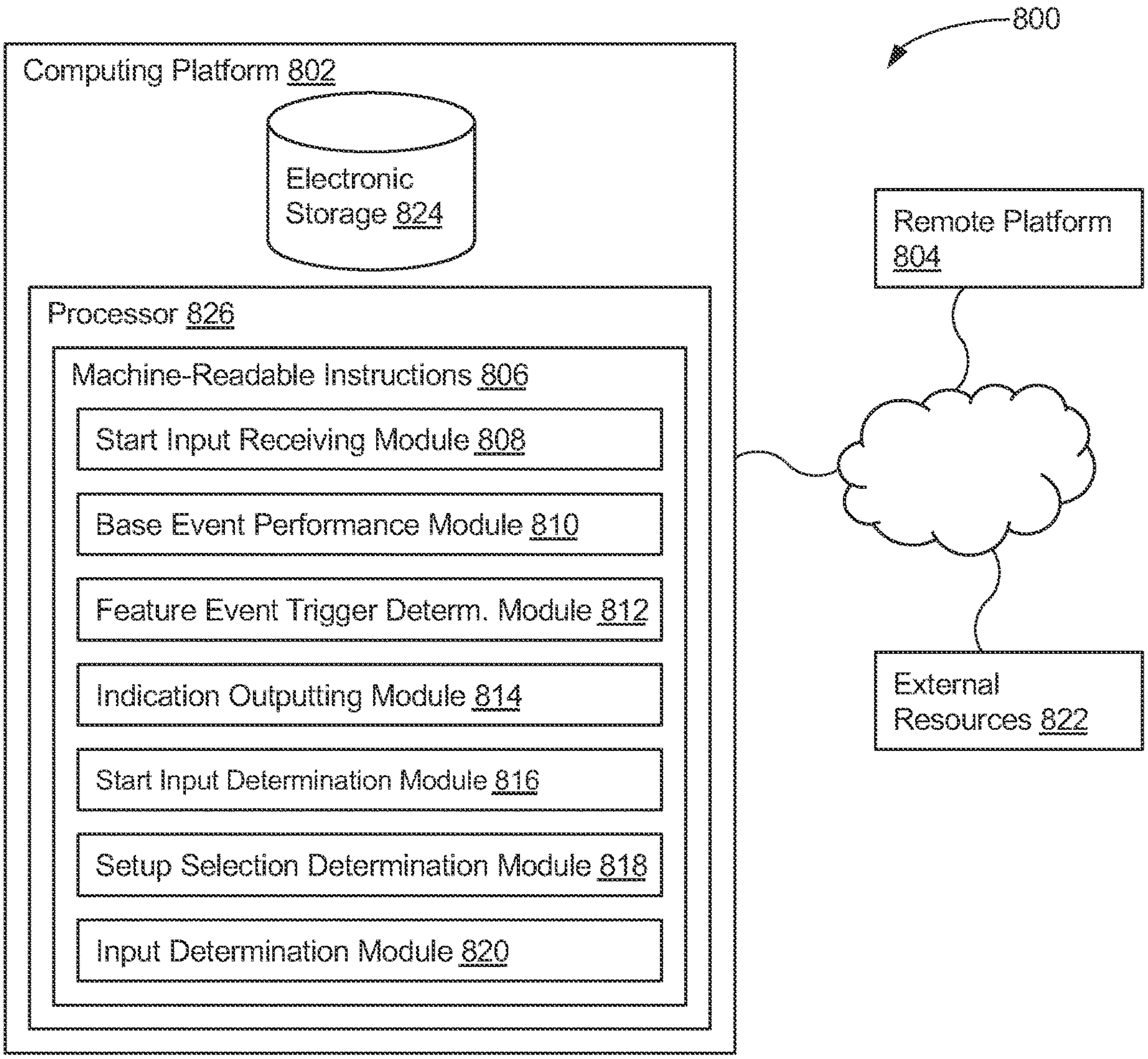
FIG. 8 is a block diagram of a computing system configured for reel-based events with guarantee feature, in accordance with the example embodiments.
Figure 9:
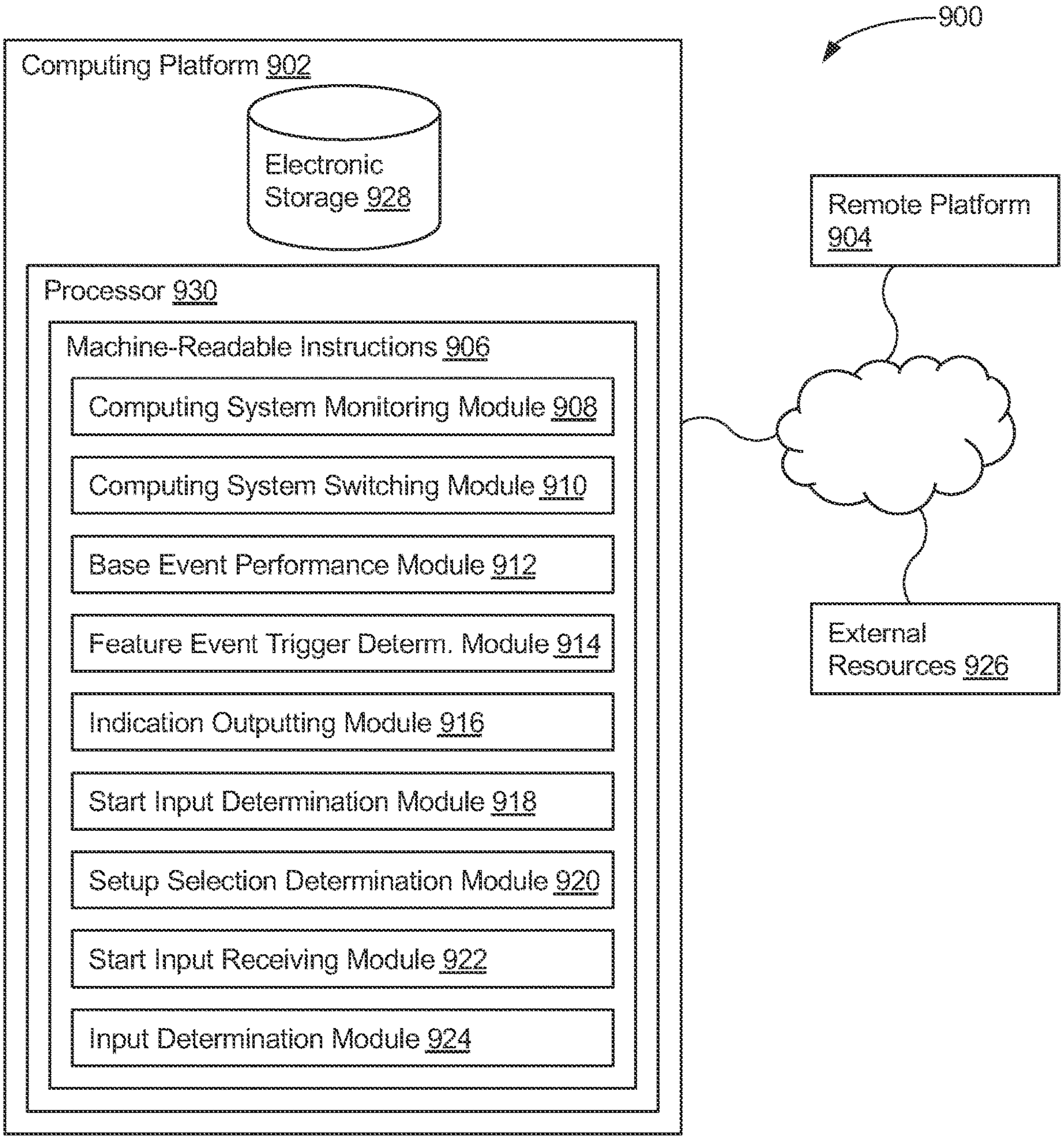
FIG. 9 is a block diagram of a computing system configured for reel-based events with guarantee feature, in accordance with the example embodiments.

The program instructions 351 are computer-readable program instructions (e.g., machine-readable instructions or processor-readable instructions) executable by one or more processors. The program instructions 351 can be executable to cause a computing system or a component of the computing system to perform any function described in this description. The program instructions can include the application 350. The program instructions 351 can include one or modules. As an example, the modules of the program instructions 351 can include one or more from among a start input receiving module 808, a base event performance module 810, a feature event trigger determination module 812, an indication outputting module 814, a start input determination module 816, a setup selection determination module 818, or an input determination module 820. Each of those modules is shown in FIG. 8. As another example, the modules of the program instructions 351 can include one or more from among a computing system monitoring module 908, a computing system switching module 910, a base event performance module 912, a feature event trigger determination module 914, an indication outputting module 916, a start input determination module 918, a setup selection determination module 920, a start input receiving module 922, or an input determination module 924. Each of those modules is shown in FIG. 9.

The table 352 can include one or more tables, such as one or more tables shown in FIG. 3A. In at least some embodiments, the memory 114 can contain any data described as being stored in a table in some manner other than a table. As an example, the memory 114 can store program instructions that include data described as being contained in a table. As another example, the table 352 can include a pay table that indicates awards that can be earned based on, for example, a start input (e.g., a main wager), an auxiliary input (e.g., a side wager), and symbols displayed on a payline or a payway.

The symbols 353 can include computer-readable data a processor can read to generate a symbol on a display screen, a graphical display unit, a graphical display interface, or GUI. As an example, the symbols 353 can include a respective computer-readable file (e.g., a bitmap file) for each symbol. As another example, the symbols 353 can include a computer-readable file a processor can read to generate any symbol discussed in this description and/or shown in the drawings, such as a “9” symbol, a “10” symbol, a “J” symbol, a “Q” symbol, a “K” symbol, or an “A” symbol (examples of which are shown in FIG. 5). A table, such as the symbol image table 304, can include an index value (e.g., a numerical identifier or a file name) corresponding to a symbol in the symbols 353.

The credits 354 can include a number of credits available for a user of a computing system. The number of credits can be referred to as a credit value. If the credits 354 are stored in the memory 114, 114*a*, 114*b* or the electronic storage 824, 928, the credits can include a number of credits available for a user of the computing system 100, 100*a*, 100*b*, 800, 900. A processor can update the credits available for each user based on payments entered at a computing system by that user, awards earned by use of the computing system by that user, and/or by use of an acceptor and/or validator. The credit value and/or the token value can be output on the display 110, 110*a*, 110*b*. The credit value can be based upon a quantity of coins, tokens, and/or bills entered using an acceptor.

The sounds 355 include audio files (e.g., an audio clip) that the processor 112 can output to a speaker. Outputting an audio file can include outputting a signal that produces a particular sound when the signal passes through a speaker. As an example, the particular sound can include a first particular sound to play when reels are spinning on the display 110*b* or a second particular sound to play when symbols are being upgraded between outcome events. As another example, the sounds 355 can include an audio file, such as an audio file with one of the following file name extensions: WAV, MP3, MP4, WMA, or some other file name extension.

Each sound in the sounds 355 can correspond to an index value such that the processor 112*a* can provide the processor 112*b* with an instruction including a particular index value so that the processor 112*b* outputs via the speaker 111*b* an audio file corresponding to the particular index value. Accordingly, the processor 112*a* does not have to transmit the audio file to the processor 112*b* each time the audio file is to be output via the speaker 111*b*.

The animations 356 can include computer-readable files containing animations on a display, such as the display 110, 110*a*, 110*b*. As an example, the animations 356 can include animation files, such as an animation file with one of the following file name extensions: GIF, PNG, JPEG, SVG, or some other file name extension. Each animation in the animation 356 can correspond to an index value such that the processor 112*a* can provide the processor 112*b* with an instruction including a particular index value so that the processor 112*b* outputs via the display 110*b* an animation file corresponding to the particular index value. Accordingly, the processor 112*a* does not have to transmit the animation file to the processor 112*b* each time the animation file is to be output via the display 110*b*.

In at least some embodiment, an animation of the animations 356 is an entire graphical display output on display 110, 110*a*, 110*b*. In at least some other embodiments, an animation of the animations 356 is a portion of a graphical display output on display 110, 110*a*, 110*b*. Moreover, in at least some of those latter embodiments, multiple animations of the animations 356 are respective portions of a graphical display output on display 110, 110*a*, 110*b*.

The communications 357 include one or more communications, such as one or more from among: a communication sent by the processor 112 coupled to the memory 114, a communication generated for transmitting by the processor 112 coupled to the memory 114, or a communication received by the computing system 100. As an example, for embodiment in which the communications 357 are stored in the memory 114*a*, the communications 357 can include a communication sent by the processor 112*a* to the computing system 100*b*, a communication generated for transmitting by the processor 112*a* coupled to the computing system 100*b*, or a communication received by the computing system 100*a*. As another example, for embodiment in which the communications 357 are stored in the memory 114*b*, the communications 357 can include a communication sent by the processor 112*b* to the computing system 100*a*, a communication generated for transmitting by the processor 112*b* coupled to the computing system 100*b*, or a communication received by the computing system 100*b*.

The counter 358 can include one or more counters. The one or more counters can include one or more counters for one or more different users of a computing system 100, 100*a*, 100*b*, 800, 900. As an example, the one or more different users can include a user A, a user B, and a user C. In accordance with the example one or more users, the counter 358 can include one counter for the user A, because the user A uses the computing system to play a single type of base event on the computing system using start inputs associated with a common value (e.g., ten credits).

In accordance with the example one or more users, the counter 358 can include two counters for the user B, because the user B uses the computing system to play a single type of base event on the computing system using start inputs associated with one of two different values (e.g., five credits or ten credits). A first of the counters for the user B can count how many base events are performed since a feature event has been triggered for the user B during a base event initiated from a start input associated with five credits, and a second of the counters for the user B can count how many base events are performed since a feature event has been triggered for the user B during a base event initiated from a start input associated with ten credits.

In accordance with the example one or more users, the counter 358 can include two counters for the user C, because the user C uses the computing system to play two different types of base event on the computing system. A first of the counters for the user C can count how many base events of the first type are performed since a feature event has been triggered for the user C during a base event of the first type, and a second of the counters for the user C can count how many base events of the second type are performed since a feature event has been triggered for the user C during a base event of the second type. If the user C changes an amount associated with the start inputs associated with the first type of base event or the second type of base event, the computing system can add another counter for user C to count how many base events of the that type (associated with the changed amount) are performed since a feature event has been triggered for the user C during a base event of the that type (associated with the changed amount).

As another example, one or more counters of the counters 358 can include a counter of time (i.e., a timer). In accordance with that example, the counter of time can be associated with a user of the computing system (e.g., the user A, the user B, the user C, or a user D). In some implementations, a counter of time can count down from a predetermined time (e.g., thirty minutes) down to zero. In some implementations, a counter of time can count up from zero to a predetermined time (e.g., thirty minutes). Other examples of a start time and/or end time of a counter of time are also possible. The computing system can reset a counter for a particular user when a feature event is triggered during a base event for the user.

The values 359 can include one or more values determined by a computing system. As an example, the values 359 values determined by the computing system for displaying on an indicator output on graphical user interface, such as a graphical user interface 400 shown in FIG. 4. Examples of such an indicator are described with respect to FIG. 4. As another example, the values 359 can include values that represent a current value of a counter of the counter 358. As an example, a value of the values 359 can indicate the spin count since a feature event (e.g., bonus free spin) was triggered, and a feature event threshold (e.g., 100 spins).

For a feature guarantee, a user of the computing system can select and pay for the feature to ensure that the computing system will trigger the feature within a pre-determined (or user-selected) number of spins at least once. As an example, for an implementation in which a GUI 400 (shown in FIG. 4) is output to the display 110, 110*a*, 110*b*, a spin count value within the values 359 can be displayed with a spin-count-since-bonus indicator 413.

The feature event threshold 360 can include one or more threshold values. As an example, the feature event threshold 360 can include a feature event threshold described with respect to FIG. 6 or FIG. 7. As another example, the feature event threshold 360 can include multiple feature event thresholds, such as one or more feature event thresholds for one or more users of the computing system. As another example, the feature event threshold 360 can include multiple feature event thresholds, such as one or more feature event thresholds for one or more different types of base events.

The GUI 361 can include one or more graphical user interfaces. A GUI within the GUI 361 can include a static GUI that includes content that does not change. Additionally or alternatively, a GUI within the GUI 361 can include a dynamic GUI with one or more aspects that are configured to change while the GUI is output on the display 110, 110*a*, 110*b*. As an example, a changeable aspect of a GUI can include an aspect in which an animation of the animations 356 is displayed. In particular, for example, the changeable aspect can include a symbol display portion in which an animation of a selected reel set is spun and stopped during a feature game described herein. As another example, a GUI within the GUI 361 can include one or more meters, such as one or more meters, amounts, and/or controls discussed with respect to a GUI 400 shown in FIG. 4. As another example, the GUI 361 can include a GUI 501, 520, 540, 560, 580, 620, 630, 660, 680 shown in FIG. 12 to FIG. 20, or some portion of one of those GUIs.

Figure 4:
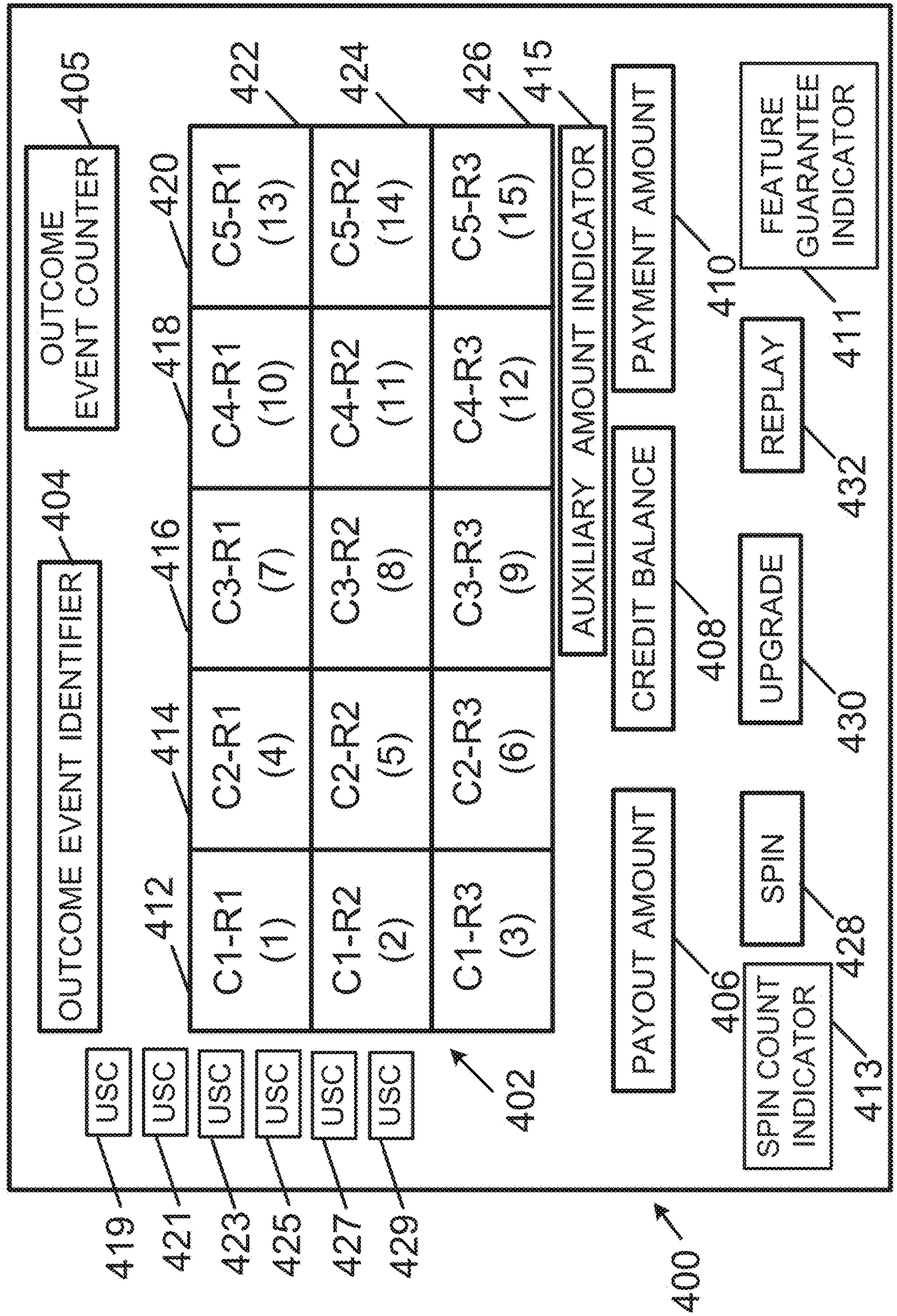
FIG. 4 shows a graphical user interface in accordance with the example embodiments.

Next, FIG. 4 depicts a GUI 400 that a computing system (e.g., the computing system 100, 100*a*, 100*b* or a computing system 800 shown in FIG. 8 or a computing system 900) can output on a display (e.g., the display 110, 110*a*, and 110*b*). For purposes of this description, each element of the GUI 400 can be a displayable element of the GUI 400. One or more of the displayable elements can include a static element that does not change. One or more of the displayable elements can include a dynamic element that is configured to be modified. A processor can determine how the dynamic element is to be changed. In some implementations, a change to the dynamic element can be based on a user input and/or an output of a random number generator.

The GUI 400 includes a symbol-display-portion 402, an outcome event identifier 404, an outcome event counter 405, a payout amount indicator 406, a credit balance indicator 408, a payment amount indicator 410, a feature guarantee indicator 411, a spin count indicator 413, and an auxiliary amount indicator 415. The GUI 400 can include one or more user-selectable controls (USCs). As shown in FIG. 4, the GUI 400 can include a USC 419, 421, 423, 425, 427, 428, 429, 430, 432.

The symbol-display-portion 402 can include multiple symbol-display-segments and multiple symbol positions. As an example, the symbol-display-segments can include a vertical symbol-display-segment (SDS) 412, 414, 416, 418, 420. As another example, the symbol-display-segments can include a horizontal symbol-display-segments 422, 424, 426. Each symbol-display-segment can include multiple symbol positions. The vertical SDS 412 to the vertical SDS 420 are shown as having three symbol positions. The horizontal SDS 422, 424, 426 are shown as having five symbol positions. A person skilled in the art will understand that those symbol-display-segments can be configured with a different number of symbol positions. The symbol-display-portion 402 can be referred to as a symbol matrix or, more simply, a matrix. As shown in FIG. 4, the symbol-display-portion is arranged as a five by three (i.e., 5×3) matrix. The implementations of this disclosure including or corresponding to a symbol-display-portion or matrix can be carried out with a matrix arranged other than a 5×3 matrix.

In at least some embodiments, the vertical SDS 412, 414, 416, 418, 420 is configured as a spinnable reel. The GUI 400 can display the spinnable reels spinning by displaying an animation of the reels spinning and the displaying reels coming to a stop. For vertical SDS 412, 414, 416, 418, 420, the spinnable reels can spin in a vertical direction (e.g., top to bottom or bottom to top, with respect to the symbol-display-portion 402). The animation can be stored in the animations 356. An SDS can be referred to as a reel.

In at least some other embodiments, the horizontal SDS 422, 424, 426 is configured as a spinnable reel. The GUI 400 can display the spinnable reels spinning and stopped after spinning. For the horizontal SDS 422, 424, 426, the spinnable reels can spin in a horizontal direction (e.g., left to right or right to left, with respect to the symbol-display-portion 402).

The computing system 100, 100*a*, 100*b*, 800, 900 can cause a symbol-display-segment to spin, and to cause a spinning symbol-display-segment to stop spinning. The spinning and stopping of the spinning symbol-display-segment can be carried out for each outcome event, such as a base event or a feature event. In accordance with the embodiments in which the symbol-display-portion 402 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels can occur simultaneously.

The multiple symbol positions in the symbol-display-portion 402 are identified by column and row designators, in which C1=column 1, C2=column 2, C3=column 3, C4=column 4, C5=column 5, R1=row 1, R2=row 2, and R3=row 3. The multiple symbol positions in the symbol-display-portion 402 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 4, C2 is between C1 and C3, C3 is between C2 and C4, and C4 is between C3 and C5.

For a matrix arrangement with 15 symbol positions as shown in FIG. 4, the numerical identifiers can be whole numbers 1 through 15, inclusive. The processors or computing systems described herein can be configured to select a symbol position of the symbol-display-portion 402 using a random number generator that is configured to generate a number within the range 1 through N, inclusive, where N equals the number of symbol positions in the symbol-display-portion 402. For the matrix arrangement, each symbol-display-segment can be a distinct column of the multiple columns within the matrix. Alternatively, for the matrix arrangement, each symbol-display-segment can be a distinct row of the multiple rows within the matrix.

The processor of a computing system described herein can determine an operating state of the computing system and/or an outcome event that can occur during the determined operating state. In response to making those determination(s), the processor can cause the outcome event identifier 404 to display an identifier of the outcome event that can occur during the determined state. For example, the outcome event identifier can identify a base outcome event, a feature event outcome (e.g., a bonus outcome event) or another type of outcome event. The bonus outcome event can be a "free spins" outcome event or some other outcome event.

The processor of a computing system described herein can determine a payment amount placed on an outcome event, an award or payout amount after or during occurrence of an outcome event resulting in a win, a credit balance after or while decreasing a number of credits based on a payment or after or while increasing a number of credits based on a determined award or payout amount, and/or a number of awarded remaining outcome events that can occur. The processor can cause the determined payment amount to be displayed by the payment amount indicator 410, the determined payout amount to be displayed by the payout amount indicator 406, the determined credit balance to be displayed by the credit balance indicator 408, and the number of awarded remaining outcome events to be displayed by the outcome event counter 405.

In at least some embodiments, a memory (e.g., the memory 114, 114*a*, 114*b* or the electronic storage 824, 928) can include a payout table. The payout table can be contained in table 352. Moreover, in at least some embodiments, a processor (e.g., the processor 112, 112*a*, 112*b*, 826, 930) can read at least a portion of the payout table within the memory. In at least some embodiments, the processor can output at least a portion of the table on a user interface (e.g., the user interface 104, 104*a*, 104*b*). The payout table can indicate various sets or combinations of symbols that are defined as a winning outcome and an award or payout corresponding to each winning outcome. A symbol in those sets or combinations can include a regular symbol or a wild symbol. A regular symbol represents only a single symbol. In contrast, a wild symbol can represent one or more regular symbols depending on what regular symbol is needed for a particular payline or payway including the wild symbol to result in a winning outcome and how many paylines or payways are evaluated by the processor.

As an example, a winning outcome can include three instances of the same regular symbol (or a combination of the same regular symbol and one or more wild symbols in three symbol positions) along a given payline or payway. As another example, a winning outcome can include four instances of the same regular symbol (or a combination of the same regular symbol and one or more wild symbols in four symbol positions) along a given payline or payway As yet another example, a winning outcome can include five instances of the same regular symbol (or a combination of the same regular symbol and one or more wild symbols in five symbol positions) on a given payline or payway.

In at least some implementations, a winning payline or payway starts at a particular reel and extends in a particular direction, such as left to right or right to left when looking at the GUI 400. As an example, the particular reel can include the SDS 412. In accordance with this example, a winning payline or payway can include a payline or payway including the following symbols: (1, 4, 7), (2, 5, 8), (3, 6, 9), (1, 5, 7), (1, 5, 8), or (1, 5, 9). Other examples of a winning payline or payway starting with the SDS 412 are also possible.

As an example, an award corresponding to one or more of the aforementioned winning outcomes can include an award of one or more credits added to a credit meter balance contained in a memory for a user using the computing system 100, 100*a*, 100*b*, 800, 900. The credit meter balance can be stored in the credits 354. Other examples of a winning combination and a corresponding award within the payout table are possible.

The feature guarantee indicator 411 can be configured to indicate whether a guarantee feature is enabled or disabled. In some implementations, the guarantee feature is enabled if the user has activated (e.g., paid for) the guarantee feature (i.e., a feature to guarantee a feature event will be triggered during a certain number of base events. The certain number of base events can be represented in data storage by the feature event threshold 360 (e.g., 100 spins).

The spin count indicator 413 indicates the current spin count since a feature event (e.g., bonus free spin) was triggered. For a feature guarantee, a user can select and pay for the feature to ensure that the user is guaranteed to trigger a feature event within a pre-determined (or user-selected) number of spins or time. Here, the spin count indicator 413 tracks the number of base events performed (e.g., normal spins) since the feature event was triggered. If the feature event is triggered during a base event before the feature event threshold (e.g., a predetermined/pre-set number of spins or time) is reached, the spin count indicator 413 will reset to zero. If the user however completes the specified number of spins or reaches the threshold time without triggering the feature (i.e., the spin count indicator 413 reached the feature event threshold), the feature trigger will be forced by the processor of the computing system.

As noted, the GUI 400 can include the USC 419, 421, 423, 425, 427, 428, 429, 430, 432. Selection of the USC 419 can cause the processor to increase an amount shown in the payment amount indicator 410. Selection of the USC 421 can cause the processor to decrease an amount shown in the payment amount indicator 410. Selection of the USC 423 can cause the processor to increase an amount shown in the auxiliary amount indicator 415. Selection of the USC 425 can cause the processor to decrease an amount shown in the auxiliary amount indicator 415. Selection of the USC 427 can cause the processor to enable the feature guarantee, enable the USC 423, 425 to adjust an amount shown in the auxiliary amount indicator 415, and to cause the feature guarantee indicator 411 to indicate the feature guarantee is enabled. In contrast, selection of the USC 429 can cause the processor to disable the feature guarantee, disable the USC 423, 42 from adjusting an amount shown in the auxiliary amount indicator 415, and to cause the feature guarantee indicator 411 to indicate the feature guarantee is disabled.

Selection of the USC 428, 430, 432 can cause the processor and/or another component of the computing system to perform one or more functions. As an example, selection of the USC 428 can cause the processor to transmit a spin request and/or a communication including a spin. As another example, selection of the USC 430 can cause the processor to upgrade a symbol shown on the display and/or to transmit a communication including an upgrade. As yet another example, selection of the USC 432 can cause the processor to replay an outcome event via the user interface.

In at least some embodiments, a USC on a GUI can be reconfigured depending on an operating state of the computing system 100, 100*a*, 100*b*, 800, 900. As an example, a single USC on the GUI 400 can be configured as the USC 428 when the computing system is operating in an operating state in which the computing system is not performing an outcome event for the computing system, and as the USC 430 when the computing system is operating in an operating state in which the computing system is performing an outcome event for the computing system. In at least some of those embodiments, the single USC can be unelectable while the computing system is performing an outcome event for the computing system until the processor determines the outcome event includes a winning combination on a payline or payway.

Next, FIG. 5 shows a selected symbol set 500 in accordance with the example embodiments. The selected symbol set 500 can include symbols selected from the global symbol group table 300 for display during an outcome event. The symbols shown in FIG. 5 are arranged according to the symbol-display-portion 402. In particular, the selected symbol set 500 includes: (i) a "10" symbol at a symbol position C1-R1 and a symbol position C5-R2, (ii) a "J" symbol at a symbol position C2-R1, a symbol position C1-R2, a symbol position C2-R2, and a symbol position C5-R3, (iii) a "Q" symbol at a symbol position C3-R1, a symbol position C3-R2, and a symbol position C4-R3, (iv) a "K" symbol at a symbol position C4-R1, a symbol position C5-R1, and a symbol position C2-R3, and (v) an "A" symbol at a symbol position C4-R2, a symbol position C1-R3, and a symbol position C3-R3. Other arrangements of symbols, in terms of the number of columns, number of rows, or the layout of symbols, are possible.

III. Example Operation

Reel-based events can include using a plurality of reels, each reel having a multitude of symbols thereon. For each event of a particular reel-based event (e.g., a base event or a feature event), reel positions are randomly determined, and the reel positions then define a result of the reel-based event. For virtual reel-based events (also known as electronic reel-based events), a random number generator (RNG) is generally used to determine the position that each reel will land on during a reel-based event. If the resultant reel positions correspond to a particular pattern that is needed for a prize to be awarded (as defined in a pay table associated with the particular reel-based event), a user is awarded with the corresponding prize.

Conventionally, in reel-based slot games, a side bet feature involves an additional cost that a user can choose to incur with each main wager placed on a wagering game. Existing side bets can increase the probability of triggering a particular feature, or can fund an immediate trigger of the feature. In at least some implementations, a side bet can be referred to as an auxiliary input and can be entered into a computing system using user-selectable controls corresponding to an auxiliary amount indicator (e.g., the USC 423, 425 corresponding to the auxiliary amount indicator 415).

A user can perform a sequence of reel-based events (or, reel-based event results) that cause an undesirable or disappointing reel-based event experience. A user can perform the reel-based event with a primary goal of triggering a desired feature (e.g., reaching a free-spin bonus round where the user's returns on their wager could be significantly more than during a session of base events). However, a user can go through an entire session without triggering the desired feature, thus resulting in an unsatisfied user, with a negative experience.

Implementations described herein address the aforementioned shortcomings and other shortcomings by providing a "feature guarantee" that ensures that a particular feature (e.g., a free spins bonus round) is triggered during a base event within at least a predetermined number of spins of the base event. A user will be allowed to enter an auxiliary input (e.g., pay a fee) in addition to their start input (e.g., a main wager), which ensures the user of the benefit of a desired experience of using the computing system. A counter can track a quantity of base event spins since a trigger of the desired feature. If the feature event is triggered during a base event, the counter will reset and start counting again. If the user, however, performs the specified number of spins using the computing system without triggering the feature event, the feature trigger will be forced by the computing system based on the counter reaching a feature event threshold value.

For example, a reel-based event can be configured such that selecting the feature guarantee option will trigger a feature event at least once every one hundred spins. Then, the user can select an input to activate the feature guarantee (e.g., selecting an auxiliary amount greater than zero and/or in a manner similar to how a user would typically pay for a side bet). If, after one hundred base event spins, the feature event has not been triggered, a trigger of the feature event will be forced (which can be displayed to the user by a manipulated reel result, or in any other appropriate manner), and the feature event will be performed. If the feature event is a free spins round, such free spins round will be performed by the computing system.

Figure 6:
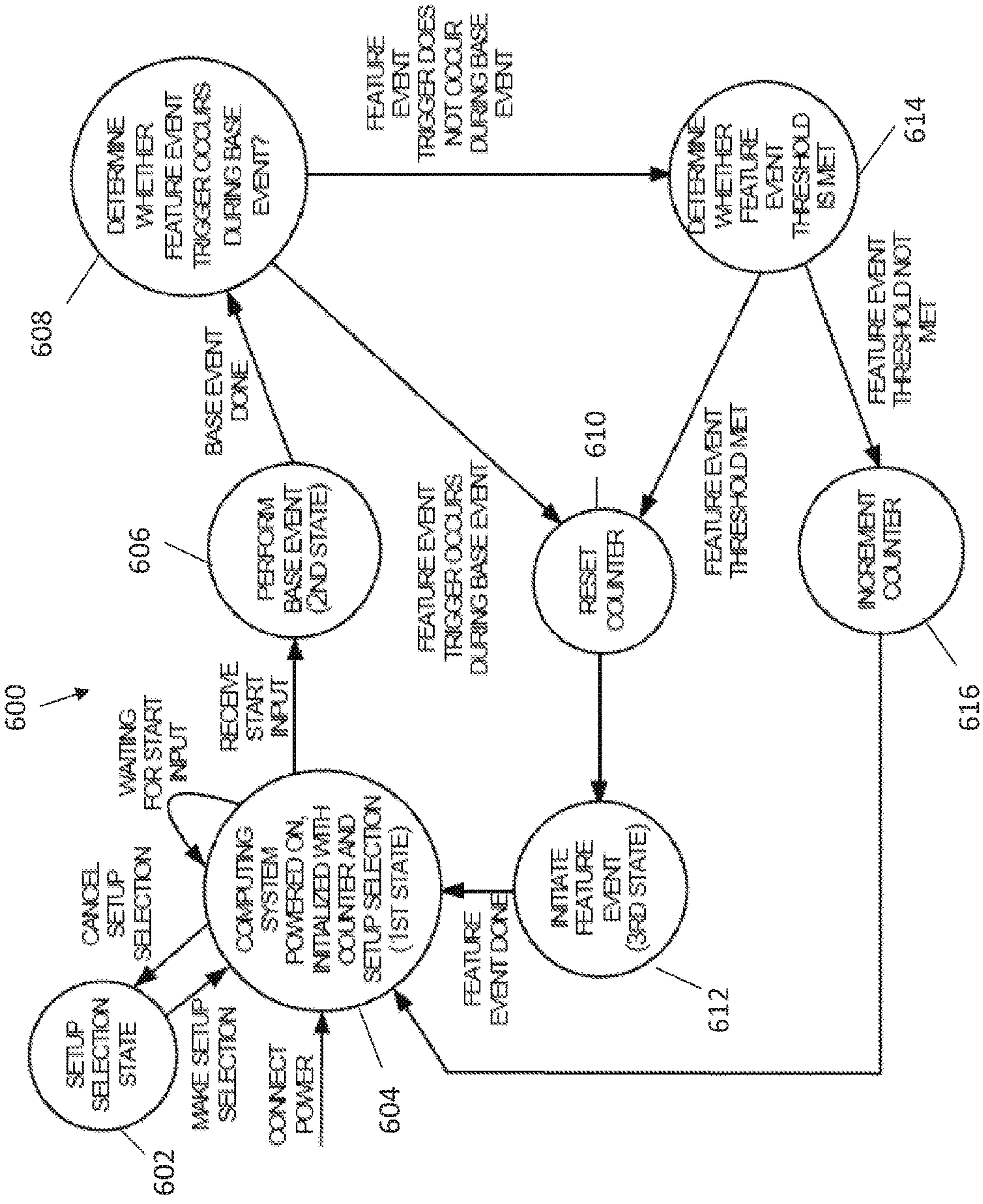
FIG. 6 illustrates a state diagram of the system and method for reel-based events with a guarantee feature, in accordance with example embodiments.

To implement the feature guarantee functionality, the flow of a normal reel-based event must be changed. FIG. 6 illustrates a state diagram 600 that can be implemented in a computing system (e.g., the computing system 100, 100*a*, 100*b*, 800, 900) and/or a method for reel-based events with a feature guarantee, in accordance with example embodiments. Upon connecting power to the computing system, the computing system enters a first state 604, powers on and initializes with a counter and a setup selection. In some implementations, the counter and/or setup selection can be a default counter and/or default setup selection, respectively. In some implementations, entering the first state 604 is conditioned, in part, on a setup selection made during a setup selection state 602. As an example, the setup selection for the first state can include a type selection of a particular type of base event, a user selection of a particular user of the computing system, a mode selection of an anonymous user mode, and/or a value selection of a particular value for start inputs. The computing system, while operating in the first state, can cancel a setup selection and enter the setup selection state 602 and then return to the first state 604. The computing system, while operating in the first state, can wait for a start input, such as a start input entered via a USC, such as the USC 428. Once the start input is received, a base event is performed in a second state 606. Performing the base event can include, for example, spinning a set reels, dealing a hand of cards, rolling a pair of dice, or spinning a wheel.

Next, at a state 608, the computing system determines whether a feature event trigger occurs during the base event. The determination during the state 608 can be made during or after performing the base event is complete. As an example, the feature event can include one or more particular symbols landing on a symbol display portion, a particular hand of cards being dealt, rolling the pair of dice to land on particular values, or stopping a wheel or landing a ball at a particular position on a wheel.

If the feature event is triggered during the base event, then the counter is reset at a counter reset state 610, the feature event (e.g., a bonus free spin) is initiated during a third state 612, and then the computing system returns to the first state 604 after performance of the feature event.

On the other hand, if the feature event trigger does not occur during the base event, the computing system determines whether the feature event threshold is met at a comparison state 614. For a reel-based event, the feature event threshold can be compared to a reel spin counter. For a playing card event, the feature event threshold can be compared to a deal counter. For a dice event, the feature event threshold can be compared to a roll counter. For a wheel-based event, the feature event threshold can be compared to a wheel spin counter. For a pachinko event, the feature event threshold can be compared to a ball landing counter. One or more of the foregoing counters can be contained in the counter 358.

If, at the comparison state 614, the computing system determines the feature event threshold is met, the computing system proceeds to the counter reset state 610, then to the third state 612 to initiate and perform the feature event and then the computing system returns to the first state 604.

On the other hand, if at the comparison state 614, the computing system determines the feature event threshold is not met, the counter is incremented at an increment counter state 616. The computing system subsequently returns to the first state 604. The flows of the state diagram 600 will ensure that the user is guaranteed to trigger the feature event within a pre-determined (or user-selected) number of events.

Figure 7:
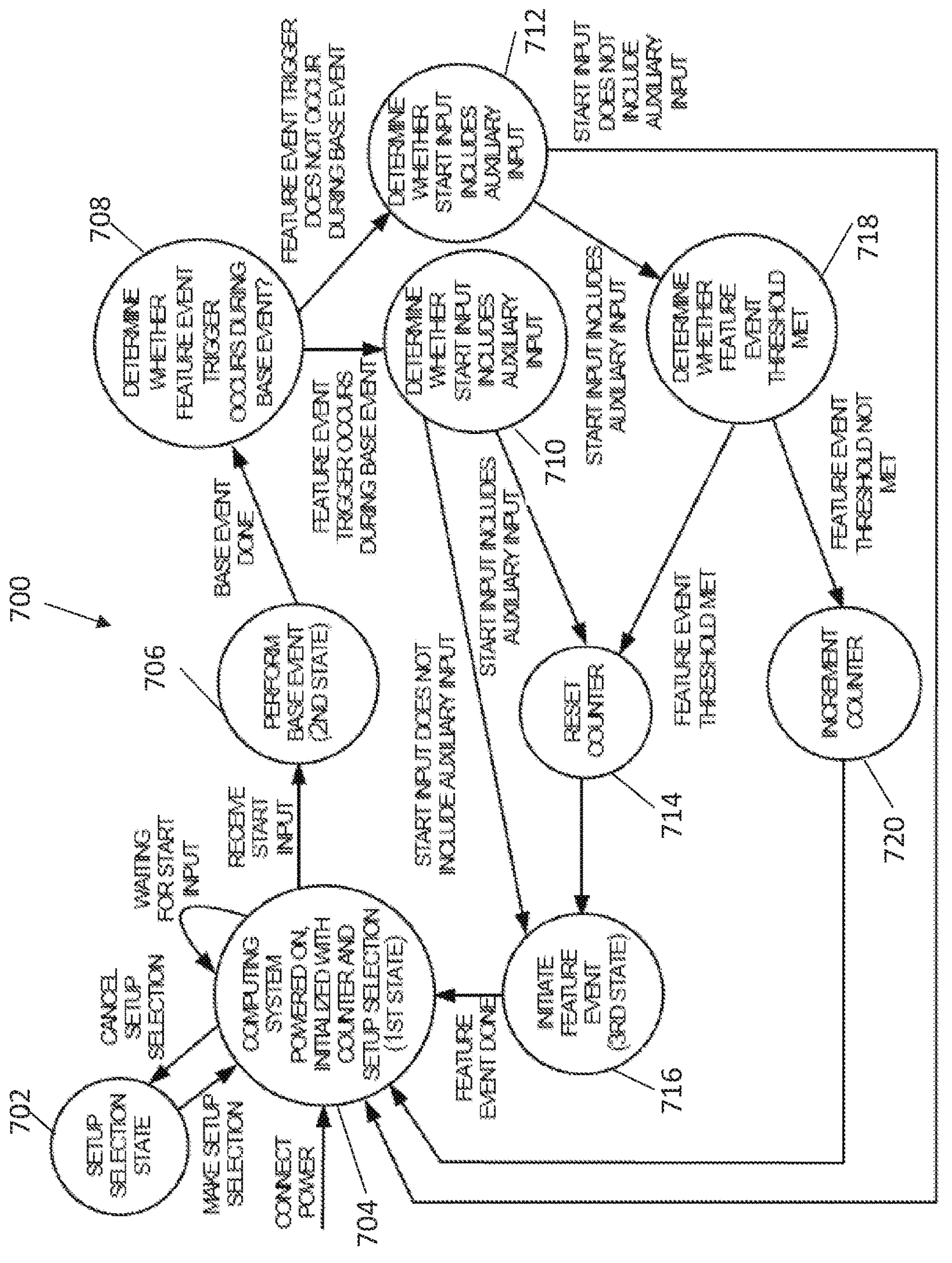
FIG. 7 illustrates another state diagram of the system and method for reel-based events with a guarantee feature, in accordance with example embodiments.

Next, FIG. 7 illustrates a state diagram 700 that can be implemented in a computing system (e.g., the computing system 100, 100*a*, 100*b*, 800, 900) and/or a method for reel-based events with a feature guarantee, in accordance with example embodiments. Upon connecting power to the computing system, the computing system enters a first state 704, powers on and initializes with a counter and a setup selection. In some implementations, the counter and/or setup selection can be a default counter and/or default setup selection, respectively. In some implementations, entering the first state 704 is conditioned, in part, on a setup selection made during a setup selection state 702. As an example, the setup selection for the first state can include a type selection of a particular type of base event, a user selection of a particular user of the computing system, a mode selection of an anonymous user mode, and/or a value selection of a particular value for start inputs. The computing system, while operating in the first state, can cancel a setup selection and enter the setup selection state 702 and then return to the first state 704. The computing system, while operating in the first state, can wait for a start input, such as a start input entered via a USC, such as the USC 428. Once the start input is received, a base event is performed in a second state 706. Performing the base event can include, for example, spinning a set reels, dealing a hand of cards, rolling a pair of dice, or spinning a wheel.

Next, at a state 708, the computing system determines whether a feature event trigger occurs during the base event. The determination during the state 708 can be made during or after performing the base event is complete. As an example, the feature event can include one or more particular symbols landing on a symbol display portion, a particular hand of cards being dealt, rolling the pair of dice to land on particular values, or stopping a wheel or landing a ball at a particular position on a wheel.

If the feature event is triggered during the base event, then the computing system determines, at a state 710, whether the start input includes an auxiliary input. In other words, the computing system determines whether a base event was initiated with both a start input and an auxiliary input, such as a start input indicated by the payment amount indicator 410 and an auxiliary input indicated by the auxiliary amount indicator 415, respectively.

If, at the state 710, the computing system determines that the start input does not include the auxiliary input, then the feature event (e.g., a bonus free spin) is initiated during a third state 716, and then the computing system returns to the first state 704 after performance of the feature event. On the other hand, if, at the state 710, the computing system determines that the start input includes the auxiliary input, then then the counter is reset at a counter reset state 714, and the feature event (e.g., a bonus free spin) is initiated during the third state 716, and then the computing system returns to the first state 704 after performance of the feature event.

Returning to the state 708, if the feature event trigger does not occur during the base event, then the computing system determines, at a state 712, whether the start input includes an auxiliary input. Similar to above, the computing system determines whether a base event was initiated with both a start input and an auxiliary input, such as a start input indicated by the payment amount indicator 410 and an auxiliary input indicated by the auxiliary amount indicator 415, respectively.

If the computing system at state 712 determines the start input does include the auxiliary input, then the computing system returns to the first state 704. On the other hand, if the computing system at state 712 determines the start input includes the auxiliary input, then the computing system, at a comparison state 718, determines whether the feature event threshold is met. For a reel-based event, the feature event threshold can be compared to a reel spin counter. For a playing card event, the feature event threshold can be compared to a deal counter. For a dice event, the feature event threshold can be compared to a roll counter. For a wheel-based event, the feature event threshold can be compared to a wheel spin counter. For a pachinko event, the feature event threshold can be compared to a ball landing counter. One or more of the foregoing counters can be contained in the counter 358.

If, at the comparison state 718, the computing system determines the feature event threshold is met, the computing system proceeds to the counter reset state 714, then to the third state 716 to initiate and perform the feature event and then the computing system returns to the first state 704.

On the other hand, if at the comparison state 718, the computing system determines the feature event threshold is not met, the counter is incremented at an increment counter state 720. The computing system subsequently returns to the first state 704. The flows of the state diagram 700 will ensure that the user is guaranteed to trigger the feature event within a pre-determined (or user-selected) number of events.

Accordingly, a method based on function(s) of the state diagram 600, 700 can include a computer-implemented method. A computing system can execute a software application to perform the computer-implemented method. For example, the computing system 100*a* can execute the computer-implemented method on behalf of the computing system 100*b* with a display screen. Execution of the software application can include graphically displaying, on symbol display segments of the display screen, animations that simulate spinning a plurality of reels. A memory of the computing system can store, a global symbol group including a plurality of symbols. Subsets of the global symbol group and/or the plurality of symbols are displayable in a respective symbol display segment of the display screen. The determinations made as part of the state diagrams 600 and 700 can be made by the processor 112, 112*a*, 112*b*, 826, 930. Two or more states or flows of the state diagram 600, 700 can be carried out together and or in a different order as represented in FIG. 6 and FIG. 7, respectively.

The cost of a feature guarantee (in other words, a guarantee feature) with each main wager can be calculated using the below formula to ensure that a theoretical return-to-user (RTU) (e.g., a return-to-player RTU) of the game is identical whether the user engages with the feature guarantee or not.

$$FGCost = \frac{\frac{EV_F + (S_A \times RTP_B)}{RTP_T}}{S_A} - 1$$

Where:

$EV_F$ is the expected value of the Feature that would be triggered by the feature guarantee $S_A$ is the average number of spins before triggering the feature when the feature guarantee is active $RTU_B$ is the theoretical RTU of the base event $RTU_T$ is the theoretical RTU of a full event (i.e., a base event and feature event combined)

The average number of spins to trigger the feature when the feature guarantee is active ($S_A$) is calculated with the following formula:

$$S_A = \Sigma_{i=1}^{S_M}(1-p)^{(i-1)}$$

Where:

$S_M$ is the maximum number of spins before the feature guarantee will trigger the feature p is the probability of triggering the feature on any base event spin A calculation example is set forth below.

Using the formulae from above, and the following inputs:

$S_M$=75 spins p=0.5780%

$$S_A = \sum_{i=1}^{75}(1 - 0.5780\%)^{(i-1)} = 61.00$$

$EV_F$=22.50 times the user's input $S_A$=61.00 spins $RTP_B$=82.99%

$RTP_T$=96.00%

$$FGCost = \frac{\frac{22.50 + (61.00 \times 82.99\%)}{96.00\%}}{61.00} - 1 = 0.24875 \text{ times the user's input}$$

Thus, for a user placing a $1 start input (e.g., a wager) on the base event during normal gameplay, the cost of activating feature guarantee will be $0.24875, on each wager placed (this will typically be a rounded number when charged to the user).

Using the above formula, the user is charged so that their additional start input (e.g., a wager) funds the difference in RTU collected to fund the bonus feature. The additional cost of the feature guarantee adds to the part of the start input that normally funds the bonus feature, thereby allowing the feature to be triggered earlier than normal, while still being fully funded by contributions of the user. This ensures that the overall RTU of the computing system remains as required/specified. It will be apparent that the values in the above formulas are based on averages, as, for example, the expected value of the feature will rarely be equal to the expected value. The expected value is merely an average value that the feature will return, over a multitude of events performed.

The guaranteed number of normal spins by which the feature will be triggered ($S_M$ in the above formulas), can, for example, be set by a developer of the computing system, an operator of the computing system, or a user of the computing system.

A user can switch feature guarantee on or off when they please during a session of performing base events. As an example, a user can switch the feature guarantee on by selecting the USC 427 and switch the feature guarantee off by selecting the USC 429. In some embodiments, any contributions made to fund feature guarantee can be uniquely linked to a user's account and/or wallet, and can be stored for when a user disconnects or logs off the computing system, to continue at a later stage. The counter for number of spins that have taken place without triggering the particular feature will be similarly stored for later us. When, for example, a user has made performed forty base events with the feature guarantee activated, the user can deactivate the feature guarantee. The user can then terminate their computing system session, or can simply continue performing base event without the feature guarantee activated. When the user reactivates the feature guarantee, the counter will continue from the previous forty count.

In some embodiments, feature guarantee will be linked to a particular start input size, as a change in start input size will affect the model used to calculate the cost. Should a user change their start input (for example, from $1 to $2), any contributions to feature guarantee already made at the previous start input can be stored in relation to a user's account for use at a later stage, when a user re-initiates access to performing base events at such previous start input amount.

If will be apparent that feature guarantee can fund any type of feature, not necessarily a free spins round as set out above. The same basic principles for funding as set out above will apply to any bonus feature used with feature guarantee.

In some embodiments, the cost of feature guarantee can be prohibitive. To prevent this, it is envisaged that the base event RTU can be manipulated when feature guarantee is active, in order to reduce the cost of the auxiliary input (e.g., a side bet). When the base event RTU is reduced, the percentage of each start input that contributes to and funds winnings on performing base events is accordingly lowered. A user will thus win a lower amount on performing base events, but will still receive the benefit of the faster triggering of the desired feature event. If, for example, the base event RTU is 82.99% (as per the above example in the calculations), it can be lowered by 15% to 67.99%. Then, using the same formulas outlined above, but with $RTU_B$ set to 67.99%, FGCost is calculated as 0.09245 times the user's start input. This can be a more palatable increase in total start input for a user. Given that users that activate the feature guarantee are likely more interested in reaching a bonus round than in base event returns, the reduction in base event returns cannot lead to a less favourable experience to such users. When the base event RTU is reduced, appropriate changes can need to be made to pay tables, or to reel sets used during base event performance.

In some instances, a user contributes to the feature guarantee (e.g., via auxiliary input(s)) and then the feature event triggers during a base event before reaching the feature event threshold. In some implementations, the computing system can be configured to allocate the additional contributions elsewhere in order to maintain the desired RTU. For example, such contributions can be used to fund further feature guarantees (i.e., can reduce the cost to guarantee the next feature event). As another example, the additional contributions can be used as an additional win, i.e., the user can receive an appropriate amount as part of a payout on the feature event that is triggered. It should be noted that any award to the user will take into account the RTU of the game, i.e., at a 96% RTU, 4% of the user's contributions will typically be retained by an operator of the computing system.

In other implementations, such as implementations in which the additional contributions (e.g., the auxiliary inputs are based on averages, as discussed above), an allocation of the additional contributions is not necessary as a result of the feature event triggering before the feature event threshold is reached, because the values of the additional contributions take into account that the feature event can trigger during a base event before the feature event threshold is reached. In other words, since average values are used in calculating the value of an auxiliary input (e.g., a cost of a side bet), a user that "overpays" for the feature (i.e., has contributed more than the average value of the feature via the additional cost before triggering the feature, may subsidize another user that "underpays" for the feature, i.e. has not contributed the value of the feature before the feature triggers automatically (as part of normal performance or gameplay). As a result, the overall, desired RTU can be maintained.

In some embodiments, the feature guarantee can be implemented across different base events. Then, any contribution already made to the feature guarantee without being paid out by the relevant feature event can be allocated to another base event performed for the user. It is envisaged that such base events can need to be linked to a single base event provider or supplier, but need not be. This same method could be used to allow the feature guarantee to operate across different start input amounts, whether in the same or in different base events.

In some implementations, bonus money can be allocated to a user by a particular casino to allow then to play a particular game without a cost to them. In some implementations, the feature guarantee can be configured so that it does not operate with bonus money. Restricting the use of such bonus money so that feature guarantee cannot be activated and paid for from such bonus money can prevent failure of a mathematical model used to calculate the value of bonus money, thereby paying out more than what was originally intended on such bonus money.

As discussed, a counter can be provided and displayed to a user, so that the user is shown the number of spins since the trigger of a bonus feature, while a "guaranteed feature by 100 spins" (if feature guarantee is set to trigger by at least 100 spins) can also be shown to the user. Alternative options can also be provided, for example, "feature triggered in 50 spins", or some other number of spins.

The feature guarantee can ensure that a user has a favorable base event experience within a desired number of spins. This can result in speeding up the awarding of a particular feature, and ensure its awarding in a particular time period. A user can perform a reel-based slot event with a primary goal of reaching a bonus round, where the user's returns on their wager will be significantly more than during a normal round of base events, without such feature triggering. As a result, the feature guarantee can be particularly beneficial to users who have a limited amount of time available when performing an online event. If a user has 30 minutes to perform the online event, they can go through an entire 30 minute session without triggering a desired feature, thus resulting in an unsatisfied user, with a negative experience in their 30 minutes of using the computing system. However, feature guarantee could ensure that the user does activate the desired bonus feature during their online event, thereby reaching their primary objective within their available time. This can all occur whilst the game's RTU is unaffected, given that funding of the feature is appropriately determined to align with the approved RTU of the event.

In some embodiments, an event designer can base the configuration of the feature guarantee on a particular user. For example, if the provider is aware that User A normally uses the computing system for 30 minutes, while User B normally uses the computing system for 45 minutes, the provider can modify each user's feature guarantee properties to provide them with a desired experience during their normal session of using the computing system to perform events. For example, if the computing system is configured so that the computing system triggers a particular feature three times within a user session, User A can be provided with a feature guarantee option that is more expensive per spin than a feature guarantee option provided to User B. However, both users can enable such features and be provided with three guaranteed features within their respective gaming sessions. In some implementations, an average time it takes a particular computing system to initiate each base event (i.e., an average time spent on a spin, or before a next spin) can influence the expected time in which the computing system should output the particular feature.

In some implementations, the functions of determining whether a first feature event trigger occurs during the first base event; resetting a counter based on the first base event and switching the computing system to operate in a feature event state, determining whether the counter meets the feature event threshold if the first feature event trigger does not occur during the first base event; resetting the counter based on the first base event and switching the computing system to operate in the feature event state, and/or incrementing the counter based on the first base event and monitoring for receiving a next start input if the counter does not meet the feature event threshold, necessitate computer implementation. Without computer implementation, the determinations, counters, thresholds, switching between various event states etc. would be impractical if not impossible. In contrast, the computer implementation herein allows the switching between event states, determinations of event triggers, incrementing and resetting of counters, etc. to provide a feature guarantee for the user of a computer-based reel events. Consequently, these features of the disclosure herein would not exist but for computer technology.

Particularly, the embodiments herein solve a technical problem of how to provide a "feature guarantee" that ensures that a particular feature (e.g., a free spins bonus round) is triggered during a base event within at least a predetermined number of spins of the base event, which provides a user the benefit of a desired experience. The functions of switching between event states, determinations of event triggers, incrementing and resetting of counters, etc. would be prohibitively complex and expensive to implement on a traditional machine with mechanical reels. In effect, the present approach can be seen as providing implementations which increase the number and variety of possible outcomes in a reel-based event.

Further, these features are an improvement to reel-based event technology. Since the symbols appearing on each reel are fixed and cannot be changed during mechanical reel-based outcome events, the functions of switching between event states that can guarantee event outcomes based on a counter and event trigger threshold could not appear in such outcome events. Due to this technological limitation, users can become disinterested in these basic reel-based outcome events. Computer implementation, however, facilitates the integration of these features into reel-based outcome events, resulting in outcome event dynamics that would otherwise be unavailable. Consequently, the disclosure herein is a technological improvement to reel-based outcome events.

Furthermore, the embodiments can include performing the functions of switching between event states that can guarantee event outcomes based on a counter and event trigger threshold using a server computing system and client computing system using a communication network to carry communications including instructions and/or data to carry out the functions. As an example, the client computing system can include user-selectable controls that are selectable to trigger performance of an outcome event. Moreover, a processor at the client computing system can receive inputs from devices operatively coupled to the processor, such as an acceptor, and can control devices outside of the processor during performance of the outcome event, such as a display or speaker. Furthermore still, in some embodiments, a processor at the server computing system can determine an outcome for an outcome event and transmit data for displaying a representation of the outcome event on a display screen at the client computing system. In at least some embodiments, the data for displaying a representation of the outcome event can include an index value to some content already stored at the client computing system so that the server computing system does not need to transmit that content each time the client computing system is to display that content during performance of an outcome event. For example, the index value can include a value indicative of a particular animation of the animations 356 to display when the client computing system is operating in a particular operating state such as the operating state for a free bonus spin shown in the outcome event identifier 404, or a feature guarantee (indicated by the feature guarantee indicator 411 as being enabled) within a certain number of spins shown in the spin count indicator 413.

Next, FIG. 8 is a block diagram of a computing system 800 configured for reel-based events with guarantee feature in accordance with the example embodiments. In some implementations, the computing system 800 can include a computing platform 802 (e.g., one or more computing platforms). The computing platform 802 can be configured to communicate with a remote platform 804 (e.g., one or more remote platforms) according to a client/server architecture, a peer-to-peer architecture, and/or other architectures. The remote platform 804 can be configured to communicate with other remote platforms via the computing platform 802 and/or according to a client/server architecture, a peer-to-peer architecture, and/or other architectures. Users can access the computing system 800 via the remote platform 804. According to some embodiments, one or more of the computing platform 802, the remote platform 804, and/or other components of the computing system 800 can be the same as or similar to one or more components of the computing system 100, 100*a*, 100*b* and/or other computing resources disclosed herein. The computing system 800 can include a display and a group of symbols arranged on a plurality of reels.

The computing platform 802 can be configured by machine-readable instructions 806. The machine-readable instructions 806 can include one or more instruction modules. The instruction modules can include computer program modules. The instruction modules can include one or more of a start input receiving module 808, a base event performance module 810, a feature event trigger determination module 812, an indication outputting module 814, a start input determination module 816, a setup selection determination module 818, an input determination module 820, and/or other instruction modules.

The start input receiving module 808 can be configured to receive a first start input at a processor of a computing system. The computing system can perform at least one instance of the feature event while operating in the feature event state and then the processor begins monitoring for receiving the next start input. The first start input can be associated with a first value. As an example, the first value can include a value indicated in the values 359 and indicated by the payment amount indicator 410.

The computing system can operate in a first state when receiving the first start input. The computing system can be configured with a setup selection for the first state. By way of non-limiting example, the setup selection for the first state can include a type selection of a particular type of base event, a user selection of a particular user of the computing system, a mode selection of an anonymous user mode, and/or a value selection of a particular value for start inputs. The first start input can include a first wager. The first start input can include a first wager.

The computing system 800 can include a feature event threshold (e.g., the feature event threshold 360) and a counter (e.g., a counter within the counter 358). The counter can include a first counter corresponding to a first user of the computing system. By way of non-limiting example, the computing system can include one or more of a second counter corresponding to the first user of the computing system, or at least one additional counter corresponding to at least one additional user of the computing system.

The start input receiving module 808 can be configured to receive a second start input at the processor. Receiving the second start input can occur before receiving the first start input or while monitoring for receiving the next start input.

The base event performance module 810 can be configured to perform, by the computing system, a first base event in response to receiving the first start input. By way of non-limiting example, the first base event can include a reel-based event, a poker event, a blackjack event, a baccarat event, a craps event, a wheel event, a pachinko event, or a roulette event.

The base event performance module 810 can be configured to perform, by the computing system, a second base event in response to receiving the second start input. The second base event can include a second wager. By way of non-limiting example, the second base event can include a reel-based event, a poker event, a blackjack event, a baccarat event, a craps event, a wheel event, a pachinko event, or a roulette event.

The feature event trigger determination module 812 can be configured to determine, by the processor, whether a first feature event trigger occurs during the first base event. If the first feature event trigger occurs during the first base event, then the processor resets the counter based on the first base event and switches the computing system to operate in a feature event state. If the first feature event trigger does not occur during the first base event, then the processor determines whether the counter meets the feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and begins monitoring for receiving a next start input.

The feature event trigger determination module 812 can be configured to determine, by the processor, whether a second feature event trigger occurs during the second base event. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and begins monitoring for receiving a further next start input. If the second feature event trigger does occur during the second base event, then the processor switches the computing system to operate in the feature event state. If the second feature event trigger does not occur during the second base event, then the processor begins monitoring for receiving a further next start input.

The indication outputting module 814 can be configured to output, to a display, an indication of the amount of time, a particular amount of time counted by a timer for tracking a particular passage of the amount of time, and/or a difference between the amount of time and the particular amount of time counted by the timer for tracking the particular passage of the amount of time.

The indication outputting module 814 can be configured to output, to a display, an indication of a threshold number indicative of the feature event threshold, a counter number indicative of the counter, and/or a difference number indicative of a difference between the feature event threshold and the counter. In at least some implementations, the computing system can output the plurality of reels on the display. By way of non-limiting example, performing the first base event can include spinning the plurality of reels output on the display, stopping the plurality of reels at respective reel stops, and displaying, on the display, a subset of the group of symbols based on the respective reel stops. In at least some implementations, the computing system can output a user hand of cards on the display. By way of non-limiting example, performing the first base event can include dealing a hand of cards to the user and a hand of cards to a dealer, comparing hands of cards to each other, or comparing a user hand of cards to a predetermined value. In at least some implementations, the computing system can output a roll of one or more dice, a spin of a wheel, or a movement of balls in a pachinko event.

The start input determination module 816 can be configured to determine, by the processor before the processor resets or increments the counter based on the first base event, that the first start input includes a first auxiliary input. The first auxiliary input can be associated with a second value. A probability of triggering a feature event during the first base event can be independent of whether the first start input includes the first auxiliary input. In some implementations, the first value is indicated by the payment amount indicator 410 and the second value is indicated by the auxiliary amount indicator 415. The start input determination module 816 can be configured to determine, by the processor, whether the second start input includes an auxiliary input.

The start input determination module 816 can be configured to determine, by the processor, whether one or more other start inputs also includes an auxiliary input.

The setup selection determination module 818 can be configured to determine a first setup selection for the computing system has been canceled. The setup selection determination module 818 can be configured to determine a second setup selection for the computing system has been entered. By way of non-limiting example, one of the first setup selection or the second setup selection can include a permission setup selection indicating entry of auxiliary inputs is permitted, a prohibition setup selection indicating entry of auxiliary inputs is prohibited, or a user setup selection indicating a particular user is using the computing system. A time setup selection can indicate an amount of time for using the computing system. By way of non-limiting example, the feature event threshold can be based at least in part on one or more of an amount of time, a quantity of base events expected to be performed during a passage of the amount of time, or a quantity of times to initiate the feature event during the passage of the amount of time.

The input determination module 820 can be configured to determine, by the processor, an auxiliary input is not received for the second base event. The auxiliary input can include a side wager. As an example, the processor can determine the auxiliary input is not received by determining that the auxiliary input indicator is set to zero and/or the USC 429 is selected to disable the auxiliary input.

In some implementations, the computing platform 802, the remote platform 804, and/or the external resources 822 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which the computing platform 802, the remote platform 804, and/or the external resources 822 can be operatively linked via some other communication media.

A given remote platform of the remote platform 804 can include one or more processors configured to execute computer program modules. The computer program modules can be configured to enable an expert or user associated with the given remote platform of the remote platform 804 to interface with the computing system 800 and/or the external resources 822, and/or provide other functionality attributed herein to the remote platform 804. By way of non-limiting example, a given remote platform of the remote platform 804 and/or a given computing platform of the computing platform 802 can include one or more of a slot machine, a server, a desktop computer, a laptop computer, a handheld computer, a tablet computing platform, a NetBook, a Smartphone, a gaming console, and/or other computing platforms.

The external resources 822 can include sources of information outside of the computing system 800, external entities participating with the computing system 800, and/or other resources. In some implementations, some or all of the functionality attributed herein to the external resources 822 can be provided by resources included in the computing system 800.

The computing platform 802 can include electronic storage 824, a processor 826, and/or other components. The computing platform 802 can include communication lines, or ports to enable the exchange of information with a network and/or other computing platforms. Illustration of the computing platform 802 in FIG. 8 is not intended to be limiting. The computing platform 802 can include a plurality of hardware, software, and/or firmware components operating together to provide the functionality attributed herein to the computing platform 802. For example, the computing platform 802 can be implemented by a cloud of computing platforms operating together as the computing platform 802.

The electronic storage 824 can comprise non-transitory storage media that electronically stores information. The electronic storage media of the electronic storage 824 can include one or both of system storage that is provided integrally (i.e., substantially non-removable) with the computing platform 802 and/or removable storage that is removably connectable to the computing platform 802 via, for example, a port (e.g., a USB port, a firewire port, etc.) or a drive (e.g., a disk drive, etc.). The electronic storage 824 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 824 can include one or more virtual storage resources (e.g., cloud storage, a virtual private network, and/or other virtual storage resources). The electronic storage 824 can store software algorithms, information determined by the processor 826, information received from computing platform 802, information received from the remote platform 804, and/or other information that enables the computing platform 802 to function as described herein.

The processor 826 can be configured to provide information processing capabilities in computing platform 802. The processor 826 can include one or more processors, such as one or more hardware processors. As such, processor 826 can include one or more of a digital processor, an analog processor, a digital circuit designed to process information, an analog circuit designed to process information, a state machine, and/or other mechanisms for electronically processing information. Although the processor 826 is shown in FIG. 8 as a single entity, this is for illustrative purposes only. In some implementations, the processor 826 can include a plurality of processing units. These processing units can be physically located within the same device, or the processor 826 can represent processing functionality of a plurality of devices operating in coordination. The processor 826 can be configured to execute the modules 808, 810, 812, 814, 816, 818, and/or 820, and/or other modules. The processor 826 can be configured to execute the modules 808, 810, 812, 814, 816, 818, and/or 820, and/or other modules by software; hardware; firmware; some combination of software, hardware, and/or firmware; and/or other mechanisms for configuring processing capabilities on the processor 826. As used herein, the term "module" can refer to any component or set of components that perform the functionality attributed to the module. This can include one or more physical processors during execution of processor-readable instructions, the processor-readable instructions, circuitry, hardware, storage media, or any other components.

It should be appreciated that although the modules 808, 810, 812, 814, 816, 818, and/or 820 are illustrated in FIG. 8 as being implemented within a single processing unit, in implementations in which the processor 826 includes multiple processing units, one or more of the modules 808, 810, 812, 814, 816, 818, and/or 820 can be implemented remotely from the other modules. The description of the functionality provided by the different modules 808, 810, 812, 814, 816, 818, and/or 820 described below is for illustrative purposes, and is not intended to be limiting, as any of the modules 808,

810, 812, 814, 816, 818, and/or 820 can provide more or less functionality than is described. For example, one or more of the modules 808, 810, 812, 814, 816, 818, and/or 820 can be eliminated, and some or all of its functionality can be provided by other ones of the modules 808, 810, 812, 814, 816, 818, and/or 820. As another example, the processor 826 can be configured to execute one or more additional modules that can perform some or all of the functionality attributed below to one of the modules 808, 810, 812, 814, 816, 818, and/or 820.

Next, FIG. 9 is a block diagram of a computing system 900 configured for reel-based events with guarantee feature in accordance with the example embodiments. In some implementations, the computing system 900 can include a computing platform 902 (e.g., one or more computing platforms). The computing platform 902 can be configured to communicate with a remote platform 904 (e.g., one or more remote platforms) according to a client/server architecture, a peer-to-peer architecture, and/or other architectures. The remote platform 904 can be configured to communicate with other remote platforms via the computing platform 902 and/or according to a client/server architecture, a peer-to-peer architecture, and/or other architectures. Users can access the computing system 900 via the remote platform 904. According to some embodiments, one or more of the computing platform 902, the remote platform 904, and/or other components of the computing system 900 can be the same as or similar to one or more components of the computing system 100, 100*a*, 100*b* and/or other computing resources disclosed herein.

The computing platform 902 can be configured by machine-readable instructions 906. The machine-readable instructions 906 can include one or more instruction modules. The instruction modules can include computer program modules. The instruction modules can include a computing system monitoring module 908, a computing system switching module 910, a base event performance module 912, a feature event trigger determination module 914, an indication outputting module 916, a start input determination module 918, a setup selection determination module 920, a start input receiving module 922, an input determination module 924, and/or other instruction modules.

The computing system monitoring module 908 can be configured to monitor, by a processor of a computing system operating in a first state, the computing system for receiving a start input. The computing system can include a feature event threshold and a counter. The computing system can perform at least one instance of the feature event while operating in the feature event state and then the processor switches the computing system to operating in the first state to begin monitoring for receiving the next start input. The computing system can be configured with a setup selection for the first state. By way of non-limiting example, the setup selection for the first state can include one or more from among a type selection of a particular type of base event, a use selection of a particular user of the computing system, a mode selection of an anonymous user mode, or a value selection of a particular value for start inputs. The computing system can be configured with a setup selection for other operating state(s) as well.

The counter can include a first counter corresponding to a first user of the computing system. By way of non-limiting example, the feature event threshold can be based at least in part on one or more from among an amount of time, a quantity of base events expected to be performed during a passage of the amount of time, or a quantity of times to initiate the feature event during the passage of the amount of time.

The computing system switching module 910 can be configured to switch, by the processor in response to receiving a first start input, the computing system to operate in a second state for playing a base event. The first start input can be associated with a first value. The first start input can include a first wager. As an example, the first start input can include an input received by a processor in response to a selection of the USC 428. As another example, the first value can include a value indicated by the payment amount indicator 410. In at least some implementations, the processor conditions entering the second state on an amount indicated by the credit balance indicator 408 being greater than or equal to an amount indicated by the payment amount indicator 410.

The base event performance module 912 can be configured for the computing system to perform base events while the computing system operates in a second operating state. Each base event can be initiated in response to receiving a start input. Each start input can be associated with a value, such as a value indicated by the payment amount indicator 410. As an example, the base event performance module 912 can be configured to perform, by the computing system while operating in the second state, a first base event in response to receiving the first start input. As another example, the base event performance module 912 can be configured to perform, by the computing system, a second base event in response to receiving a second start input. The second base event can include a second wager.

If the feature event trigger does not occur during a base event (e.g., the first base event, the second base event, or another base event), then the processor determines whether the counter meets the feature event threshold. If the processor determines the counter meets the feature event threshold, then the processor resets the counter based on the base event (e.g., the first base event or the second base event) and switches the computing system to operate in the feature event state, or if the processor determines the counter does not meet the feature event threshold, then the processor increments the counter based on the base event (e.g., the first base event, the second base event, or another base event) and switches the computing system to operating in the first state to begin monitoring for receiving a next start input. By way of non-limiting example, the first base event and/or the second base event can include a reel-based event, a poker event, a blackjack event, a baccarat event, a craps event, a wheel event, a pachinko event, or a roulette event.

The feature event trigger determination module 914 can be configured to determine, by the processor, whether a first feature event trigger occurs during the first base event. If the first feature event trigger does occur during the first base event, then the processor resets the counter based on the first base event and switches the computing system to a feature event state.

As an example, when the base event includes a reel-based event, a feature event trigger can include one or more particular symbols landing on one or more particular symbol positions (e.g., any symbol positions) on a symbol-display-portion.

As an example, when the base event includes a playing card event, such as a poker event, a blackjack event, or a baccarat event, a feature event trigger can include a playing card hand for the playing card event containing a particular playing card, a particular combination of playing cards, or containing a particular value of all cards in the hand. In at least some implementations, the particular playing card can include a Joker playing card, such as a Joker playing card randomly inserted into one or more decks of cards. In at least some implementations, the particular combination of playing cards or the particular value can include a combination or value based on multiple playing card hands, such as two consecutive playing card hands received for two consecutively-played base events.

As an example, when the base event includes a pachinko event, a feature event trigger can include one or more pachinko balls landing in one or more particular pachinko ball landing spots. In at least some implementations, the feature event trigger of landing the one or more pachinko balls in the one or more particular pachinko ball landing spots within a particular amount of time.

As an example, when the base event includes a wheel event, a feature event trigger can include a wheel stopping at a particular spatial division on a wheel during a single spin of the wheel or stopping at one or more particular spatial divisions on the wheel during multiple spins of the wheel (e.g., multiple, consecutive spins of the wheel). As an example, the wheel can be referred to a money wheel.

As an example, when the base event includes a craps event, a feature event trigger can include a pair of dice landing with particular values or a sum of values during a single throw of the dice or a pair of dice landing with particular values or a sum of values during multiple throws of the dice (e.g., multiple, consecutive throws of the dice). Other base events using one die or multiple dice are also possible.

As an example, when the base event includes a roulette event, a feature event trigger can include a ball landing at a particular slot on a roulette wheel during a single spin of the roulette wheel or a ball landing at one or more particular slots on the roulette wheel during multiple spins of the roulette wheel (e.g., multiple, consecutive spins of the roulette wheel).

The feature event trigger determination module 914 can be configured to determine, by the processor, whether a second feature event trigger occurs during the second base event. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and switches the computing system to operate in the first state to begin monitoring for receiving a further next start input. If the second feature event trigger does occur during the second base event, then the processor switches the computing system to operate in the feature event state. If the second feature event trigger does not occur during the second base event, then the processor switches the computing system to operate in the first state to begin monitoring for receiving a further next start input.

The indication outputting module 916 can be configured to output, to a display, an indication of the amount of time, a particular amount of time counted by a timer for tracking a particular passage of the amount of time, and/or a difference between the amount of time and the particular amount of time counted by the timer for tracking the particular passage of the amount of time. In at least some implementations, the timer can be carried out by a counter of the one or more counters of the counter 358.

The indication outputting module 916 can be configured to output, to a display, an indication of a number indicative of the feature event threshold, a number indicative of the counter, and/or a number indicative of a difference between the feature event threshold and the counter. The computing system can output the plurality of reels on the display. By way of non-limiting example, performing the first base event can include spinning the plurality of reels output on the display, stopping the plurality of reels at respective reel stops, and displaying, on the display, a subset of the group of symbols based on the respective reel stops. Other examples of the base event performed and counted by the counter and indicated by the indication outputting module 916 are also possible.

The start input determination module 918 can be configured to determine, by the processor before the processor resets or increments the counter based on the first base event, that the first start input includes a first auxiliary input. The first auxiliary input can be associated with a second value. In some implementations, the second value can be based on the first value. A probability of triggering a feature event during the first base event can be independent of whether the first start input includes the first auxiliary input.

The start input determination module 918 can be configured to determine, by the processor, the second start input includes an auxiliary input. The start input determination module 918 can be configured to determine, by the processor, whether one or more other start inputs include an auxiliary input.

The setup selection determination module 920 can be configured to determine a first setup selection for the computing system has been canceled. The setup selection determination module 920 can be configured to determine a second setup selection for the computing system has been entered. By way of non-limiting example, one of the first setup selection or the second setup selection can include a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system.

The start input receiving module 922 can be configured to receive a second start input at the processor while the computing system is operating in the first state. Receiving the second start input can occur before receiving the first start input or while monitoring for receiving the next start input. Receiving the second start input can occur before receiving the first start input or while monitoring for receiving the next start input.

The input determination module 924 can be configured to determine, by the processor, an auxiliary input is not received for the second base event. The auxiliary input can include a side wager.

In some implementations, the computing system can include a second counter corresponding to the first user of the computing system or at least one additional counter corresponding to at least one additional user of the computing system.

In some implementations, the computing platform 902, the remote platform 904, and/or the external resources 926 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which the computing platform 902, the remote platform 904, and/or the external resources 926 can be operatively linked via some other communication media.

A given remote platform of the remote platform 904 can include one or more processors configured to execute computer program modules. The computer program modules can be configured to enable an expert or user associated with the given remote platform 904 to interface with the computing system 900 and/or the external resources 926, and/or provide other functionality attributed herein to the remote platform 904. By way of non-limiting example, the given remote platform of the remote platform 904 and/or a given computing platform of the computing platform 902 can include one or more of a slot machine, a server, a desktop computer, a laptop computer, a handheld computer, a tablet computing platform, a NetBook, a Smartphone, a gaming console, and/or other computing platforms.

The external resources 926 can include sources of information outside of the computing system 900, external entities participating with the computing system 900, and/or other resources. In some implementations, some or all of the functionality attributed herein to the external resources 926 can be provided by resources included in the computing system 900.

The computing platform 902 can include the electronic storage 928, the processor 930, and/or other components. The computing platform 902 can include communication lines, or ports to enable the exchange of information with a network and/or other computing platforms. Illustration of the computing platform 902 in FIG. 9 is not intended to be limiting. The computing platform 902 can include a plurality of hardware, software, and/or firmware components operating together to provide the functionality attributed herein to the computing platform 902. For example, the computing platform 902 can be implemented by a cloud of computing platforms operating together as the computing platform 902.

The electronic storage 928 can comprise non-transitory storage media that electronically stores information. The electronic storage media of the electronic storage 928 can include one or both of system storage that is provided integrally (i.e., substantially non-removable) with the computing platform 902 and/or removable storage that is removably connectable to the computing platform 902 via, for example, a port (e.g., a USB port, a firewire port, etc.) or a drive (e.g., a disk drive, etc.). The electronic storage 928 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 928 can include one or more virtual storage resources (e.g., cloud storage, a virtual private network, and/or other virtual storage resources). The electronic storage 928 can store software algorithms, information determined by the processor 930, information received from the computing platform 902, information received from the remote platform 904, and/or other information that enables the computing platform 902 to function as described herein.

The processor 930 can be configured to provide information processing capabilities in the computing platform 902. The processor 930 can include one or more processors, such as one or more hardware processors. As such, the processor 930 can include one or more of a digital processor, an analog processor, a digital circuit designed to process information, an analog circuit designed to process information, a state machine, and/or other mechanisms for electronically processing information. Although the processor 930 is shown in FIG. 9 as a single entity, this is for illustrative purposes only. In some implementations, the processor 930 can include a plurality of processing units. These processing units can be physically located within the same device, or the processor 930 can represent processing functionality of a plurality of devices operating in coordination. The processor 930 can be configured to execute the modules 908, 910, 912, 914, 916, 918, 920, 922, and/or 924, and/or other modules. The processor 930 can be configured to execute the modules 908, 910, 912, 914, 916, 918, 920, 922, and/or 924, and/or other modules by software; hardware; firmware; some combination of software, hardware, and/or firmware; and/or other mechanisms for configuring processing capabilities on the processor 930. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although the modules 908, 910, 912, 914, 916, 918, 920, 922, and/or 924 are illustrated in FIG. 9 as being implemented within a single processing unit, in implementations in which the processor 930 includes multiple processing units, one or more of the modules 908, 910, 912, 914, 916, 918, 920, 922, and/or 924 can be implemented remotely from the other modules. The description of the functionality provided by the different modules 908, 910, 912, 914, 916, 918, 920, 922, and/or 924 described below is for illustrative purposes, and is not intended to be limiting, as any of the modules 908, 910, 912, 914, 916, 918, 920, 922, and/or 924 can provide more or less functionality than is described. For example, one or more of the modules 908, 910, 912, 914, 916, 918, 920, 922, and/or 924 can be eliminated, and some or all of its functionality can be provided by other ones of the modules 908, 910, 912, 914, 916, 918, 920, 922, and/or 924. As another example, the processor 930 can be configured to execute one or more additional modules that can perform some or all of the functionality attributed below to one of the modules 908, 910, 912, 914, 916, 918, 920, 922, and/or 924.

Next, FIG. 10A is a flow chart showing a set 1000 of functions of that can be carried out using a computing system (e.g., the computing system 100, 100*a*, 100*a*, 100*b*, 800), a computing platform (e.g., the computing platform 802), a remote platform (e.g., the remote platform 804) and/or other computing resources. A method of the example embodiments can include one or more functions of the set 1000 and/or a portion of one or more functions of the set 1000. Additionally, the order in which the functions of set 1000 are illustrated in FIG. 10A and described below is not intended to be limiting.

Accordingly, a method based on one or more functions of the set 1000 can include a computer-implemented method involving a software application executed by a computing system (e.g., the computing system 800, the computing platform 802, the remote platform 804, and/or other computing resources, machine-readable instructions 806, one or more of the start input receiving module 808, the base event performance module 810, the feature event trigger determination module 812, the indication outputting module 814, the start input determination module 816, the setup selection determination module 818, the input determination module 820, and/or other instruction modules) with and/or in communication with a display screen.

In at least some implementations, execution of the software application causes vertical symbol display segments and/or animations that simulate spinning a plurality of reels to be graphically displayed on a display screen. A memory (e.g., the memory 114, 114*a*, 114*b*, the electronic storage 824 of the computing platform 802, and/or other memories) can store a global symbol group including a plurality of symbols. Subsets of the global symbol group and/or the plurality of symbols are displayable in a respective vertical symbol display segment of the display screen.

Block 1002 includes receiving a first start input at a processor of a computing system. The function(s) of block 1002 can be performed by one or more hardware processors configured by machine-readable instructions including a module that is the same as or similar to the start input receiving module 808, in accordance with the example embodiments. As an example, the processor can operate the computing system in a first state when receiving the first start input and configured with a setup selection for the first state. As an example, the setup selection for the first state can include one or more of a type selection of a particular type of base event, a user selection of a particular user of the computing system, a mode selection of an anonymous user mode, or a value selection of a particular value for start inputs, as discussed with respect to the start input receiving module 808. In least some implementations, the computing system includes a feature event threshold and a counter. In least some implementations, the computing system includes the computing system 100, 100*a*, 100*b*, 800.

Next, block 1004 includes performing, by the computing system, a first base event in response to receiving the first start input. The function(s) of block 1004 can be performed by one or more hardware processors configured by machine-readable instructions including a module that is the same as or similar to the base event performance module 810, in accordance with the example embodiments. As an example, the processor can perform a first base event as a reel-based event, a poker event, a blackjack event, a baccarat event, a craps event, a wheel event, a pachinko event, or a roulette event, as discussed with respect to the base event performance module 810.

Next, block 1006 includes determining, by the processor, whether a first feature event trigger occurs during the first base event. The function(s) of block 1006 can be performed by one or more hardware processors configured by machine-readable instructions including a module that is the same as or similar to the feature event trigger determination module 812, in accordance with the example embodiments. If the processor determines the first feature event trigger occurs during the first base event, then the processor resets a counter based on the first base event and switches the computing system to operate in a feature event state. If the processor determines the first feature event trigger does not occur during the first base event, then the processor determines whether the counter meets the feature event threshold. If the processor determines the counter meets the feature event threshold, then the processor resets the counter based on the first base event and switches the computing system to operate in the feature event state; or if the processor determines the counter does not meet the feature event threshold, then the processor increments the counter based on the first base event and begins monitoring for receiving a next start input.

Next, FIG. 10B shows block 1008. In accordance with the example embodiments, a method including one or more functions of the set 1000 can include performing one or more functions corresponding to block 1008.

Block 1008 includes further including outputting, to a display, an indication of one or more from among: the amount of time, a particular amount of time counted by a timer for tracking a particular passage of the amount of time, or a difference between the amount of time and the particular amount of time counted by the timer for tracking the particular passage of the amount of time. The function(s) of block 1008 can be performed by one or more hardware processors configured by machine-readable instructions including a module that is the same as or similar to the indication outputting module 814, in accordance with the example embodiments.

Next, FIG. 10C shows block 1010. In accordance with the example embodiments, a method including one or more functions of the set 1000 can include performing one or more functions corresponding to block 1010.

Block 1010 includes further including outputting, to a display, an indication of one or more of a threshold number indicative of the feature event threshold, a counter number indicative of the counter, or a difference number indicative of a difference between the feature event threshold and the counter. The function(s) of block 1010 can be performed by one or more hardware processors configured by machine-readable instructions including a module that is the same as or similar to the indication outputting module 814, in accordance with the example embodiments.

Next, FIG. 10D shows block 1012. In accordance with the example embodiments, a method including one or more functions of the set 1000 can include performing one or more functions corresponding to block 1012.

Block 1012 includes determining, by the processor before the processor resets or increments the counter based on the first base event, that the first start input includes a first auxiliary input. The function(s) of block 1012 can be performed by one or more hardware processors configured by machine-readable instructions including a module that is the same as or similar to the start input determination module 816, in accordance with the example embodiments. A method including one or more functions of the set 1000 and/or the function(s) of the block 1012 can include the processor determining whether a second start input includes an auxiliary input.

Next, FIG. 10E shows block 1014, 1016. In accordance with the example embodiments, a method including one or more functions of the set 1000 can include performing one or more functions corresponding to block 1014 and/or block 1016.

Block 1014 includes determining a first setup selection for the computing system has been canceled. The function(s) of block 1014 can be performed by one or more hardware processors configured by machine-readable instructions including a module that is the same as or similar to the setup selection determination module 818, in accordance with the example embodiments. As an example, the processor can determine that the first setup selection includes a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system, as discussed with respect to the setup selection determination module 818.

Block 1016 includes determining a second setup selection for the computing system has been entered. One of the first setup selection or the second setup selection can include a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system. The function(s) of block 1016 can be performed by one or more hardware processors configured by machine-readable instructions including a module that is the same as or similar to the setup selection determination module 818, in accordance with the example embodiments.

Next, FIG. 10F shows block 1018, 1020, 1022, 1024. In accordance with the example embodiments, a method including one or more functions of the set 1000 can include performing one or more functions corresponding to block 1018, block 1020, block 1022, and/or block 1024.

Block 1018 includes receiving a second start input at the processor. The function(s) of block 1018 can be performed by one or more hardware processors configured by machine-readable instructions including a module that is the same as or similar to the start input receiving module 808, in accordance with the example embodiments. As an example, the processor can operate the computing system in a first state when receiving the second start input and configured with a setup selection for the first state, such as a setup selection for the first state discussed with respect to block 1002.

Next, block 1020 includes performing, by the computing system, a second base event in response to receiving the second start input. The function(s) of block 1020 can be performed by one or more hardware processors configured by machine-readable instructions including a module that is the same as or similar to the base event performance module 810, in accordance with the example embodiments.

Next, block 1022 includes determining, by the processor, whether a second feature event trigger occurs during the second base event. The function(s) of block 1022 can be performed by one or more hardware processors configured by machine-readable instructions including a module that is the same as or similar to the feature event trigger determination module 812, in accordance with the example embodiments.

Next, block 1024 includes determining, by the processor, the second start input includes an auxiliary input. The function(s) of block 1024 can be performed by one or more hardware processors configured by machine-readable instructions including a module that is the same as or similar to the start input determination module 816, in accordance with the example embodiments.

Next, FIG. 10G shows block 1026, 1028, 1030, 1032. In accordance with the example embodiments, a method including one or more functions of the set 1000 can include performing one or more functions corresponding to block 1026, block 1028, block 1030, and/or block 1032.

Block 1026 includes receiving a second start input at the processor. The function(s) of block 1026 can be performed by one or more hardware processors configured by machine-readable instructions including a module that is the same as or similar to the start input receiving module 808, in accordance with the example embodiments.

Next, block 1028 includes performing, by the computing system, a second base event in response to receiving the second start input. The function(s) of block 1028 can be performed by one or more hardware processors configured by machine-readable instructions including a module that is the same as or similar to the base event performance module 810, in accordance with the example embodiments.

Next, block 1030 includes determining, by the processor, whether a second feature event trigger occurs during the second base event. The function(s) of block 1030 can be performed by one or more hardware processors configured by machine-readable instructions including a module that is the same as or similar to feature event trigger determination module 812, in accordance with the example embodiments.

Next, block 1032 includes determining, by the processor, an auxiliary input is not received for the second base event. The function(s) of block 1032 can be performed by one or more hardware processors configured by machine-readable instructions including a module that is the same as or similar to the input determination module 820, in accordance with the example embodiments.

Next, FIG. 11A is a flow chart showing a set 1100 of functions that can be carried out using the computing system (e.g., the computing system 100, 100*a*, 100*a*, 100*b*, 900), a computing platform (e.g., the computing platform 902), a remote platform (e.g., the remote platform 904) and/or other computing resources. A method of the example embodiments can include one or more functions of the set 1100 and/or a portion of one or more functions of the set 1100. Additionally, the order in which the functions of set 1100 are illustrated in FIG. 11A and described below is not intended to be limiting.

Accordingly, a method based on one or more functions of the set 1100 can include a computer-implemented method involving a software application executed by a computing system (e.g., the computing system 900, the computing platform 902, the remote platforms 904, the machine-readable instructions 906, the computing system monitoring module 908, the computing system switching module 910, the base event performance module 912, the feature event trigger determination module 914, the indication outputting module 916, the start input determination module 918, the setup selection determination module 920, the start input receiving module 922, the input determination module 924, and/or other computing resources) with and/or in communication with a display screen.

In at least some implementations, execution of the software application causes vertical symbol display segments and/or animations that simulate spinning a plurality of reels to be graphically displayed on a display screen. A memory (e.g., the memory 114, 114*a*, 114*b*, the electronic storage 928 of the computing platform 902, and/or other memories) can store a global symbol group including a plurality of symbols. Subsets of the global symbol group and/or the plurality of symbols are displayable in a respective vertical symbol display segment of the display screen.

Block 1102 includes monitoring, by a processor of a computing system operating in a first state for receiving a start input. The function(s) of block 1102 can be performed by a processor configured by machine-readable instructions including a module that is the same as or similar to the computing system monitoring module 908, in accordance with the example embodiments.

Next, block 1104 includes switching, by the processor in response to receiving a first start input, the computing system to operate in a second state for playing a base event. The function(s) of block 1104 can be performed by a hardware processor configured by machine-readable instructions including a module that is the same as or similar to the computing system switching module 910, in accordance with the example embodiments.

Next, block 1106 includes performing, by the computing system while operating in the second state, a first base event in response to receiving the first start input. The function(s) of block 1106 can be performed by a processor configured by machine-readable instructions including a module that is the same as or similar to the base event performance module 912, in accordance with the example embodiments. As an example, the processor can perform a first base event as a reel-based event, a poker event, a blackjack event, a baccarat event, a craps event, a wheel event, a pachinko event, or a roulette event, as discussed with respect to the base event performance module 912.

Next, block 1108 includes determining, by the processor, whether a first feature event trigger occurs during the first base event. The function(s) of block 1108 can be performed by a processor configured by machine-readable instructions including a module that is the same as or similar to the feature event trigger determination module 914, in accordance with the example embodiments.

The following aspects correspond to one or more of block 1102, 1104, 1106, 1108. If the first feature event trigger occurs during the first base event, then the processor resets a counter based on the first base event and switches the computing system to a feature event state, as discussed with respect to the feature event trigger determination module 914. The computing system performs at least one instance of the feature event while operating in the feature event state and then the processor switches the computing system to operating in the first state to begin monitoring for receiving the next start input.

In at least some implementations, the counter includes a first counter corresponding to a first user of the computing system. Additionally, the computing system can include one or more of the following: a second counter corresponding to the first user of the computing system, or at least one additional counter corresponding to at least one additional user of the computing system.

Additionally, if the feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and switches the computing system to operating in the first state to begin monitoring for receiving a next start input.

Furthermore, the computing system can be configured with a setup selection for the first state, the setup selection for the first state can include one or more from among: a type selection of a particular type of base event, a use selection of a particular user of the computing system, a mode selection of an anonymous user mode, or a value selection of a particular value for start inputs, as discussed with respect to the computing system monitoring module 908.

In at least some implementations, the feature event threshold is based at least in part on one or more from among: an amount of time, a quantity of base events expected to be performed during a passage of the amount of time, or a quantity of times to initiate the feature event during the passage of the amount of time.

FIG. 11B shows block 1110. In accordance with the example embodiments, a method including one or more functions of the set 1100 can include performing one or more functions corresponding to block 1110.

Block 1110 includes outputting, to a display, an indication of one or more from among: the amount of time, a particular amount of time counted by a timer for tracking a particular passage of the amount of time, or a difference between the amount of time and the particular amount of time counted by the timer for tracking the particular passage of the amount of time. The function(s) of block 1110 can be performed by a processor configured by machine-readable instructions including a module that is the same as or similar to the indication outputting module 916, in accordance with the example embodiments.

FIG. 11C shows block 1112. In accordance with the example embodiments, a method including one or more functions of the set 1100 can include performing one or more functions corresponding to block 1112.

Block 1112 includes outputting, to a display, an indication of one or more from among: a number indicative of the feature event threshold, a number indicative of the counter, or a number indicative of a difference between the feature event threshold and the counter. The function(s) of block 1112 can be performed by a processor configured by machine-readable instructions including a module that is the same as or similar to the indication outputting module 916, in accordance with the example embodiments.

FIG. 11D shows block 1114. In accordance with the example embodiments, a method including one or more functions of the set 1100 can include performing one or more functions corresponding to block 1114.

Block 1114 includes determining, by the processor before the processor resets or increments the counter based on the first base event, that the first start input includes a first auxiliary input. The function(s) of block 1114 can be performed by a processor configured by machine-readable instructions including a module that is the same as or similar to the start input determination module 918, in accordance with the example embodiments.

In some implementations, the first start input is associated with a first value, the first auxiliary input is associated with a second value, and the second value is based on the first value.

In some implementations, a probability of triggering a feature event during the first base event is independent of whether the first start input includes the first auxiliary input.

FIG. 11E shows block 1116, 1118. In accordance with the example embodiments, a method including one or more functions of the set 1100 can include performing one or more functions corresponding to block 1116 and/or 1118.

Block 1116 includes determining a first setup selection for the computing system has been canceled. The function(s) of block 1116 can be performed by a processor configured by machine-readable instructions including a module that is the same as or similar to the setup selection determination module 920, in accordance with the example embodiments.

Next, block 1118 includes determining a second setup selection for the computing system has been entered. The function(s) of block 1118 can be performed by a processor configured by machine-readable instructions including a module that is the same as or similar to the setup selection determination module 920, in accordance with the example embodiments.

One of the first setup selection or the second setup selection can include: a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system.

FIG. 11F shows block 1120, 1122, 1124, 1126. In accordance with the example embodiments, a method including one or more functions of the set 1100 can include performing one or more functions corresponding to block 1120, block 1122, block 1124, and/or block 1126.

Block 1120 includes receiving a second start input at the processor while the computing system is operating in the first state. The function(s) of block 1120 can be performed by a processor configured by machine-readable instructions including a module that is the same as or similar to the start input receiving module 922, in accordance with the example embodiments. In some implementations, receiving the second start input can occur before receiving the first start input or while monitoring for receiving the next start input.

Next, block 1122 includes performing, by the computing system, a second base event in response to receiving the second start input. The function(s) of block 1122 can be performed by a processor configured by machine-readable instructions including a module that is the same as or similar to the base event performance module 912, in accordance with the example embodiments. In some implementations, the first start input includes a first wager, the second base event includes a second wager, and the auxiliary input includes a side wager.

Next, block 1124 includes determining, by the processor, whether a second feature event trigger occurs during the second base event. The function(s) of block 1124 can be performed by a processor configured by machine-readable instructions including a module that is the same as or similar to the feature event trigger determination module 914, in accordance with the example embodiments.

Next, block 1126 includes determining, by the processor, the second start input includes an auxiliary input. The function(s) of block 1126 can be performed by a processor configured by machine-readable instructions including a module that is the same as or similar to the start input determination module 918, in accordance with the example embodiments.

The following aspects correspond to one or more of block 1120, 1122, 1124, 1126. If the second feature event trigger occurs during the second base event, then the processor resets the counter based on the second base event and switches the computing system to operate in the feature event state. Additionally, if the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and switches the computing system to operate in the first state to begin monitoring for receiving a further next start input.

FIG. 11G shows block 1128, 1130, 1132, 1134. In accordance with the example embodiments, a method including one or more functions of the set 1100 can include performing one or more functions corresponding to block 1128, block 1130, block 1132, and/or block 1134.

Block 1128 includes receiving a second start input at the processor while the computing system is operating in the first state. The function(s) of block 1128 can be performed by a processor configured by machine-readable instructions including a module that is the same as or similar to the start input receiving module 922, in accordance with the example embodiments. In some implementations, receiving the second start input can occur before receiving the first start input or while monitoring for receiving the next start input.

Next, block 1130 includes performing, by the computing system, a second base event in response to receiving the second start input. The function(s) of block 1130 can be performed by a processor configured by machine-readable instructions including a module that is the same as or similar to the base event performance module 912, in accordance with the example embodiments. In some implementations, the first start input includes a first wager, the second base event includes a second wager, and the auxiliary input includes a side wager.

Next, block 1132 includes determining, by the processor, whether a second feature event trigger occurs during the second base event. The function(s) of block 1132 can be performed by a processor configured by machine-readable instructions including a module that is the same as or similar to the feature event trigger determination module 914, in accordance with the example embodiments.

Next, block 1134 includes determining, by the processor, an auxiliary input is not received for the second base event. The function(s) of block 1134 can be performed by a processor configured by machine-readable instructions including a module that is the same as or similar to input determination module 924, in accordance with the example embodiments.

The following aspects correspond to one or more of block 1128, 1130, 1132, 1134. If the second feature event trigger occurs during the second base event, then the processor switches the computing system to operate in the feature event state. Additionally, if the second feature event trigger does not occur during the second base event, then the processor switches the computing system to operate in the first state to begin monitoring for receiving a further next start input.

In at least some implementations of a method including one or more functions of the block 1102, 1104, 1106, 1108, the computing system includes a display and a group of symbols arranged on a plurality of reels. The computing system outputs the plurality of reels on the display. Performing the first base event includes spinning the plurality of reels output on the display, stopping the plurality of reels at respective reel stops, and displaying, on the display, a subset of the group of symbols based on the respective reel stops.

IV. Example Graphical User Interfaces

Figure 12:
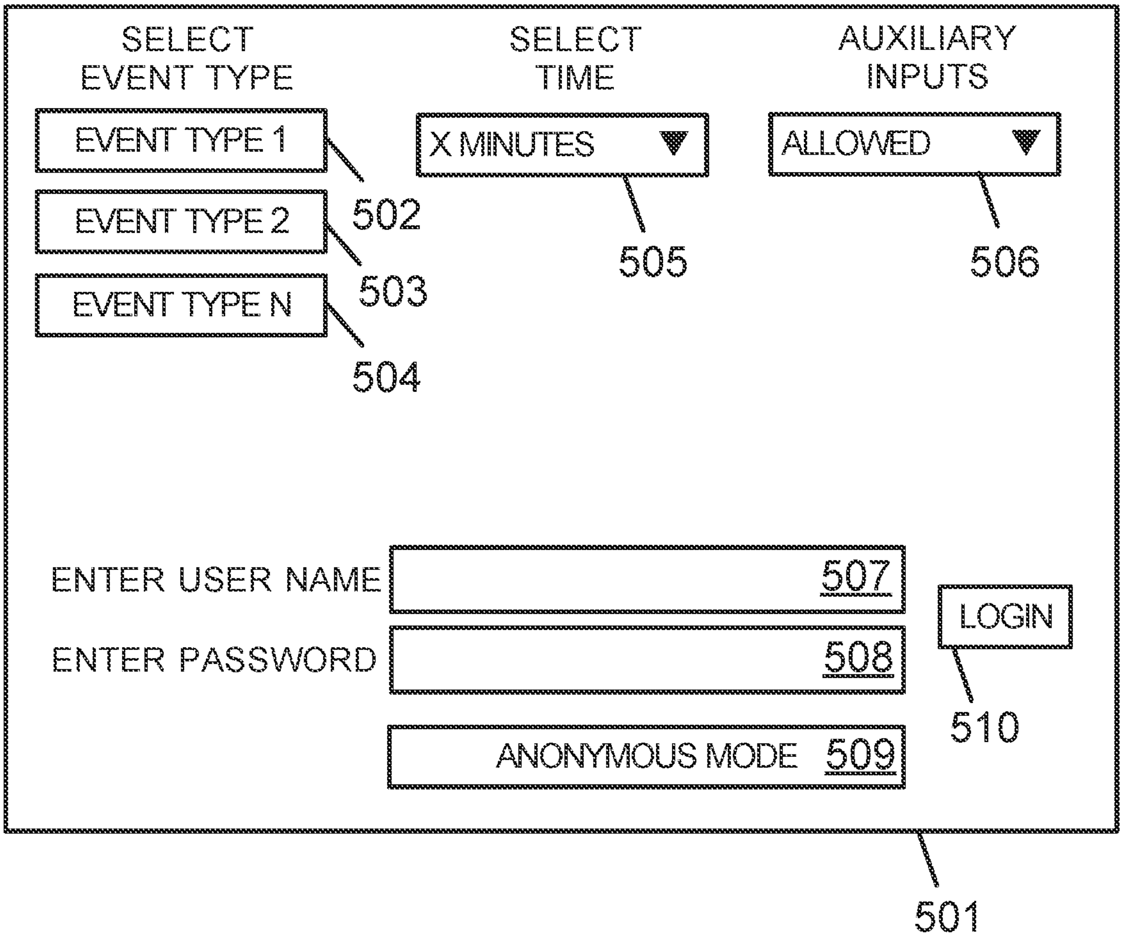
FIG. 12, FIG. 13, FIG. 14, FIG. 15, FIG. 16, FIG. 17, FIG. 18, FIG. 19, and FIG. 20 shows a graphical user interface in accordance with the example embodiments.

Next, FIG. 12 shows a GUI 501 in accordance with the example embodiments. A computing system, such as the computing system 100, 100*a*, 100*b*, 800, 900, can output the GUI 501 on a display. The GUI 501 can be displayed for making a setup selection. As an example, the GUI 501 can be displayed while the computing system operates in the setup selection state 602, 702.

The GUI 501 includes a USC 502, 503, 504 to select an event type for a base event or a feature event. In some implementations, a feature event type is associated with a base event type such that a feature event type does not need to be selected. As an example, the USC 502, 503, 504 can indicate a reel-based event, a poker event, a blackjack event, a baccarat event, a dice event, a craps event, a wheel event, a pachinko event, a wheel event, or a roulette event.

The GUI 501 includes a USC 505, such as a drop-down USC, for selecting an amount of time a user plans to use the computing system to perform base events. The GUI 501 includes a USC 506, such as a drop-down USC, for selecting whether entering auxiliary inputs is permitted or prohibited.

In some implementations, the computing system determines an amount of time a user plans to use the computing system to perform base events based on prior use of the computing system by the user to perform base events.

The GUI 501 includes a field 507 for inputting and/or selecting a user name of a user of the computing device. The GUI 501 includes a field 508 for inputting a password of a user of the computing device. The GUI 501 includes a USC 510 for logging into a server computing system based on the user name entered via the field 507 and the password entered via the field 508.

The GUI 501 includes a USC 509 for selecting performing base events in an anonymous mode.

Figure 13:
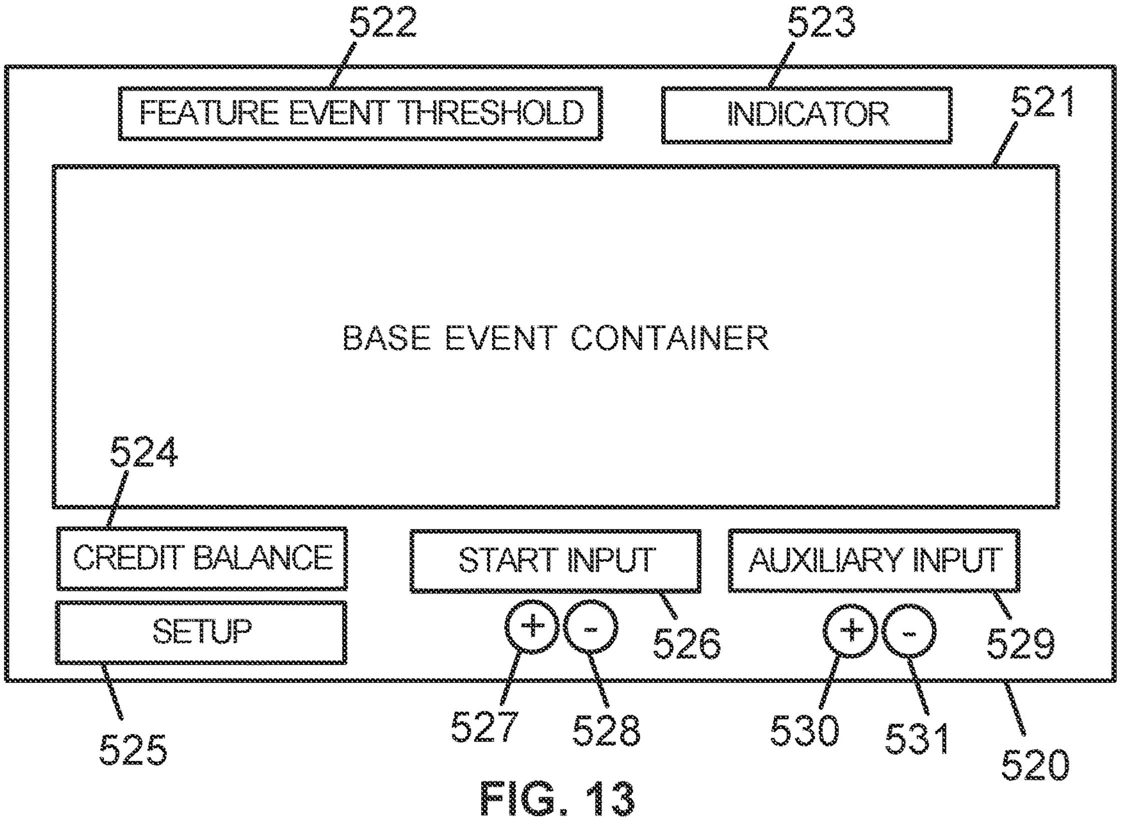

Next, FIG. 13 shows a GUI 520 in accordance with the example embodiments. A computing system, such as the computing system 100, 100*a*, 100*b*, 800, 900, can output the GUI 520 on a display. The GUI 520 includes a container 521 for displaying aspects of a base event. As an example, the aspects shown in FIG. 4, FIG. 5, FIG. 15, FIG. 16, FIG. 17, FIG. 18, FIG. 19, and FIG. 20 or some portion of those aspects can be shown in the container 521.

The GUI 520 includes a feature event threshold indicator 522, an indicator 523, and a credit balance indicator 524. The feature event threshold indicator 522 can indicate the feature event threshold 360, such as feature event threshold determined for a selected type of base event, a user, a performance time, a start input, an auxiliary input, and/or some other parameter discussed in this description. The indicator 523 can indicate a value, such as a value of the counter 358 or a value in the values 359. As an example, the indicator 523 can indicate a value indicating progress toward meeting the feature event threshold shown by feature event threshold indicator 522 or an award earned during performance of an event. The credit balance indicator 524 can indicate a quantity of credits available to a user of the computing system to perform events.

The GUI 520 includes a USC 525 selectable to cause the computing system to display a GUI for selecting a setup selection. As an example, that GUI for selecting the setup selection can include and/or be arranged with aspects of the GUI 501 shown in FIG. 12.

The GUI 520 includes a start input indicator 526 configured to display a value of a start input (e.g., a wager, a first start input, and/or a second start input). The GUI 520 includes a USC 527, 528 selectable to increase or decrease, respectively, an amount indicated by the start input indicator 526. In at least some implementations, the start input indicator 526 can be configured as a USC selectable to initiate a base event.

The GUI 520 includes an auxiliary input indicator 529 configured to display a value of an auxiliary input. The GUI 520 includes a USC 530, 531 selectable to increase or decrease, respectively, an amount indicated by the auxiliary input indicator 529 (e.g., an auxiliary input discussed with respect to FIG. 7 or elsewhere in this description).

Figure 14:
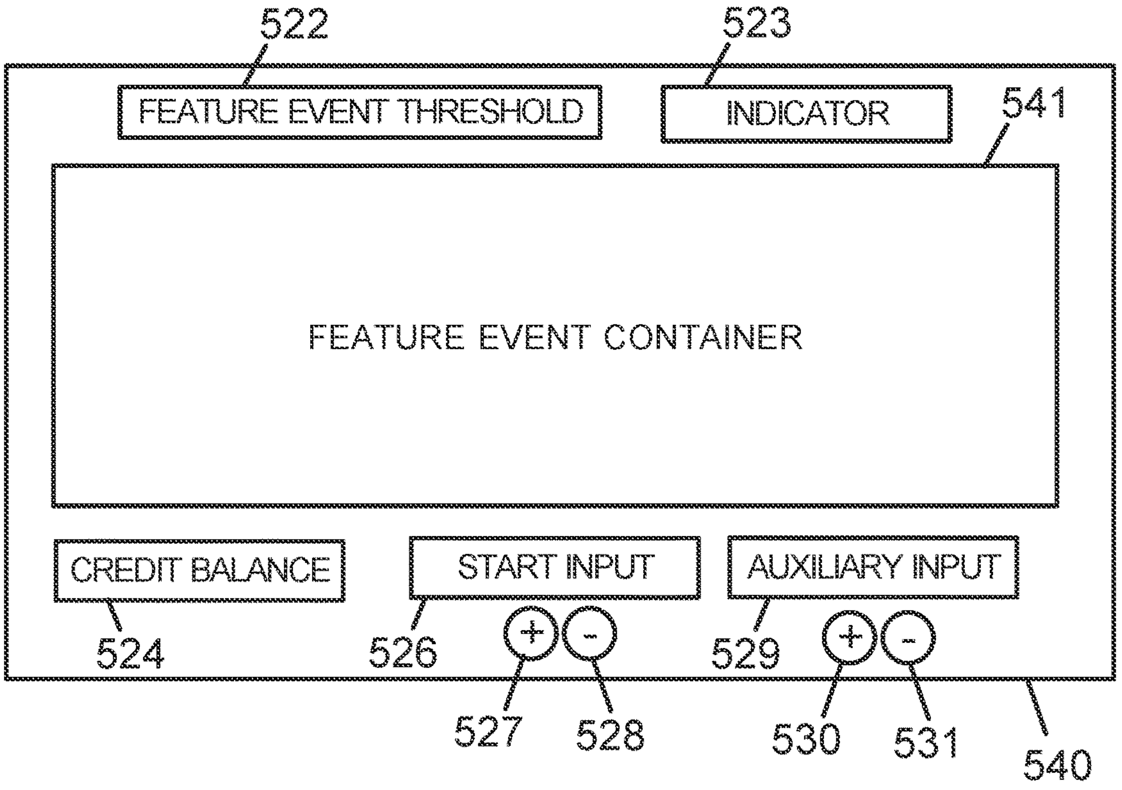

Next, FIG. 14 shows a GUI 540 in accordance with the example embodiments. A computing system, such as the computing system 100, 100*a*, 100*b*, 800, 900, can output the GUI 540 on a display. The GUI 540 includes a container 541 for displaying aspects of a feature event. As an example, the aspects shown in FIG. 4, FIG. 5, FIG. 15, FIG. 16, FIG. 17, FIG. 18, FIG. 19, and FIG. 20 or some portion of those aspects can be shown in the container 541. Other aspects shown in FIG. 14 are shown in and discussed with respect to FIG. 13.

Figure 15:
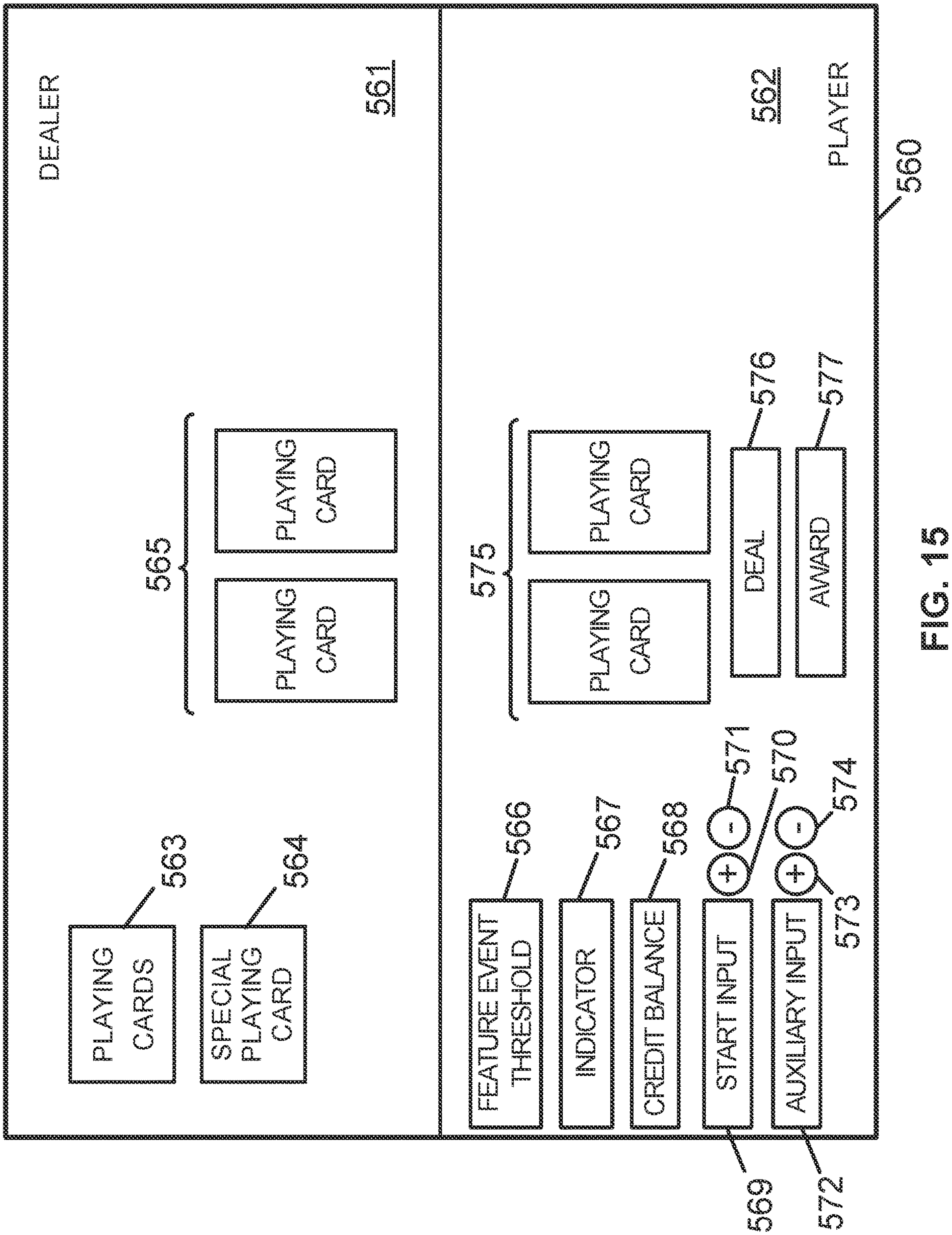

Next, FIG. 15 shows a GUI 560 in accordance with the example embodiments. A computing system, such as the computing system 100, 100*a*, 100*b*, 800, 900, can output the GUI 560 on a display in connection with a playing card event. The GUI 560 includes a container 561 for displaying aspects of a dealer hand of the playing card event, and a container 562 for displaying aspects of a user hand of the playing card event. As an example, the container 561 includes an icon 563 representing one or more cards of a stack of cards available for dealing to a dealer hand 565 or a user hand 575. As another example, the container 561 can include an icon 564 representing a special player card available for dealing to the dealer hand 565 and/or the user hand 575. As an example, the special player card can be a joker playing card or some other playing card. The playing card represented by the icon 564 can be face up or face down. In at least some implementations, a feature event can include dealing the special playing card to the user hand 575. Triggering the feature event can include the user hand 575 including a particular combination and/or value of playing cards. The dealer hand 565 and/or the user hand 575 can include one or more playing cards. One or more playing cards shown in the dealer hand 565 or the user hand 575 can be displayed face up or face down.

The GUI 560 includes a feature event threshold indicator 566, an indicator 567, and a credit balance indicator 568. The feature event threshold indicator 566 can indicate the feature event threshold 360, such as feature event threshold determined for a selected type of base event, a user, a performance time, a start input, an auxiliary input, and/or some other parameter discussed in this description. The indicator 567 can indicate a value, such as a value of the counter 358 or a value in the values 359. As an example, the indicator 567 can indicate a value indicating progress toward meeting the feature event threshold shown by feature event threshold indicator 566 or an award earned during performance of an event. The credit balance indicator 568 can indicate a quantity of credits available to a user of the computing system to perform events.

The GUI 560 includes a start input indicator 569 configured to display a value of a start input. The GUI 560 includes a USC 570, 571 selectable to increase or decrease, respectively, an amount indicated by the start input indicator 569. The start input indicator 569 and the USC 570, 571 may be omitted if the GUI 560 is used for a feature event.

The GUI 560 includes an auxiliary input indicator 572 configured to display a value of an auxiliary input. The GUI 560 includes a USC 573, 574 selectable to increase or decrease, respectively, an amount indicated by the auxiliary input indicator 572. The auxiliary input indicator 572 and the USC 573, 574 may be omitted if the GUI 560 is used for a feature event.

The GUI 560 includes a USC 576. In at least some implementations, the USC 576 is selectable to initiate dealing playing cards or dealing a next playing card for a base or feature event corresponding to a playing card event.

The GUI 560 includes an award indicator 577. The award indicator 577 can indicate an amount earned during performance of a playing card event represented in the GUI 560.

Figure 16:
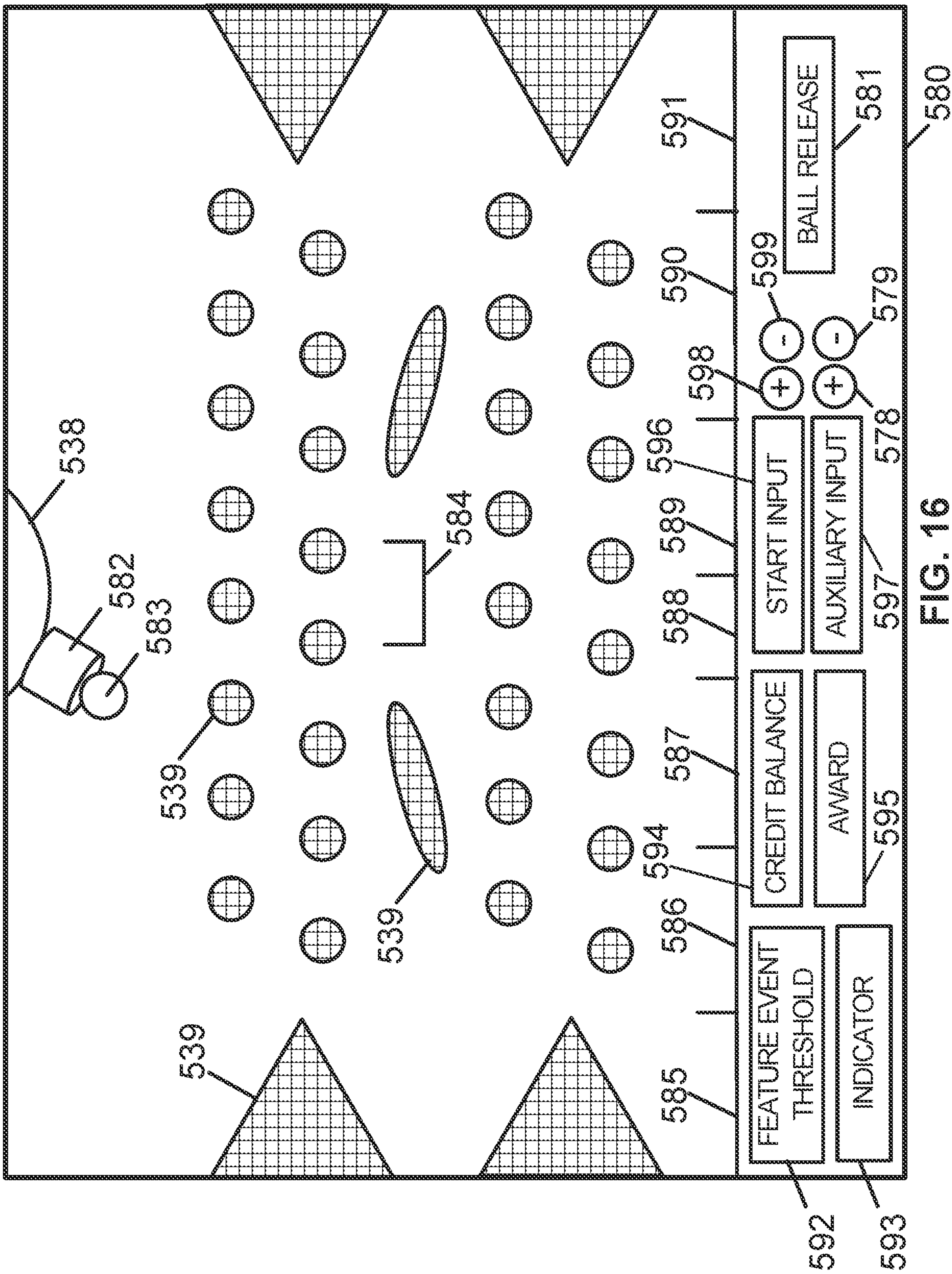

Next, FIG. 16 shows a GUI 580 in accordance with the example embodiments. A computing system, such as the computing system 100, 100*a*, 100*b*, 800, 900, can output the GUI 580 on a display in connection with a pachinko event. The GUI 580 or a portion of the GUI 580 can be displayed and/or arranged within a container, such as the container 521, 541 discussed above. The GUI 580 includes ball guides 539 that are configured to direct and/or redirect a ball 583 as it falls from a ball release 582. The ball guides 539 are shown with a hatch pattern using horizontal and vertical lines. The GUI 580 includes multiple ball targets, such as a ball target 584, 585, 586, 587, 588, 589, 590, 591. Each ball target can correspond to a particular value. The particular value corresponding to a particular ball target can include a dynamic value that the computing system can change randomly or deterministically. As an example, a value corresponding to ball target can represent how many ball(s) will be provided to a user of the computing system in response to a ball landing at the ball target.

The GUI 580 can include a USC 581 selectable to cause the computing system to release pachinko balls from the ball release 582. In some implementations, the ball release 582 can traverse along a guide 538 so that pachinko balls are released at different points within the GUI 580. The USC 581 can also be selectable to cause the computing system to stop releasing pachinko balls from the ball release 582. Additionally or alternatively, a ball release control to stop and start releasing of pachinko balls can be embodied within a hardware USC within a user interface, such as the user interface 54, 104, 104*a*, 104*b*.

The GUI 580 includes a feature event threshold indicator 592, an indicator 593, and a credit balance indicator 594. The feature event threshold indicator 592 can indicate the feature event threshold 360, such as feature event threshold determined for a selected type of base event, a user, a performance time, a start input, an auxiliary input, and/or some other parameter discussed in this description. As an example, the feature event threshold indicator 592 can indicate a quantity of pachinko balls released by the ball release since a pachinko ball landed in the ball target 584 with the ball guides 539 arranged in a first arrangement (e.g., an arrangement of ball guides as shown in FIG. 16). The indicator 593 can indicate a value, such as a value of the counter 358 or a value in the values 359. As an example, the indicator 593 can indicate a value indicating progress toward meeting the feature event threshold shown by feature event threshold indicator 592 or an award earned during performance of an event. The credit balance indicator 594 can indicate a quantity of credits available to a user of the computing system to perform events. As an example, the quantity of credits can indicate a quantity of pachinko balls.

The GUI 580 includes a start input indicator 596 configured to display a value of a start input. The GUI 580 includes a USC 598, 599 selectable to increase or decrease, respectively, an amount indicated by the start input indicator 596. The start input indicator 596 and the USC 598, 599 may be omitted if the GUI 580 is used for a feature event.

The GUI 580 includes an auxiliary input indicator 597 configured to display a value of an auxiliary input. The GUI 580 includes a USC 578, 579 selectable to increase or decrease, respectively, an amount indicated by the auxiliary input indicator 597. The auxiliary input indicator 597 and the USC 578, 579 may be omitted if the GUI 580 is used for a feature event.

The GUI 580 includes an award indicator 595. The award indicator 595 can indicate an amount earned during performance of a pachinko event shown on the GUI 580. As an example, the award indicator 595 can indicate a quantity of pachinko balls awarded as a result of a pachinko ball landing on a ball target within the GUI 580.

Figure 17:
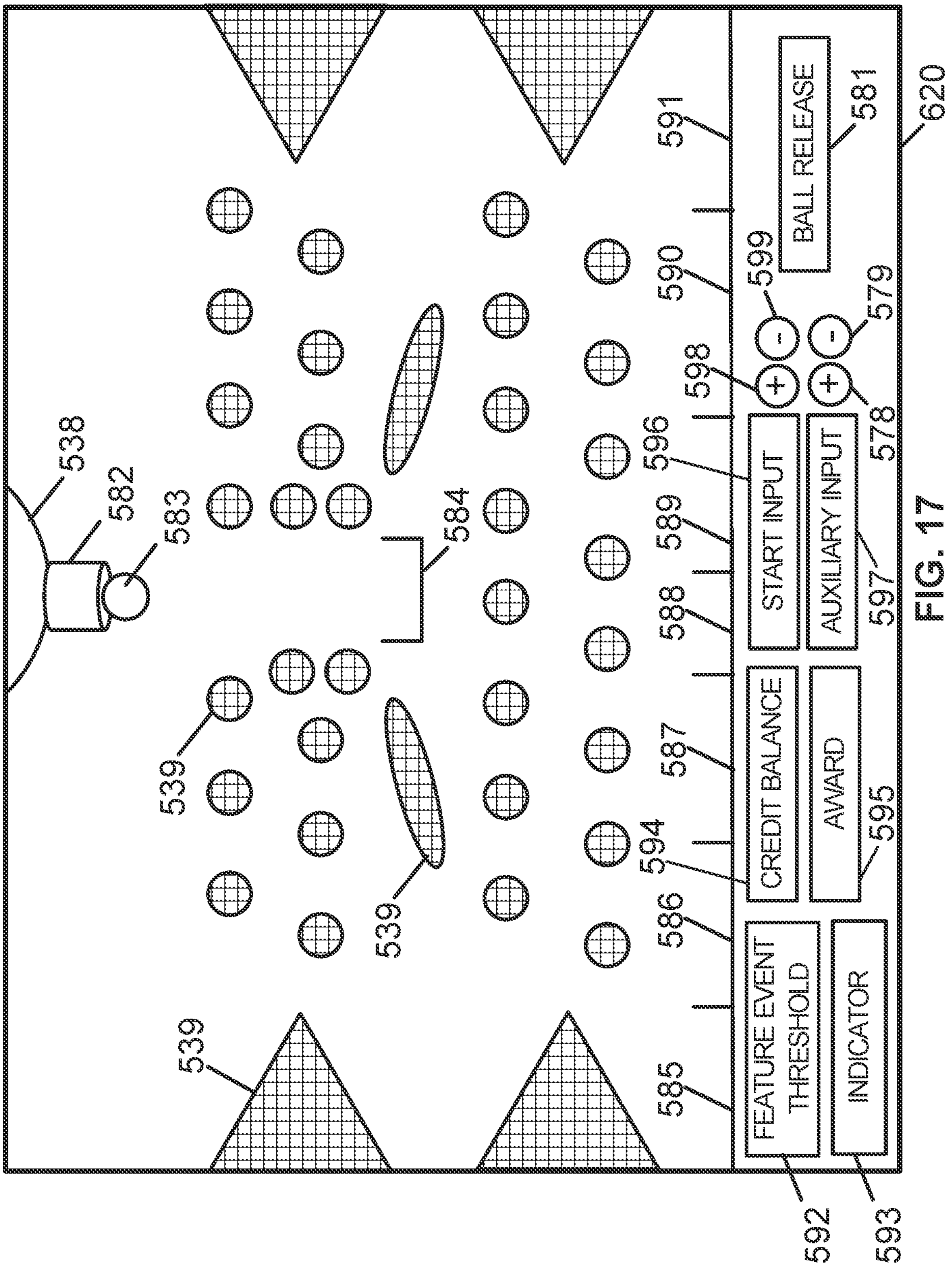

Next, FIG. 17 shows a GUI 620 in accordance with the example embodiments. A computing system, such as the computing system 100, 100*a*, 100*b*, 800, 900, can output the GUI 620 on a display in connection with a pachinko event. The GUI 620 includes the same aspects of the GUI 580 shown in FIG. 16, except that the ball guides 539 in the GUI 580 and the GUI 620 are shown in a different arrangements, and the ball release 582 and the ball 583 are shown in different positions. As an example, the ball release 582 can be fixed at the particular position along the guide 538 as shown in FIG. 17 so that the ball 583 is guaranteed to land within the ball target 584. In some implementations, a value associated with the ball target 584 can be greater than a value associated with any other ball target shown in the GUI 620.

Figure 18:
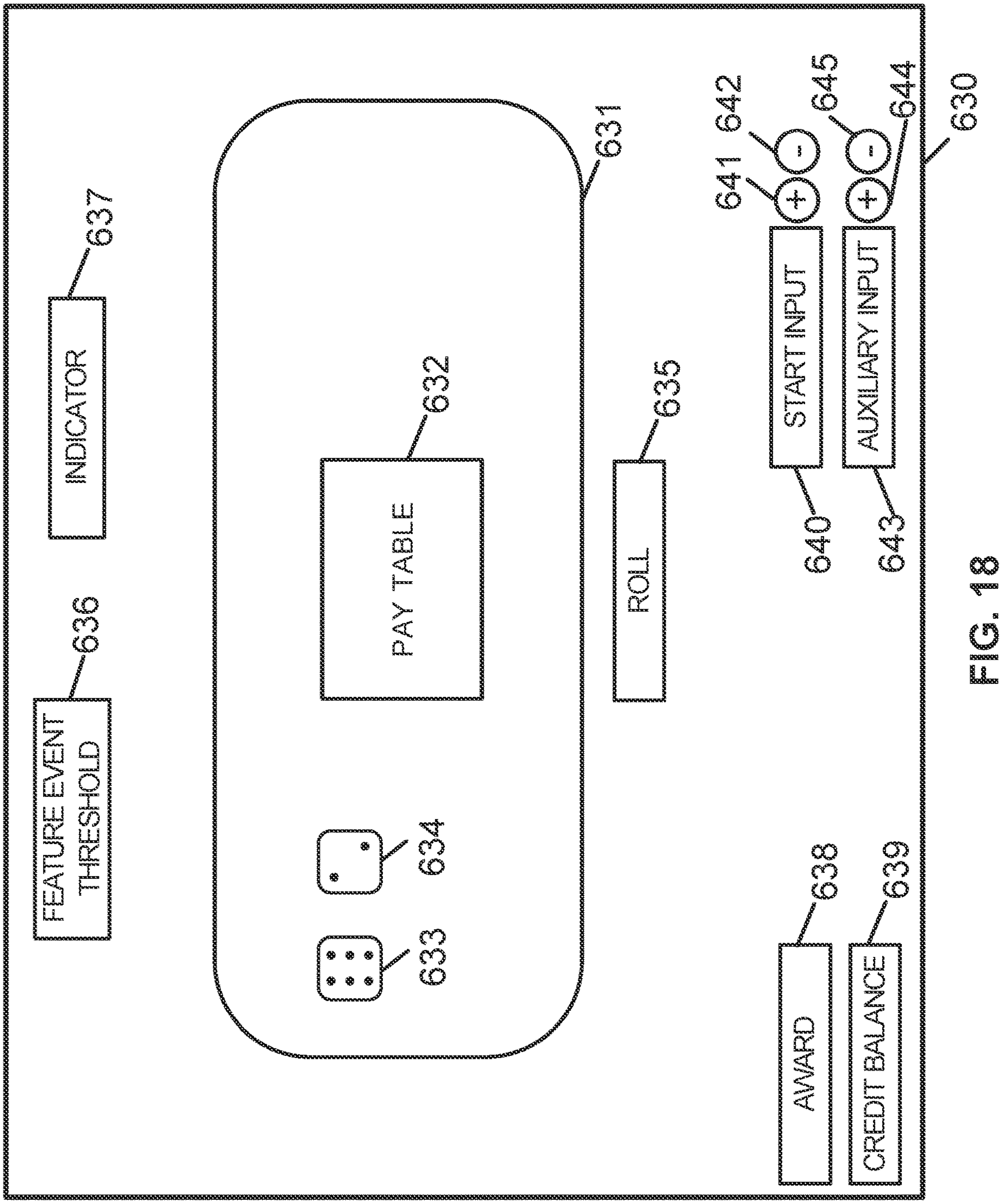

Next, FIG. 18 shows a GUI 630 in accordance with the example embodiments. A computing system, such as the computing system 100, 100*a*, 100*b*, 800, 900, can output the GUI 630 on a display in connection with a dice event. The GUI 630 or a portion of the GUI 630 can be displayed and/or arranged within a container, such as the container 521, 541 discussed above. The GUI 630 includes a dice table 631, such as a craps table, for rolling a die 633, 634. The GUI 630 includes a pay table 632 that can indicate awards that can be earned for rolling certain numeric combinations with the die 633, 634.

The GUI 630 can include a USC 635 selectable to cause the computing system to roll the die 633 and the die 634. Additionally or alternatively, a dice rolling function can be initiated via use of a hardware USC within a user interface, such as the user interface 54, 104, 104*a*, 104*b*.

The GUI 630 includes a feature event threshold indicator 636, an indicator 637, and a credit balance indicator 639. The feature event threshold indicator 636 can indicate the feature event threshold 360, such as feature event threshold determined for a selected type of base event, a user, a performance time, a start input, an auxiliary input, and/or some other parameter discussed in this description. As an example, the feature event threshold indicator 636 can indicate a particular value that can be shown on the die 633, 634 after a roll of the die 633, 634. The feature event threshold indicator 636 can indicate a quantity of rolls of the dice. The indicator 637 can indicate a value, such as a value of the counter 358 or a value in the values 359. As an example, the indicator 637 can indicate a value indicating progress toward meeting the feature event threshold shown by feature event threshold indicator 636 or an award earned during performance of an event. The credit balance indicator 639 can indicate a quantity of credits available to a user of the computing system to perform events. As an example, the quantity of credits can be available for entry of a start input and an auxiliary input.

The GUI 630 includes a start input indicator 640 configured to display a value of a start input. The GUI 630 includes a USC 641, 642 selectable to increase or decrease, respectively, an amount indicated by the start input indicator 640. The start input indicator 640 and the USC 641, 642 may be omitted if the GUI 630 is used for a feature event.

The GUI 630 includes an auxiliary input indicator 643 configured to display a value of an auxiliary input. The GUI 630 includes a USC 644, 645 selectable to increase or decrease, respectively, an amount indicated by the auxiliary input indicator 643. The auxiliary input indicator 643 and the USC 644, 645 may be omitted if the GUI 630 is used for a feature event.

The GUI 630 includes an award indicator 638. The award indicator 638 can indicate an amount earned during performance of a dice event shown on the GUI 630.

Figure 19:
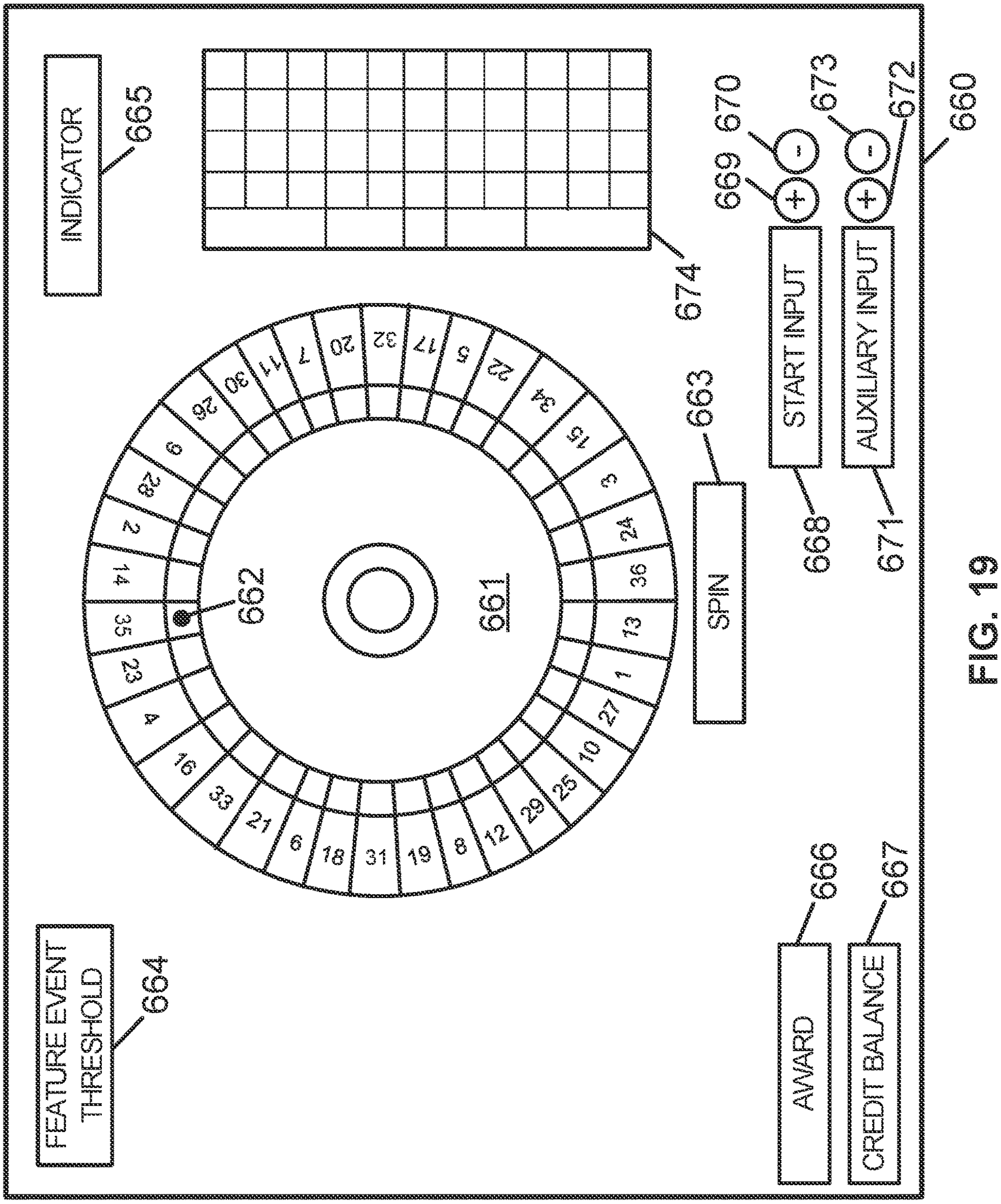

Next, FIG. 19 shows a GUI 660 in accordance with the example embodiments. A computing system, such as the computing system 100, 100*a*, 100*b*, 800, 900, can output the GUI 660 on a display in connection with a spinning wheel event. As an example, the spinning wheel event can include a roulette wheel event. The GUI 660 or a portion of the GUI 660 can be displayed and/or arranged within a container, such as the container 521, 541 discussed above. The GUI 660 includes a roulette wheel 661 and a ball 662.

The GUI 660 can include a USC 663 selectable to cause the computing system to spin the roulette wheel 661 and to drop the ball 662 onto the roulette wheel 661 while spinning. The computing system is configured to stop the roulette wheel 661 after it begins spinning.

The GUI 660 includes a feature event threshold indicator 664, an indicator 665, and a credit balance indicator 667. The feature event threshold indicator 664 can indicate the feature event threshold 360, such as feature event threshold determined for a selected type of base event, a user, a performance time, a start input, an auxiliary input, and/or some other parameter discussed in this description. As an example, the feature event threshold indicator 664 can indicate a particular quantity of wheel spins. The indicator 665 can indicate a value, such as a value of the counter 358 or a value in the values 359. As an example, the indicator 665 can indicate a value indicating progress toward meeting the feature event threshold shown by feature event threshold indicator 664 or an award earned during performance of an event. The credit balance indicator 667 can indicate a quantity of credits available to a user of the computing system to perform events. As an example, the quantity of credits can be available for entry of a start input and an auxiliary input.

The GUI 660 includes a start input indicator 668 configured to display a value of a start input. The GUI 660 includes a USC 669, 670 selectable to increase or decrease, respectively, an amount indicated by the start input indicator 668. The start input indicator 668 and the USC 669, 670 may be omitted if the GUI 660 is used for a feature event.

The GUI 660 includes an auxiliary input indicator 671 configured to display a value of an auxiliary input. The GUI 660 includes a USC 672, 673 selectable to increase or decrease, respectively, an amount indicated by the auxiliary input indicator 671. The auxiliary input indicator 671 and the USC 672, 673 may be omitted if the GUI 660 is used for a feature event.

The GUI 660 includes an award indicator 666. The award indicator 666 can indicate an amount earned during performance of a wheel event shown on the GUI 660. The award indicator 666 can indicate an award based on a position on the roulette wheel 661 at which the ball 662 lands after the roulette wheel 661 stops spinning.

The GUI 660 includes a USC 674. The USC 674 includes multiple positions that can be selected, for example, to select a particular number, type of number (e.g., odd or event), or a color shown on the roulette wheel 661.

Figure 20:
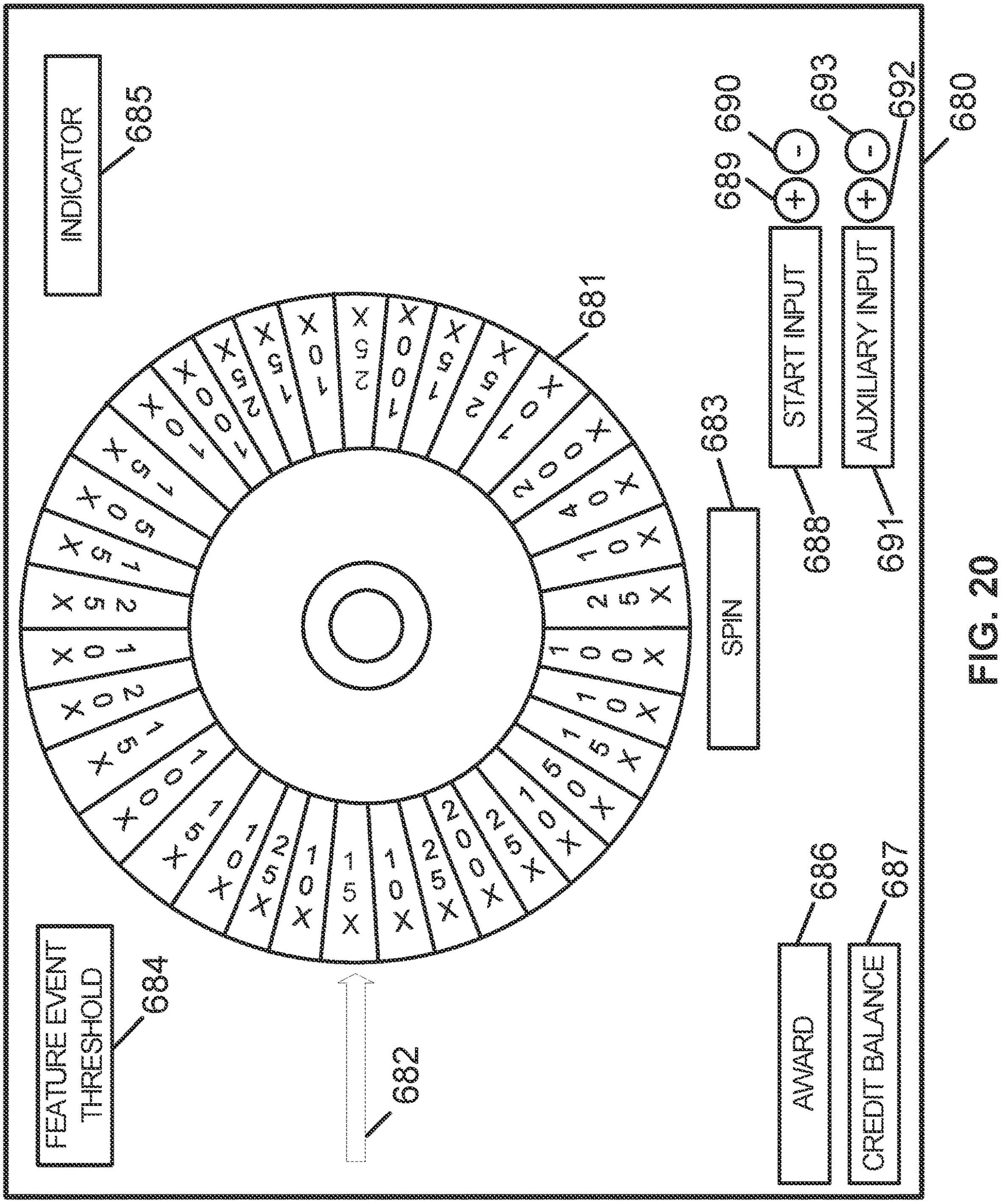

Next, FIG. 20 shows a GUI 680 in accordance with the example embodiments. A computing system, such as the computing system 100, 100*a*, 100*b*, 800, 900, can output the GUI 680 on a display in connection with a spinning wheel event. As an example, the spinning wheel event can include a multiplier or money event. The GUI 680 or a portion of the GUI 680 can be displayed and/or arranged within a container, such as the container 521, 541 discussed above. The GUI 680 includes a wheel 681 and an arrow 682. The wheel 681 is divided into multiple radial positions. Some or all of the radial positions can be associated with an award indicator, such as a multiplier, or some other indicator, such as a lose value indicator, a credit or monetary amount. The indicators on the radial positions can be static. Alternatively, the indicators on the radial positions can be dynamic such that the computing system can modify the indicators (e.g., increase a value of an indicator for a feature event). In some implementations, the computing system can increase or decrease a width of radial positions on the wheel to modify a probability of the wheel 681 stopping at the arrow 682 after spinning.

The GUI 680 can include a USC 683 selectable to cause the computing system to spin the wheel 681. The computing system is configured to stop the wheel 681 after it begins spinning.

The GUI 680 includes a feature event threshold indicator 684, an indicator 685, and a credit balance indicator 687. The feature event threshold indicator 684 can indicate the feature event threshold 360, such as feature event threshold determined for a selected type of base event, a user, a performance time, a start input, an auxiliary input, and/or some other parameter discussed in this description. As an example, the feature event threshold indicator 684 can indicate a particular quantity of wheel spins. The indicator 685 can indicate a value, such as a value of the counter 358 or a value in the values 359. As an example, the indicator 685 can indicate a value indicating progress toward meeting the feature event threshold shown by feature event threshold indicator 684 or an award earned during performance of an event. The credit balance indicator 687 can indicate a quantity of credits available to a user of the computing system to perform events. As an example, the quantity of credits can be available for entry of a start input and an auxiliary input.

The GUI 680 includes a start input indicator 688 configured to display a value of a start input. The GUI 680 includes a USC 689, 690 selectable to increase or decrease, respectively, an amount indicated by the start input indicator 688. The start input indicator 688 and the USC 689, 690 may be omitted if the GUI 680 is used for a feature event.

The GUI 680 includes an auxiliary input indicator 691 configured to display a value of an auxiliary input. The GUI 680 includes a USC 692, 693 selectable to increase or decrease, respectively, an amount indicated by the auxiliary input indicator 691. The auxiliary input indicator 691 and the USC 692, 693 may be omitted if the GUI 680 is used for a feature event.

The GUI 680 includes an award indicator 686. The award indicator 686 can indicate an amount earned during performance of a wheel event shown on the GUI 680. The award indicator 686 can indicate an award based on a position on the wheel 681 at the arrow 682.

V. Conclusions

While one or more disclosed functions have been described as being performed by certain computing systems (e.g., the computing system 100, 100*a*, 100*b*, 800, 900), one or more of the functions can be performed by any entity, including but not limited to those described herein. As such, while this disclosure includes examples in which the computing system 100*a* performs select functions and sends data to the computing system 100*b*, such that the computing system 100*b* can perform complementing functions and receive the data, variations to those functions can be made while adhering to the general server-client dichotomy and the scope of the disclosed machines, computing systems, and methods.

For example, rather than the computing system 100*a* sending select data (e.g., a symbol set, a value, etc.) to the computing system 100*b*, such that the computing system 100*b* can generate and display appropriate images, the computing system 100*a* can generate the images and send them to the computing system 100*b* for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above can relate to one or more of the following enumerated example embodiments (EEE).

EEE A1 is a computing system comprising a processor and a computer-readable memory storing executable instructions. Execution of the instructions by the processor causes the computing system to perform the following functions. The functions include receiving a first start input at a processor. The functions also include performing a first base event in response to receiving the first start input. The functions further include determining whether a first feature event trigger occurs during the first base event. The functions also include resetting a counter based on the first base event and switching the computing system to operate in a feature event state if the first feature event trigger occurs during the first base event. The functions further include determining whether the counter meets the feature event threshold if the first feature event trigger does not occur during the first base event. The functions also include resetting the counter based on the first base event and switching the computing system to operate in the feature event state if the processor determines the counter meets the feature event threshold, or, incrementing the counter based on the first base event and beginning to monitor for receiving a next start input if the processor determines the counter does not meet the feature event threshold. The functions also include performing at least one instance of the feature event while operating in the feature event state and then the processor begins monitoring for receiving the next start input.

EEE A2 is the computing system of EEE A1, wherein the counter includes a first counter corresponding to a first user of the computing system; and wherein the computing system includes one or more of a second counter corresponding to the first user of the computing system, or at least one additional counter corresponding to at least one additional user of the computing system.

EEE A3 is the computing system of any one of EEE A1 to A2, wherein the feature event threshold is based at least in part on one or more of: an amount of time, a quantity of base events expected to be performed during a passage of the amount of time, or a quantity of times to initiate the feature event during the passage of the amount of time.

EEE A4 is the computing system of EEE A3, wherein the functions further include outputting, to a display, an indication of one or more of the amount of time, a particular amount of time counted by a timer for tracking a particular passage of the amount of time, or a difference between the amount of time and the particular amount of time counted by the timer for tracking the particular passage of the amount of time.

EEE A5 is the computing system of any one of EEE A1 to A4, wherein the functions further include outputting, to a display, an indication of one or more of a threshold number indicative of the feature event threshold, a counter number indicative of the counter, or a difference number indicative of a difference between the feature event threshold and the counter.

EEE A6 is the computing system of any one of EEE A1 to A5, wherein the functions further include determining, by the processor before the processor resets or increments the counter based on the first base event, that the first start input includes a first auxiliary input.

EEE A7 is the computing system of EEE A6, wherein the first start input is associated with a first value; wherein the first auxiliary input is associated with a second value; and wherein the second value is based on the first value.

EEE A8 is the computing system of any one of EEE A6 to A7, wherein a probability of triggering a feature event during the first base event is independent of whether the first start input includes the first auxiliary input.

EEE A9 is the computing system of any one of EEE A1 to A8, wherein the computing system includes a display and a group of symbols arranged on a plurality of reels; wherein the computing system outputs the plurality of reels on the display; and wherein performing the first base event includes spinning the plurality of reels output on the display, stopping the plurality of reels at respective reel stops, and displaying, on the display, a subset of the group of symbols based on the respective reel stops.

EEE A10 is the computing system of any one of EEE A1 to A9, wherein the first base event includes a reel-based event, a poker event, a blackjack event, a baccarat event, a craps event, a wheel event, a pachinko event, or a roulette event.

EEE A11 is the computing system of any one of EEE A1 to A10, wherein the computing system operates in a first state when receiving the first start input; and wherein the computing system is configured with a setup selection for the first state.

EEE A12 is the computing system of EEE A11, wherein the setup selection for the first state includes one or more of: a type selection of a particular type of base event, a user selection of a particular user of the computing system, a mode selection of an anonymous user mode, or a value selection of a particular value for start inputs.

EEE A13 is the computing system of any one of EEE A11 to A12, wherein the functions further include determining a first setup selection for the computing system has been canceled; and determining a second setup selection for the computing system has been entered. One of the first setup selection or the second setup selection includes a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system.

EEE A14 is the computing system of any one of EEE A1 to A13, wherein the functions further include receiving a second start input at the processor. The functions also include performing, by the computing system, a second base event in response to receiving the second start input. The functions further include determining, by the processor, whether a second feature event trigger occurs during the second base event. The functions also include determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and begins monitoring for receiving a further next start input.

EEE A15 is the computing system of EEE A14, wherein receiving the second start input occurs before receiving the first start input or while monitoring for receiving the next start input.

EEE A16 is the computing system of any one of EEE A14 to A15, wherein the first start input includes a first wager, the second base event includes a second wager, and the auxiliary input includes a side wager.

EEE A17 is the computing system of any one of EEE A14 to A16, wherein the second base event includes a reel-based event, a poker event, a blackjack event, a baccarat event, a craps event, a wheel event, a pachinko event, or a roulette event.

EEE A18 is the computing system of any one of EEE A1 to A17, wherein the functions further include receiving a second start input at the processor. The functions also include performing, by the computing system, a second base event in response to receiving the second start input. The functions further include determining, by the processor, whether a second feature event trigger occurs during the second base event. The functions also include determining, by the processor, an auxiliary input is not received for the second base event. The functions also include the processor switching the computing system to operate in the feature event state if the second feature event trigger occurs during the second base event; and the processor beginning to monitor for receiving a further next start input if the second feature event trigger does not occur during the second base event.

EEE A19 is the computing system of any one of EEE A1 to A18, wherein receiving the second start input occurs before receiving the first start input or while monitoring for receiving the next start input.

EEE A20 is the computing system of any one of EEE A1 to A19, wherein the first start input includes a first wager, the second base event includes a second wager, and the auxiliary input includes a side wager.

EEE A21 is the computing system of any one of EEE A1 to A20, wherein the computer-readable memory includes a non-transitory computer-readable medium.

EEE B1 is a method comprising: receiving a first start input at a processor of a computing system; performing, by the computing system, a first base event in response to receiving the first start input; and determining, by the processor, whether a first feature event trigger occurs during the first base event. If the first feature event trigger occurs during the first base event, then the processor resets a counter based on the first base event and switches the computing system to operate in a feature event state. If the first feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and begins monitoring for receiving a next start input. The computing system performs at least one instance of the feature event while operating in the feature event state and then the processor begins monitoring for receiving the next start input.

EEE B2 is the method of EEE B 1, wherein the counter includes a first counter corresponding to a first user of the computing system; and wherein the computing system includes one or more of a second counter corresponding to the first user of the computing system, or at least one additional counter corresponding to at least one additional user of the computing system.

EEE B3 is the method of any one of EEE B1 to B2, wherein the feature event threshold is based at least in part on one or more of: an amount of time, a quantity of base events expected to be performed during a passage of the amount of time, or a quantity of times to initiate the feature event during the passage of the amount of time.

EEE B4 is the method of EEE B3, further comprising outputting, to a display, an indication of one or more of: the amount of time, a particular amount of time counted by a timer for tracking a particular passage of the amount of time, or a difference between the amount of time and the particular amount of time counted by the timer for tracking the particular passage of the amount of time.

EEE B5 is the method of any one of EEE B1 to B4, further comprising outputting, to a display, an indication of one or more of: a threshold number indicative of the feature event threshold, a counter number indicative of the counter, or a difference number indicative of a difference between the feature event threshold and the counter.

EEE B6 is the method of any one of EEE B1 to B5, further comprising: determining, by the processor before the processor resets or increments the counter based on the first base event, that the first start input includes a first auxiliary input.

EEE B7 is the method of EEE B6, wherein the first start input is associated with a first value; wherein the first auxiliary input is associated with a second value; and wherein the second value is based on the first value.

EEE B8 is the method of any one of EEE B6 to B7, wherein a probability of triggering a feature event during the first base event is independent of whether the first start input includes the first auxiliary input.

EEE B9 is the method of any one of EEE B1 to B8, wherein the computing system includes a display and a group of symbols arranged on a plurality of reels; wherein the computing system outputs the plurality of reels on the display; and wherein performing the first base event includes spinning the plurality of reels output on the display, stopping the plurality of reels at respective reel stops, and displaying, on the display, a subset of the group of symbols based on the respective reel stops.

EEE B10 is the method of any one of EEE B1 to B9, wherein the first base event includes a reel-based event, a poker event, a blackjack event, a baccarat event, a craps event, a wheel event, a pachinko event, or a roulette event.

EEE B11 is the method of any one of EEE B1 to B10, wherein the computing system operates in a first state when receiving the first start input; and wherein the computing system is configured with a setup selection for the first state.

EEE B12 is the method of any one of EEE B11, wherein the setup selection for the first state includes one or more of: a type selection of a particular type of base event, a user selection of a particular user of the computing system, a mode selection of an anonymous user mode, or a value selection of a particular value for start inputs.

EEE B13 is the method of any one of EEE B11 to B12, further comprising: determining a first setup selection for the computing system has been canceled; and determining a second setup selection for the computing system has been entered. One of the first setup selection or the second setup selection includes: a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system.

EEE B14 is the method of any one of EEE B1 to B13, further comprising: receiving a second start input at the processor; performing, by the computing system, a second base event in response to receiving the second start input; determining, by the processor, whether a second feature event trigger occurs during the second base event; and determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and begins monitoring for receiving a further next start input.

EEE B15 is the method of EEE B14, wherein receiving the second start input occurs before receiving the first start input or while monitoring for receiving the next start input.

EEE B16 is the method of any one of EEE B14 to B15, wherein the first start input includes a first wager, the second base event includes a second wager, and the auxiliary input includes a side wager.

EEE B17 is the method of any one of EEE B14 to B16, wherein the second base event includes a reel-based event, a poker event, a blackjack event, a baccarat event, a craps event, a wheel event, a pachinko event, or a roulette event.

EEE B18 is the method of any one of EEE B1 to B17, further comprising: receiving a second start input at the processor; performing, by the computing system, a second base event in response to receiving the second start input; determining, by the processor, whether a second feature event trigger occurs during the second base event; and determining, by the processor, an auxiliary input is not received for the second base event. If the second feature event trigger occurs during the second base event, then the processor switches the computing system to operate in the feature event state. If the second feature event trigger does not occur during the second base event, then the processor begins monitoring for receiving a further next start input.

EEE B19 is the method of EEE B18, wherein receiving the second start input occurs before receiving the first start input or while monitoring for receiving the next start input.

EEE B20 is the method of any one of EEE B18 to B19, wherein the first start input includes a first wager, the second base event includes a second wager, and the auxiliary input includes a side wager.

EEE B21 is the method of any one of EEE B1 to B20, wherein the computing system includes the counter and the feature event threshold.

EEE B22 is the method of EEE B21, wherein the computer-readable memory includes a non-transitory computer-readable medium.

EEE C1 is a computer-readable memory having stored therein instructions executable by a processor to cause a computing system to perform functions. The functions include receiving a first start input at a processor of a computing system. The functions also include performing, by the computing system, a first base event in response to receiving the first start input. The functions further include determining, by the processor, whether a first feature event trigger occurs during the first base event. If the first feature event trigger occurs during the first base event, then the processor resets the counter based on the first base event and switches the computing system to operate in a feature event state. If the first feature event trigger does not occur during the first base event, then the processor determines whether the counter meets the feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and begins monitoring for receiving a next start input. The computing system is configured to perform at least one instance of the feature event while operating in the feature event state and then the processor begins monitoring for receiving the next start input.

EEE C2 is the computer-readable memory of EEE C1, wherein the counter includes a first counter corresponding to a first user of the computing system; and wherein the computing system includes one or more of a second counter corresponding to the first user of the computing system, or at least one additional counter corresponding to at least one additional user of the computing system.

EEE C3 is the computer-readable memory of any one of EEE C1 to C2, wherein the feature event threshold is based at least in part on one or more of: an amount of time, a quantity of base events expected to be performed during a passage of the amount of time, or a quantity of times to initiate the feature event during the passage of the amount of time.

EEE C4 is the computer-readable memory of EEE C3, wherein the functions further comprise outputting, to a display, an indication of one or more of: the amount of time, a particular amount of time counted by a timer for tracking a particular passage of the amount of time, or a difference between the amount of time and the particular amount of time counted by the timer for tracking the particular passage of the amount of time.

EEE C5 is the computer-readable memory of any one of EEE C1 to C4, wherein the functions further comprise outputting, to a display, an indication of one or more of a threshold number indicative of: the feature event threshold, a counter number indicative of the counter, or a difference number indicative of a difference between the feature event threshold and the counter.

EEE C6 is the computer-readable memory of any one of EEE C1 to C5, wherein the functions further comprise determining, by the processor before the processor resets or increments the counter based on the first base event, that the first start input includes a first auxiliary input.

EEE C7 is the computer-readable memory of EEE C6, wherein the first start input is associated with a first value; wherein the first auxiliary input is associated with a second value; and wherein the second value is based on the first value.

EEE C8 is the computer-readable memory of any one of EEE C6 to C7, wherein a probability of triggering a feature event during the first base event is independent of whether the first start input includes the first auxiliary input.

EEE C9 is the computer-readable memory of any one of EEE C1 to C8, wherein the computing system includes a display and a group of symbols arranged on a plurality of reels; wherein the computing system outputs the plurality of reels on the display; and wherein performing the first base event includes spinning the plurality of reels output on the display, stopping the plurality of reels at respective reel stops, and displaying, on the display, a subset of the group of symbols based on the respective reel stops.

EEE C10 is the computer-readable memory of any one of EEE C1 to C9, wherein the first base event includes a reel-based event, a poker event, a blackjack event, a baccarat event, a craps event, a wheel event, a pachinko event, or a roulette event.

EEE C11 is the computer-readable memory of any one of EEE C1 to C10, wherein the computing system operates in a first state when receiving the first start input; and wherein the computing system is configured with a setup selection for the first state.

EEE C12 is the computer-readable memory of any one of EEE C1 to C11, wherein the setup selection for the first state includes one or more of: a type selection of a particular type of base event, a user selection of a particular user of the computing system, a mode selection of an anonymous user mode, or a value selection of a particular value for start inputs.

EEE C13 is the computer-readable memory of any one of EEE C1 to C12, wherein the functions further comprise: determining a first setup selection for the computing system has been canceled; and determining a second setup selection for the computing system has been entered. One of the first setup selection or the second setup selection includes a permission setup selection indicating entry of auxiliary inputs is permitted, a prohibition setup selection indicating entry of auxiliary inputs is prohibited, a user setup selection indicating a particular user is using the computing system, or a time setup selection indicating an amount of time for using the computing system.

EEE C14 is the computer-readable memory of any one of EEE C 1 to C13, wherein the functions further comprise: receiving a second start input at the processor; performing, by the computing system, a second base event in response to receiving the second start input; determining, by the processor, whether a second feature event trigger occurs during the second base event; and determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and begins monitoring for receiving a further next start input.

EEE C15 is the computer-readable memory of EEE C14, wherein receiving the second start input occurs before receiving the first start input or while monitoring for receiving the next start input.

EEE C16 is the computer-readable memory of any one of EEE C14 to C15, wherein the first start input includes a first wager, the second base event includes a second wager, and the auxiliary input includes a side wager.

EEE C17 is the computer-readable memory of any one of EEE C14 to C16, wherein the second base event includes a reel-based event, a poker event, a blackjack event, a baccarat event, a craps event, a wheel event, a pachinko event, or a roulette event.

EEE C18 is the computer-readable memory of any one of EEE C1 to C17, wherein the functions further comprise: receiving a second start input at the processor; performing, by the computing system, a second base event in response to receiving the second start input; determining, by the processor, whether a second feature event trigger occurs during the second base event; and determining, by the processor, an auxiliary input is not received for the second base event. If the second feature event trigger occurs during the second base event, then the processor switches the computing system to operate in the feature event state. If the second feature event trigger does not occur during the second base event, then the processor begins monitoring for receiving a further next start input.

EEE C19 is the computer-readable memory of EEE C18, wherein receiving the second start input occurs before receiving the first start input or while monitoring for receiving the next start input.

EEE C20 is the computer-readable memory of any one of EEE C17 to C18, wherein the first start input includes a first wager, the second base event includes a second wager, and the auxiliary input includes a side wager.

EEE C21 is the computer-readable memory of any one of EEE C1 to C20, wherein the computing system includes the counter and the feature event threshold.

EEE C22 is the computer-readable memory of EEE C21, wherein the computer-readable memory includes a non-transitory computer-readable medium.

EEE D1 is computing system comprising: a processor; and a non-transitory computer-readable memory storing executable instructions, wherein execution of the instructions by the processor causes the computing system to perform the following functions: monitoring, with the computing system operating in a first state, the computing system for receiving a start input; switching, by the processor in response to receiving a first start input, the computing system to operate in a second state for playing a base event; performing, by the computing system while operating in the second state, a first base event in response to receiving the first start input; determining whether a first feature event trigger occurs during the first base event; resetting a counter based on the first base event and switching the computing system to a feature event state if the first feature event trigger occurs during the first base event; determining whether the counter meets a feature event threshold if the feature event trigger does not occur during the first base event; resetting the counter based on the first base event and switching the computing system to operate in the feature event state if the processor determines the counter meets the feature event threshold, or, incrementing the counter based on the first base event and switching the computing system to operate in the first state to begin monitoring for receiving a next start input if the processor determines the counter does not meet the feature event threshold; and performing at least one instance of the feature event while operating in the feature event state and then switching the computing system to operate in the first state to begin monitoring for receiving the next start input.

EEE D2 is the computing system of EEE D1, wherein the counter includes a first counter corresponding to a first user of the computing system; and the computing system includes one or more of the following: a second counter corresponding to the first user of the computing system, or at least one additional counter corresponding to at least one additional user of the computing system.

EEE D3 is computing system of any one of EEE D1 or D2, wherein the feature event threshold is based at least in part on one or more from among: an amount of time, a quantity of base events expected to be performed during a passage of the amount of time, or a quantity of times to initiate the feature event during the passage of the amount of time.

EEE D4 is the computing system of EEE D3, wherein the functions further include outputting, to a display, an indication of one or more from among: the amount of time; a particular amount of time counted by a timer for tracking a particular passage of the amount of time; or a difference between the amount of time and the particular amount of time counted by the timer for tracking the particular passage of the amount of time.

EEE D5 is the computing system of any one of EEE D1 to D4, wherein the functions further include outputting, to a display, an indication of one or more from among: a number indicative of the feature event threshold; a number indicative of the counter; or a number indicative of a difference between the feature event threshold and the counter.

EEE D6 is the computing system of any one of EEE D1 to D5, wherein the functions further include determining, by the processor before the processor resets or increments the counter based on the first base event, that the first start input includes a first auxiliary input.

EEE D7 is the computing system of EEE D6, wherein: the first start input is associated with a first value; the first auxiliary input is associated with a second value; and the second value is based on the first value.

EEE D8 is the computing system of any one of EEE D6 to D7, wherein a probability of triggering a feature event during the first base event is independent of whether the first start input includes the first auxiliary input.

EEE D9 is the computing system of any one of EEE D1 to D8, wherein: the computing system includes a display and a group of symbols arranged on a plurality of reels; the computing system outputs the plurality of reels on the display; and performing the first base event includes spinning the plurality of reels output on the display, stopping the plurality of reels at respective reel stops, and displaying, on the display, a subset of the group of symbols based on the respective reel stops.

EEE D10 is the computing system of any one of EEE D1 to D9, wherein the first base event includes a reel-based event, a poker event, a blackjack event, a baccarat event, a craps event, a wheel event, a pachinko event, or a roulette event.

EEE D11 is the computing system of any one of EEE D1 to D10, wherein: the computing system is configured with a setup selection for the first state; and the setup selection for the first state includes one or more from among: a type selection of a particular type of base event; a use selection of a particular user of the computing system; a mode selection of an anonymous user mode; or a value selection of a particular value for start inputs.

EEE D12 is the computing system of any one of EEE D1 to D11, wherein the computing system is configured with a setup selection for the first state, and the functions further include: determining a first setup selection for the computing system has been canceled; and determining a second setup selection for the computing system has been entered, wherein one of the first setup selection or the second setup selection includes: a permission setup selection indicating entry of auxiliary inputs is permitted; a prohibition setup selection indicating entry of auxiliary inputs is prohibited; a user setup selection indicating a particular user is using the computing system; or a time setup selection indicating an amount of time for using the computing system.

EEE D13 is the computing system of any one of EEE D1 to D12, wherein the functions further include: receiving a second start input at the processor while the computing system is operating in the first state; performing, by the computing system, a second base event in response to receiving the second start input; determining, by the processor, whether a second feature event trigger occurs during the second base event; and determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and switches the computing system to operate in the first state to begin monitoring for receiving a further next start input.

EEE D14 is the computing system of EEE D13, wherein receiving the second start input occurs before receiving the first start input or while monitoring for receiving the next start input.

EEE D15 is the computing system of any one of EEE D13 to D14, wherein the first start input includes a first wager, the second base event includes a second wager, and the auxiliary input includes a side wager.

EEE D16 is the computing system of any one of EEE D1 to D15, wherein the functions further include: receiving a second start input at the processor while the computing system is operating in the first state; performing, by the computing system, a second base event in response to receiving the second start input; determining, by the processor, whether a second feature event trigger occurs during the second base event; and determining, by the processor, an auxiliary input is not received for the second base event. If the second feature event trigger occurs during the second base event, then the processor switches the computing system to operate in the feature event state. If the second feature event trigger does not occur during the second base event, then the processor switches the computing system to operate in the first state to begin monitoring for receiving a further next start input.

EEE D17 is the computing system of EEE D16, wherein receiving the second start input occurs before receiving the first start input or while monitoring for receiving the next start input.

EEE D18 is the computing system of any one of EEE D16 to D17, wherein the first start input includes a first wager, the second base event includes a second wager, and the auxiliary input includes a side wager.

EEE D19 is the computing system of any one of EEE D1 to D18, wherein the computing system includes the counter and the feature event threshold.

EEE D20 is the computing system of any one of EEE D1 to D19, further comprising: a client computing device including a display and a group of symbols arranged on a plurality of reels, wherein: the processor is embodied within a server, and playing the base event includes spinning the plurality of reels on the display, stopping the plurality of reels at respective reel stops, and displaying, on the display, a subset of the group of symbols based on the respective reel stops.

EEE E1 is a method comprising: monitoring, by a processor of a computing system operating in a first state, the computing system for receiving a start input; switching, by the processor in response to receiving a first start input, the computing system to operate in a second state for playing a base event; performing, by the computing system while operating in the second state, a first base event in response to receiving the first start input; and determining, by the processor, whether a first feature event trigger occurs during the first base event. If the first feature event trigger occurs during the first base event, then the processor resets a counter based on the first base event and switches the computing system to a feature event state. If the feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and switches the computing system to operating in the first state to begin monitoring for receiving a next start input. The computing system performs at least one instance of the feature event while operating in the feature event state and then the processor switches the computing system to operating in the first state to begin monitoring for receiving the next start input.

EEE E2 is the method of EEE E1, wherein the counter includes a first counter corresponding to a first user of the computing system; and the computing system includes one or more of the following: a second counter corresponding to the first user of the computing system, or at least one additional counter corresponding to at least one additional user of the computing system.

EEE E3 is method of any one of EEE E1 or E2, wherein the feature event threshold is based at least in part on one or more from among: an amount of time, a quantity of base events expected to be performed during a passage of the amount of time, or a quantity of times to initiate the feature event during the passage of the amount of time.

EEE E4 is the method of EEE E3, further comprising outputting, to a display, an indication of one or more from among: the amount of time; a particular amount of time counted by a timer for tracking a particular passage of the amount of time; or a difference between the amount of time and the particular amount of time counted by the timer for tracking the particular passage of the amount of time.

EEE E5 is the method of any one of EEE E1 to E4, further comprising outputting, to a display, an indication of one or more from among: a number indicative of the feature event threshold; a number indicative of the counter; or a number indicative of a difference between the feature event threshold and the counter.

EEE E6 is the method of any one of EEE E1 to E5, further comprising determining, by the processor before the processor resets or increments the counter based on the first base event, that the first start input includes a first auxiliary input.

EEE E7 is the method of EEE E6, wherein: the first start input is associated with a first value; the first auxiliary input is associated with a second value; and the second value is based on the first value.

EEE E8 is the method of any one of EEE E6 to E7, wherein a probability of triggering a feature event during the first base event is independent of whether the first start input includes the first auxiliary input.

EEE E9 is the method of any one of EEE E1 to E8, wherein: the computing system includes a display and a group of symbols arranged on a plurality of reels; the computing system outputs the plurality of reels on the display; and performing the first base event includes spinning the plurality of reels output on the display, stopping the plurality of reels at respective reel stops, and displaying, on the display, a subset of the group of symbols based on the respective reel stops.

EEE E10 is the method of any one of EEE E1 to E9, wherein the first base event includes a reel-based event, a poker event, a blackjack event, a baccarat event, a craps event, a wheel event, a pachinko event, or a roulette event.

EEE E11 is the method of any one of EEE E1 to E10, wherein: the computing system is configured with a setup selection for the first state; and the setup selection for the first state includes one or more from among: a type selection of a particular type of base event; a use selection of a particular user of the computing system; a mode selection of an anonymous user mode; or a value selection of a particular value for start inputs.

EEE E12 is the method of any one of EEE E1 to E11, wherein the computing system is configured with a setup selection for the first state, and the method further comprises: determining a first setup selection for the computing system has been canceled; and determining a second setup selection for the computing system has been entered, wherein one of the first setup selection or the second setup selection includes: a permission setup selection indicating entry of auxiliary inputs is permitted; a prohibition setup selection indicating entry of auxiliary inputs is prohibited; a user setup selection indicating a particular user is using the computing system; or a time setup selection indicating an amount of time for using the computing system.

EEE E13 is the method of any one of EEE E1 to E12, further comprising: receiving a second start input at the processor while the computing system is operating in the first state; performing, by the computing system, a second base event in response to receiving the second start input; determining, by the processor, whether a second feature event trigger occurs during the second base event; and determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and switches the computing system to operate in the first state to begin monitoring for receiving a further next start input.

EEE E14 is the method of EEE E13, wherein receiving the second start input occurs before receiving the first start input or while monitoring for receiving the next start input.

EEE E15 is the method of any one of EEE E13 to E14, wherein the first start input includes a first wager, the second base event includes a second wager, and the auxiliary input includes a side wager.

EEE E16 is the method of any one of EEE E1 to E15, further comprising: receiving a second start input at the processor while the computing system is operating in the first state; performing, by the computing system, a second base event in response to receiving the second start input; determining, by the processor, whether a second feature event trigger occurs during the second base event; and determining, by the processor, an auxiliary input is not received for the second base event. If the second feature event trigger occurs during the second base event, then the processor switches the computing system to operate in the feature event state. If the second feature event trigger does not occur during the second base event, then the processor switches the computing system to operate in the first state to begin monitoring for receiving a further next start input.

EEE E17 is the method of EEE E16, wherein receiving the second start input occurs before receiving the first start input or while monitoring for receiving the next start input.

EEE E18 is the method of any one of EEE E16 to E17, wherein the first start input includes a first wager, the second base event includes a second wager, and the auxiliary input includes a side wager.

EEE E19 is the method of any one of EEE E1 to E18, wherein the computing system includes the counter and the feature event threshold.

EEE F1 is a computer-readable memory having stored therein instructions executable by a processor to cause a computing system to perform functions comprising: monitoring, with the computing system operating in a first state, the computing system for receiving a start input; switching, by the processor in response to receiving a first start input, the computing system to operate in a second state for playing a base event; performing, by the computing system while operating in the second state, a first base event in response to receiving the first start input; determining, by the processor, whether a first feature event trigger occurs during the first base event. If the first feature event trigger occurs during the first base event, then the processor resets a counter based on the first base event and switches the computing system to a feature event state. If the feature event trigger does not occur during the first base event, then the processor determines whether the counter meets a feature event threshold, and if the processor determines the counter meets the feature event threshold, then the processor resets the counter based on the first base event and switches the computing system to operate in the feature event state, or if the processor determines the counter does not meet the feature event threshold, then the processor increments the counter based on the first base event and switches the computing system to operating in the first state to begin monitoring for receiving a next start input. The computing system is configured to perform at least one instance of the feature event while operating in the feature event state and then the processor switches the computing system to operating in the first state to begin monitoring for receiving the next start input.

EEE F2 is the computer-readable memory of EEE F1, wherein the counter includes a first counter corresponding to a first user of the computing system; and the computing system includes one or more of the following: a second counter corresponding to the first user of the computing system, or at least one additional counter corresponding to at least one additional user of the computing system.

EEE F3 is computer-readable memory of any one of EEE F1 or F2, wherein the feature event threshold is based at least in part on one or more from among: an amount of time, a quantity of base events expected to be performed during a passage of the amount of time, or a quantity of times to initiate the feature event during the passage of the amount of time.

EEE F4 is the computer-readable memory of EEE F3, wherein the functions further include outputting, to a display, an indication of one or more from among: the amount of time; a particular amount of time counted by a timer for tracking a particular passage of the amount of time; or a difference between the amount of time and the particular amount of time counted by the timer for tracking the particular passage of the amount of time.

EEE F5 is the computer-readable memory of any one of EEE F1 to F4, wherein the functions further include outputting, to a display, an indication of one or more from among: a number indicative of the feature event threshold; a number indicative of the counter; or a number indicative of a difference between the feature event threshold and the counter.

EEE F6 is the computer-readable memory of any one of EEE F1 to F5, wherein the functions further include determining, by the processor before the processor resets or increments the counter based on the first base event, that the first start input includes a first auxiliary input.

EEE F7 is the computer-readable memory of EEE F6, wherein: the first start input is associated with a first value; the first auxiliary input is associated with a second value; and the second value is based on the first value.

EEE F8 is the computer-readable memory of any one of EEE F6 to F7, wherein a probability of triggering a feature event during the first base event is independent of whether the first start input includes the first auxiliary input.

EEE F9 is the computer-readable memory of any one of EEE F1 to F8, wherein: the computing system includes a display and a group of symbols arranged on a plurality of reels; the computing system is configured to output the plurality of reels on the display; and performing the first base event includes spinning the plurality of reels output on the display, stopping the plurality of reels at respective reel stops, and displaying, on the display, a subset of the group of symbols based on the respective reel stops.

EEE F10 is the computer-readable memory of any one of EEE F1 to F9, wherein the first base event includes a reel-based event, a poker event, a blackjack event, a baccarat event, a craps event, a wheel event, a pachinko event, or a roulette event.

EEE F11 is the computer-readable memory of any one of EEE F1 to F10, wherein: the computing system is configured with a setup selection for the first state; and the setup selection for the first state includes one or more from among: a type selection of a particular type of base event; a use selection of a particular user of the computing system; a mode selection of an anonymous user mode; or a value selection of a particular value for start inputs.

EEE F12 is the computer-readable memory of any one of EEE F1 to F11, wherein the computing system is configured with a setup selection for the first state, and the wherein the functions further comprise: determining a first setup selection for the computing system has been canceled; and determining a second setup selection for the computing system has been entered, wherein one of the first setup selection or the second setup selection includes: a permission setup selection indicating entry of auxiliary inputs is permitted; a prohibition setup selection indicating entry of auxiliary inputs is prohibited; a user setup selection indicating a particular user is using the computing system; or a time setup selection indicating an amount of time for using the computing system.

EEE F13 is the computer-readable memory of any one of EEE F1 to F12, wherein the functions further include: receiving a second start input at the processor while the computing system is operating in the first state; performing, by the computing system, a second base event in response to receiving the second start input; determining, by the processor, whether a second feature event trigger occurs during the second base event; and determining, by the processor, the second start input includes an auxiliary input. If the second feature event trigger occurs during the second base event, then the processor resets the counter based on the second base event and switches the computing system to operate in the feature event state. If the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and switches the computing system to operate in the first state to begin monitoring for receiving a further next start input.

EEE F14 is the computer-readable memory of EEE F13, wherein receiving the second start input occurs before receiving the first start input or while monitoring for receiving the next start input.

EEE F15 is the computer-readable memory of any one of EEE F13 to F14, wherein the first start input includes a first wager, the second base event includes a second wager, and the auxiliary input includes a side wager.

EEE F16 is the computer-readable memory of any one of EEE F1 to F15, wherein the functions further include: receiving a second start input at the processor while the computing system is operating in the first state; performing, by the computing system, a second base event in response to receiving the second start input; determining, by the processor, whether a second feature event trigger occurs during the second base event; and determining, by the processor, an auxiliary input is not received for the second base event. If the second feature event trigger occurs during the second base event, then the processor switches the computing system to operate in the feature event state. If the second feature event trigger does not occur during the second base event, then the processor switches the computing system to operate in the first state to begin monitoring for receiving a further next start input.

EEE F17 is the computer-readable memory of EEE F16, wherein receiving the second start input occurs before receiving the first start input or while monitoring for receiving the next start input.

EEE F18 is the computer-readable memory of any one of EEE F16 to F17, wherein the first start input includes a first wager, the second base event includes a second wager, and the auxiliary input includes a side wager.

EEE F19 is the computer-readable memory of any one of EEE F1 to F18, wherein the computing system includes the counter and the feature event threshold.

EEE F20 is the computer-readable memory of any one of EEE F1 to F19, wherein the computing system includes the counter and the feature event threshold.

EEE F21 is the computer-readable memory of EEE F20, wherein the computer-readable memory includes a non-transitory computer-readable medium.

The invention claimed is:

1. A method comprising:

determining, at a processor of a computing system, a feature event threshold based on a quantity of base events expected to be performed during passage of an amount of time counted by a timer and a quantity of times, greater than one, to initiate a feature event during passage of the amount of time;

receiving a first start input at the processor;

performing, by the computing system, a first base event in response to receiving the first start input;

incrementing, by the processor based on the first base event, a counter that indicates a quantity of base events performed while the timer is counting the amount of time; and determining, by the processor, whether a first feature event trigger occurs during the first base event, wherein if the first feature event trigger occurs during the first base event, then the processor resets the counter and switches the computing system to operate in a feature event state;

wherein if the first feature event trigger does not occur during the first base event, then the processor determines whether the counter meets the feature event threshold, and if the processor determines the counter meets the feature event threshold, then the processor resets the counter based on the first base event and switches the computing system to operate in the feature event state, or if the processor determines the counter does not meet the feature event threshold, then the processor begins monitoring for receiving a next start input; and wherein the computing system performs at least one instance of the feature event while operating in the feature event state and then the processor begins monitoring for receiving the next start input.

2. The method of claim 1, wherein:

the counter includes a first counter corresponding to a first user of the computing system; and the computing system includes one or more of a second counter corresponding to the first user of the computing system, or at least one additional counter corresponding to at least one additional user of the computing system.

3. The method of claim 1, further comprising outputting, to a display, an indication of one or more of:

the amount of time;

a particular amount of time counted by a timer for tracking a particular passage of the amount of time, or a difference between the amount of time and the particular amount of time counted by the timer for tracking the particular passage of the amount of time.

4. The method of claim 1, further comprising outputting, to a display, an indication of one or more of:

a threshold number indicative of the feature event threshold;

a counter number indicative of the counter; or a difference number indicative of a difference between the feature event threshold and the counter.

5. The method of claim 1, further comprising:

determining, by the processor before the processor resets or increments the counter based on the first base event, that the first start input includes a first auxiliary input.

6. The method of claim 5, wherein:

the first start input is associated with a first value;

the first auxiliary input is associated with a second value; and the second value is based on the first value.

7. The method of claim 5, wherein a probability of triggering a feature event during the first base event is independent of whether the first start input includes the first auxiliary input.

8. The method of claim 1, wherein:

the computing system includes a display and a group of symbols arranged on a plurality of reels;

the computing system outputs the plurality of reels on the display; and performing the first base event includes spinning the plurality of reels output on the display, stopping the plurality of reels at respective reel stops, and displaying, on the display, a subset of the group of symbols based on the respective reel stops.

9. The method of claim 1, wherein the first base event includes a reel-based event, a poker event, a blackjack event, a baccarat event, a craps event, a wheel event, a pachinko event, or a roulette event.

10. The method of claim 1, wherein:

the computing system operates in a first state when receiving the first start input; and the computing system is configured with a setup selection for the first state.

11. The method of claim 10, wherein the setup selection for the first state includes one or more of:

a type selection of a particular type of base event;

a user selection of a particular user of the computing system;

a mode selection of an anonymous user mode; or a value selection of a particular value for start inputs.

12. The method of claim 10, further comprising:

determining a first setup selection for the computing system has been canceled; and determining a second setup selection for the computing system has been entered;

wherein one of the first setup selection or the second setup selection includes:

a permission setup selection indicating entry of auxiliary inputs is permitted;

a prohibition setup selection indicating entry of auxiliary inputs is prohibited;

a user setup selection indicating a particular user is using the computing system; or a time setup selection indicating an amount of time for using the computing system.

13. The method of claim 1, further comprising:

receiving a second start input at the processor;

performing, by the computing system, a second base event in response to receiving the second start input;

determining, by the processor, whether a second feature event trigger occurs during the second base event; and determining, by the processor, the second start input includes an auxiliary input;

wherein if the second feature event trigger occurs during the second base event, then the processor resets the counter based on the second base event and switches the computing system to operate in the feature event state; and wherein if the second feature event trigger does not occur during the second base event, then the processor determines whether the counter meets the feature event threshold, and if the processor determines the counter meets the feature event threshold, then the processor resets the counter based on the second base event and switches the computing system to operate in the feature event state, or if the processor determines the counter does not meet the feature event threshold, then the processor increments the counter based on the second base event and begins monitoring for receiving a further next start input.

14. The method of claim 13, wherein receiving the second start input occurs before receiving the first start input or while monitoring for receiving the next start input.

15. The method of claim 13, wherein the first start input includes a first wager, the second base event includes a second wager, and the auxiliary input includes a side wager.

16. The method of claim 1, further comprising:

receiving a second start input at the processor;

performing, by the computing system, a second base event in response to receiving the second start input;

determining, by the processor, whether a second feature event trigger occurs during the second base event; and determining, by the processor, an auxiliary input is not received for the second base event;

wherein if the second feature event trigger occurs during the second base event, then the processor switches the computing system to operate in the feature event state; and wherein if the second feature event trigger does not occur during the second base event, then the processor begins monitoring for receiving a further next start input.

17. The method of claim 16, wherein receiving the second start input occurs before receiving the first start input or while monitoring for receiving the next start input.

18. The method of claim 16, wherein the first start input includes a first wager, the second base event includes a second wager, and the auxiliary input includes a side wager.

19. A computing system comprising:

a processor; and a non-transitory computer-readable memory storing executable instructions, wherein execution of the instructions by the processor causes the computing system to perform the following functions:

determining a feature event threshold based on a quantity of base events expected to be performed during passage of an amount of time counted by a timer and a quantity of times, greater than one, to initiate a feature event during passage of the amount of time;

receiving a first start input at the processor;

performing a first base event in response to receiving the first start input;

incrementing, by the processor based on the first base event, a counter that indicates a quantity of base events performed while the timer is counting the amount of time;

determining whether a first feature event trigger occurs during the first base event;

resetting the counter and switching the computing system to operate in a feature event state if the first feature event trigger occurs during the first base event;

determining whether the counter meets a feature event threshold if the first feature event trigger does not occur during the first base event, resetting the counter based on the first base event and switching the computing system to operate in the feature event state if the processor determines the counter meets the feature event threshold, or beginning to monitor for receiving a next start input if the processor determines the counter does not meet the feature event threshold; and performing at least one instance of the feature event while operating in the feature event state and then beginning to monitor for receiving the next start input.

20. A non-transitory computer-readable memory having stored therein instructions executable by a processor to cause a computing system to perform functions comprising:

determining, at the processor, a feature event threshold based on a quantity of base events expected to be performed during passage of an amount of time counted by a timer and a quantity of times, greater than one, to initiate a feature event during passage of the amount of time;

receiving a first start input at the processor;

performing, by the computing system, a first base event in response to receiving the first start input;

incrementing, by the processor based on the first base event, a counter that indicates a quantity of base events performed while the timer is counting the amount of time; and determining, by the processor, whether a first feature event trigger occurs during the first base event;

wherein if the first feature event trigger occurs during the first base event, then the processor resets the counter and switches the computing system to operate in a feature event state;

wherein if the first feature event trigger does not occur during the first base event, then the processor determines whether the counter meets the feature event threshold, and if the processor determines the counter meets the feature event threshold, then the processor resets the counter based on the first base event and switches the computing system to operate in the feature event state, or if the processor determines the counter does not meet the feature event threshold, then the processor begins monitoring for receiving a next start input; and wherein the computing system is configured to perform at least one instance of the feature event while operating in the feature event state and then the processor begins monitoring for receiving the next start input.

* * * * *